United States Patent
El-Kady et al.

(10) Patent No.: US 12,516,212 B2
(45) Date of Patent: *Jan. 6, 2026

(54) CONDUCTIVE DISPERSIONS WITH ULTRATHIN GRAPHENE

(71) Applicant: NanoTech Energy, Inc., Sunny Isles Beach, FL (US)

(72) Inventors: Maher F. El-Kady, Los Angeles, CA (US); Shannon Price, Los Angeles, CA (US); Gaurav Tulsyan, Los Angeles, CA (US)

(73) Assignee: Nanotech Energy, Inc., Sunny Isles Beach, FL (US)

( * ) Notice: Subject to any disclaimer, the term of this patent is extended or adjusted under 35 U.S.C. 154(b) by 261 days.

This patent is subject to a terminal disclaimer.

(21) Appl. No.: 18/354,391

(22) Filed: Jul. 18, 2023

(65) Prior Publication Data

US 2024/0191094 A1    Jun. 13, 2024

Related U.S. Application Data

(63) Continuation of application No. 17/980,348, filed on Nov. 3, 2022, now Pat. No. 11,912,884.

(60) Provisional application No. 63/275,804, filed on Nov. 4, 2021.

(51) Int. Cl.
*C09D 11/52* (2014.01)
*C09D 11/033* (2014.01)
*C09D 11/037* (2014.01)
*B82Y 30/00* (2011.01)

(52) U.S. Cl.
CPC ............ *C09D 11/52* (2013.01); *C09D 11/033* (2013.01); *C09D 11/037* (2013.01); *B82Y 30/00* (2013.01)

(58) Field of Classification Search
CPC .................................................... C09D 11/52
See application file for complete search history.

(56) References Cited

U.S. PATENT DOCUMENTS

| | | | |
|---|---|---|---|
| 11,912,884 B2* | 2/2024 | El-Kady | C09D 11/033 |
| 2015/0024122 A1* | 1/2015 | Wu | C09D 11/52 |
| | | | 252/511 |
| 2015/0072162 A1* | 3/2015 | Hersam | H01B 1/24 |
| | | | 252/511 |
| 2018/0030289 A1* | 2/2018 | Jarvis | C08K 3/042 |

* cited by examiner

*Primary Examiner* — Matthew E. Hoban
(74) *Attorney, Agent, or Firm* — Polygon IP, LLP

(57) ABSTRACT

Provided herein are conductive inks and methods of formulation thereof, whose electric and mechanical properties (e.g. viscosity and surface tension) enable its use in a wide array of printing techniques. The outstanding conductivity, thermal stability, chemical stability, and flexibility of graphene in the inks herein enable the production of low-cost electronics with tunable electrochemical properties.

20 Claims, 44 Drawing Sheets

CONDUCTIVE DISPERSIONS WITH ULTRATHIN GRAPHENE

CROSS-REFERENCE

This application is a continuation of U.S. application Ser. No. 17/980,348, filed Nov. 3, 2022, which claims the benefit of each of U.S. Provisional Application No. 63/275,804, filed Nov. 4, 2021, which are hereby incorporated by reference in their entirety herein.

BACKGROUND

Printing conductive patterns on flexible substrates enables the manufacture of micro-scale low-cost flexible electronics. Improved printing inks are required to keep up with the increased demand for such devices. Printed electronics are used in such devices as touchscreens, solar cells, sensors, flexible displays, foldable displays, electronic paper, sensors, radio-frequency identification (RFID) tags, batteries, and supercapacitors.

SUMMARY

The conductive ink can be a high viscosity ink particularly suitable for applications such as screen, flexographic, slot-die, knife-over-edge coating, screen printing, gravure printing, spraying, dipping, or any combination thereof. The second conductive ink can be a low viscosity ink particularly suitable for applications such as gravure and spray and dip coating.

One aspect provided herein is a conductive ink comprising: graphene sheets, wherein: at least about 90% of the graphene sheets consist of a single layer; the graphene sheets have an oxygen content of at most about 6%; or both; a binder; a stabilizer; and a solvent.

In some embodiments, the graphene comprises reduced graphene oxide or activated reduced graphene oxide. In some embodiments, the binder is a polymeric binder. In some embodiments, the polymeric binder is a thermoplastic copolymer. In some embodiments, the binder comprises polyvinylpyrrolidone, ethyl methacrylate, butyl methacrylate, or any combination thereof. In some embodiments, the stabilizer comprises polytetrahydrofuran, fluorinated triethylene glycol monomethyl ether, a wax, ethyl cellulose, diethylene glycol, or any combination thereof. In some embodiments, the stabilizer comprises polytetrahydrofuran and diethylene glycol, wherein a ratio between the polytetrahydrofuran and the diethylene glycol is about 8:1 to about 11:1. In some embodiments, the solvent comprises propylene glycol n-propyl ether, 2-ethyl-1-hexanol, diethylene glycol monobutyl ether, 2-ethyl-1-butanol, 2-methyl-1-pentanol, propylene glycol monomethyl ether acetate, hexamine, cycloheptylamine, isoamyl amine, 3-methoxypropylamine, parachlorobenzotrifluoride, ethylene glycol, isopropanol, ethyl acetate, chloroform, dimethylformamide, n-methyl-2-pyrrolidone, tetrahydrofuran, and dichlorobenzene, or any combination thereof. In some embodiments, the conductive ink has a w/w concentration of the graphene of about 0.1% to about 10%. In some embodiments, the conductive ink has a w/w concentration of the binder of about 5% to about 60%. In some embodiments, the conductive ink has a w/w concentration of the stabilizer of about 1% to about 80%. In some embodiments, the conductive ink has a w/w concentration of the solvent of about 20% to about 90%. In some embodiments, the conductive ink has a solid content of about 5% to about 80%. In some embodiments, the conductive ink has a viscosity of about 25 cP to about 4,000 cP. In some embodiments, the conductive ink has a shear rate of about 100 s-1 to about 400 s-1. In some embodiments, t a ratio between a wet thickness of the conductive ink dispersed on a substrate and a dry thickness of the conductive ink dried on the substrate is about 2:1 to about 6:1. In some embodiments, the conductive ink has a resistance when dry of about 300 ohm/sq to about 80,000 ohm/sq. In some embodiments, the conductive ink has a resistance when dry of no more than about 300 ohm/sq. In some embodiments, the conductive ink has a particle size of about 1 um to about 40 um. In some embodiments, the conductive ink further comprises a conductive additive. In some embodiments, t the conductive additive comprises a nanocarbon. In some embodiments, the nanocarbon comprises carbon nanoparticles, carbon nanodots, carbon nanotubes, graphene nanoribbons, carbon nanofibers, nanographite, carbon onions, carbon nanocones, or any combination thereof. In some embodiments, the conductive ink has w/w concentration of the conductive additive of about 1% to about 40%. In some embodiments, the conductive ink further comprises graphite. In some embodiments, the conductive ink has w/w concentration of the graphite of about 5% to about 80%.

Another aspect provided herein is method of printing a conductive ink, the method comprising: depositing at most two layers of the ink of claim 1 on a substrate; and drying the ink on the substrate. In some embodiments, depositing is performed by screen printing, flexographic printing, slot-die printing, knife-over edge coating, screen printing, gravure printing, spraying, dipping, or any combination thereof. In some embodiments, the ink is dried at a temperature of about 100° C. to about 180° C. In some embodiments, the ink is dried for a period of time of about 10 minutes to about 60 minutes. In some embodiments, the ink is deposited on the substrate with a line width of about 150 um to about 3,000 um. In some embodiments, the substrate comprises mica, glass, silicon, glass, metal, plastic, fabric, graphite sheets, gold, or any combination thereof. In some embodiments, an average roughness of the dried ink is about 1 um to about 2 um. In some embodiments, a texture aspect ratio of the dried ink is about 0.25° to about 1.5°. In some embodiments, the printed conductive ink has a resistance of about 1,000 to about 40,000 ohm/sq. In some embodiments, the method further comprises annealing the ink on the substrate.

A method of forming a conductive ink, the method comprising mixing a solution comprising: graphene sheets, wherein: at least about 90% of the graphene sheets consist of a single layer; the graphene sheets have an oxygen content of at most about 6%; or both; a binder; a stabilizer; and a solvent.

In some embodiments, the graphene comprises reduced graphene oxide or activated reduced graphene oxide. In some embodiments, the binder is a polymeric binder; the polymeric binder is a thermoplastic copolymer. In some embodiments, the binder comprises polyvinylpyrrolidone, ethyl methacrylate, butyl methacrylate, or any combination thereof. In some embodiments, the stabilizer comprises polytetrahydrofuran, fluorinated triethylene glycol monomethyl ether, a wax, ethyl cellulose, diethylene glycol or any combination thereof. In some embodiments, the solvent comprises propylene glycol n-propyl ether, 2-ethyl-1-hexanol, diethylene glycol monobutyl ether, 2-ethyl-1-butanol, 2-methyl-1-pentanol, propylene glycol monomethyl ether acetate, hexamine, cycloheptylamine, isoamyl amine, 3-methoxypropylamine, parachlorobenzotrifluoride, ethylene glycol, isopropanol, ethyl acetate, chloroform, dimethylformamide, n-methyl-2-pyrrolidone, tetrahydrofuran, and dichlorobenzene, or any combination thereof. In some embodiments, the solution has a w/w concentration of the graphene of about 0.1% to about 10%. In some embodiments, the solution has a w/w concentration of the binder of about 5% to about 60%. In some embodiments, the solution has a w/w concentration of the stabilizer of about 1% to about 80%. In some embodiments, the solution has a w/w concentration of the solvent of about 20% to about 90%. In some embodiments, the solution has a solid content of about 5% to about 80%. In some embodiments, the solution is mixed for a time period of about 1 hour to about 4 hours. In some embodiments, the conductive ink has a viscosity of about 25 cP to about 4,000 cP. In some embodiments, the conductive ink has a shear rate of about 100 s-1 to about 400 s-1. In some embodiments, a ratio between a wet thickness of the conductive ink dispersed on a substrate and a dry thickness of the conductive ink dried on the substrate is about 2:1 to about 6:1. In some embodiments, the conductive ink has a resistance when dry of about 300 ohm/sq to about 80,000 ohm/sq. In some embodiments, the conductive ink has a particle size of about 3 um to about 40 um. In some embodiments, the solution further comprises a conductive additive. In some embodiments, the conductive additive comprises a nanocarbon. In some embodiments, the nanocarbon comprises carbon nanoparticles, carbon nanodots, carbon nanotubes, graphene nanoribbons, carbon nanofibers, nanographite, carbon anions, carbon nanocones, or any combination thereof. In some embodiments, the solution has a w/w concentration of the conductive additive of about 1% to about 40%. In some embodiments, the solution further comprises graphene. In some embodiments, the solution has w/w concentration of the graphene of about 5% to about 80%.

BRIEF DESCRIPTION OF THE DRAWINGS

The novel features of the disclosure are set forth with particularity in the appended claims. A better understanding of the features and advantages of the present disclosure will be obtained by reference to the following detailed description that sets forth illustrative embodiments, in which the principles of the disclosure are utilized, and the accompanying drawings of which:

DETAILED DESCRIPTION

Currently, limited methods are available to manufacture printed electronics due to the limitations of conductive inks used therein. Current silver and copper-based inks are often too expensive for large scale device production. Further, such inks agglomerate during printing to form uneven and inconsistent components, have viscosities and surface tensions that cannot be tuned for specific printing methods, and suffer from poor adhesion to substrates and low flexibility. As such, economically manufacturing durable and highly conductive printed components with such inks is often difficult or ineffective.

To improve the performance of such printed electronics and to enable the fabrication of a broader range of such electronics, improved inks are required. As such, provided herein are conductive inks and methods of formulation thereof, whose electric and mechanical properties (e.g. viscosity and surface tension) enable its use in a wide array of printing techniques. The outstanding conductivity, thermal stability, chemical stability, and flexibility of graphene in the inks herein enable the production of low-cost electronics with tunable electrochemical properties. Finally, while many current conductive inks require multiple layers for proper adhesion and conductibility, the inks herein can form electronic circuits with sufficient thickness using a reduced number of layers such as even in a single print.

Conductive Inks

Figure 1:
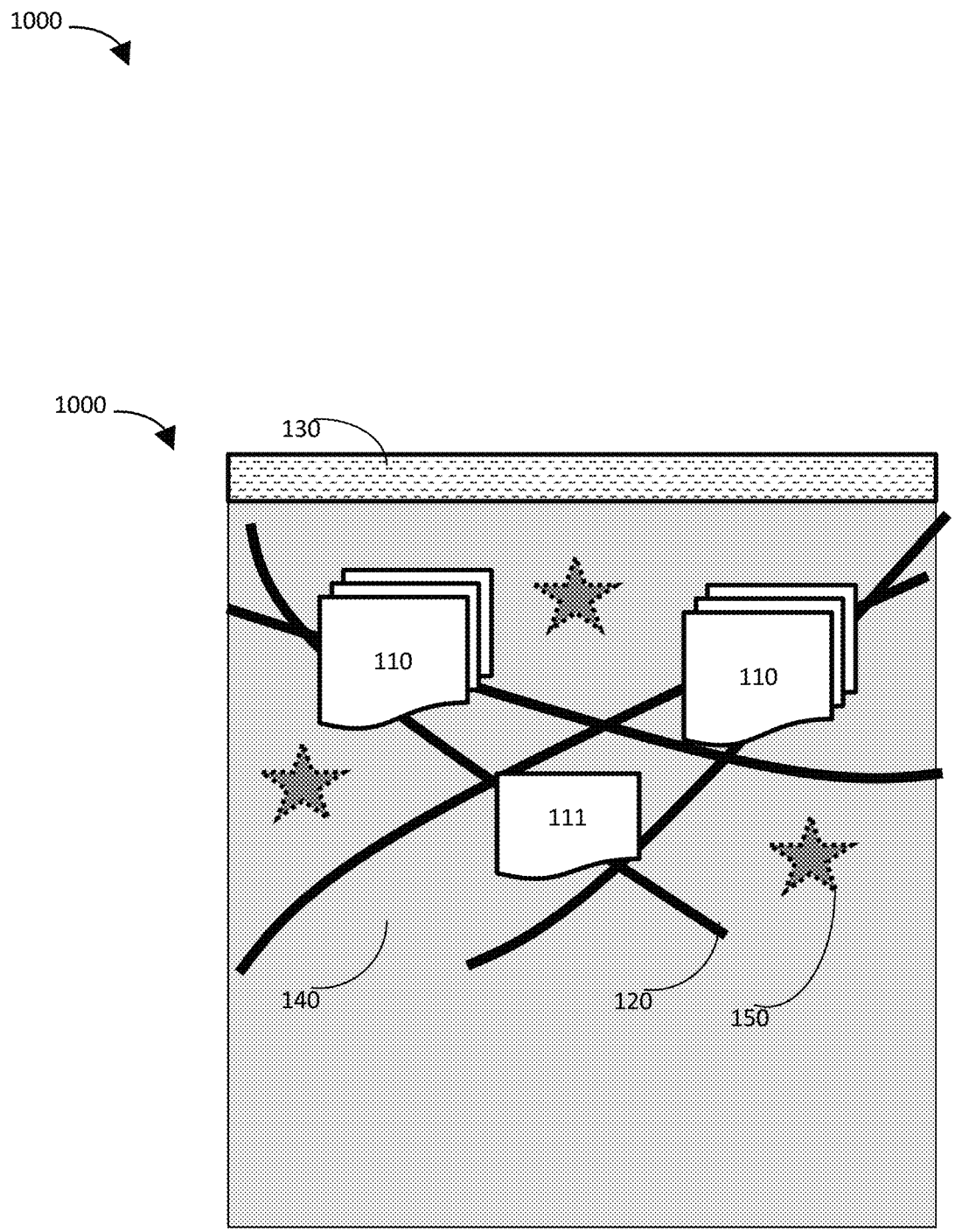
FIG. 1 is a diagram of a conductive ink, per one or more embodiments, herein.

FIG. 1 is a diagram of a conductive ink 1000. In some embodiments, the conductive ink 1000 comprises graphene 110, a binder 120, a stabilizer 130, and a solvent 140. In some embodiments, the conductive ink 1000 consists of graphene 110, a binder 120, a stabilizer 130, and a solvent 140. In some embodiments, the conductive ink 1000 consists essentially of graphene 110, a binder 120, a stabilizer 130, and a solvent 140. In some embodiments, the conductive ink 1000 does not comprise a surfactant. In some embodiments, the conductive ink 1000 does not comprise a defoamer.

The specific components of the conductive ink 1000 herein enable its unexpectedly improved elasticity, adhesion, thermal stability, coating uniformity, chemical stability, and tunable viscosity. The ink exhibits superior stability and coats evenly without leaving holes and has a smooth surface.

In some embodiments, the graphene 110 comprises reduced graphene oxide. In some embodiments, the graphene 110 comprises activated reduced graphene oxide. In some embodiments, at least about 85%, 86%, 87%, 88%, 89%, 90%, 91%, 92%, 93%, 94%, 95%, 96%, 97%, 98% or more of the graphene 110 sheets consist of a single layer of graphene 111. In some embodiments, the high content of single layer graphene sheets 111 within the conductive ink 1000 improves the conductivity of the conductive ink 1000 when dry. In some embodiments, a percentage of the reduced graphene oxide that consists of a single layer is determined by atomic force microscopy (AFM). In some embodiments, the graphene sheets 110 have an oxygen content of at most about 2%, 3%, 4%, 5%, 6%, 7%, 8%, 9%, or 10%, including increments therein. In some embodiments, the low oxygen content of the graphene sheets 110 within the conductive ink 1000 improves the conductivity of the conductive ink 1000 when dry.

In some embodiments, the binder 120 is a polymeric binder 120. In some embodiments, the polymeric binder 120 is a thermoplastic copolymer. In some embodiments, the binder 120 comprises polyvinylpyrrolidone, ethyl methacrylate, butyl methacrylate, or any combination thereof. The specific binders 120 herein enable the unexpectedly improved elasticity, adhesion, thermal stability, chemical stability, and tunable viscosity of the conductive inks 1000 herein and electronics formed therefrom.

In some embodiments, the stabilizer 130 comprises a polymer. In some embodiments, the stabilizer 130 is solid at room temperature. In some embodiments, the stabilizer 130 comprises polytetrahydrofuran, fluorinated triethylene glycol monomethyl ether, ethyl cellulose, diethylene glycol, or any combination thereof. The specific stabilizers 130 herein provide the inks 1000 herein unexpectedly improved ability to uniform coating of a substrate, to dry slowly and prevent cracking and island formation, to stabilize the graphene 110 within the ink 1000 to prevent agglomeration, and to elastically bend without damage. In some embodiments, the stabilizer 130 comprises polytetrahydrofuran, which increases the viscosity, flexibility, and elasticity of the conductive ink 1000, stabilizes the graphene 110 in the conductive ink 1000, and slows down the drying process at room temp to prevent cracking and island formation. In some embodiments, the stabilizer 130 comprises diethylene glycol, which improves the flexibility and strength of the dried conductive ink 1000.

In some embodiments, the solvent 140 comprises propylene glycol n-propyl ether, 2-ethyl-1-hexanol, diethylene glycol monobutyl ether, 2-ethyl-1-butanol, 2-methyl-1-pentanol, propylene glycol monomethyl ether acetate, hexamine, cycloheptylamine, isoamyl amine, 3-methoxypropylamine, parachlorobenzotrifluoride, ethylene glycol, isopropanol, ethyl acetate, chloroform, dimethylformamide, n-methyl-2-pyrrolidone, tetrahydrofuran, and dichlorobenzene, or any combination thereof. In some embodiments, the wax is an animal wax, a vegetable wax, a mineral wax, a petroleum wax, or any combination thereof. In some embodiments, the solvent 140 increases the stability of the graphene 110 within the inks 1000 herein. In some embodiments, the solvent 140 is volatile. In some embodiments, the solvent 140 has a vapor pressure at 20° C. of about 20 Pa to about 250 Pa. In some embodiments, the solvent 140 has a boiling point of about 110° C. to about 200° C. In some embodiments, the vapor pressure and the boiling point of the solvent enable the inks 1000 herein to dry slowly and thus prevent cracking. In some embodiments, the high boiling point of the solvent increases the drying time of the conductive ink, increases the time for coating a substrate with the conductive ink, and may permit for even drying of the conductive ink across the surface of the ink applied to the substrate. In some embodiments, the even drying of the ink across the surface of the ink applied to the substrate may prevent the edges from drying may prevent the edges from drying prior to the bulk of the conductive ink, and may prevent capillary flow of suspend reduced graphene oxide particles outward from the bulk of the conductive ink to the edges of the conductive ink as applied to the substrate, and may permit for an even coating of the conductive ink on a substrate with a uniform or substantially uniform dispersion of graphene oxide particles throughout the conductive ink applied to the substrate. In some embodiments, the slow, even drying of the ink across the surface of the ink applied to the substrate may allow for a highly uniform coating of the conductive ink applied to a substrate, improving the conductivity of the final product produced with the conductive ink applied to a substrate.

In some embodiments, the conductive ink has a particle size of about 3 um to about 20 um. In some embodiments, the conductive ink has a particle size of about 3 um to about 4 um, about 3 um to about 6 um, about 3 um to about 8 um, about 3 um to about 10 um, about 3 um to about 12 um, about 3 um to about 14 um, about 3 um to about 16 um, about 3 um to about 18 um, about 3 um to about 20 um, about 4 um to about 6 um, about 4 um to about 8 um, about 4 um to about 10 um, about 4 um to about 12 um, about 4 um to about 14 um, about 4 um to about 16 um, about 4 um to about 18 um, about 4 um to about 20 um, about 6 um to about 8 um, about 6 um to about 10 um, about 6 um to about 12 um, about 6 um to about 14 um, about 6 um to about 16 um, about 6 um to about 18 um, about 6 um to about 20 um, about 8 um to about 10 um, about 8 um to about 12 um, about 8 um to about 14 um, about 8 um to about 16 um, about 8 um to about 18 um, about 8 um to about 20 um, about 10 um to about 12 um, about 10 um to about 14 um, about 10 um to about 16 um, about 10 um to about 18 um, about 10 um to about 20 um, about 12 um to about 14 um, about 12 um to about 16 um, about 12 um to about 18 um, about 12 um to about 20 um, about 14 um to about 16 um, about 14 um to about 18 um, about 14 um to about 20 um, about 16 um to about 18 um, about 16 um to about 20 um, or about 18 um to about 20 um, including increments therein. In some embodiments, the conductive ink has a particle size of about 3 um, about 4 um, about 6 um, about 8 um, about 10 um, about 12 um, about 14 um, about 16 um, about 18 um, or about 20 um. In some embodiments, the conductive ink has a particle size of at least about 3 um, about 4 um, about 6 um, about 8 um, about 10 um, about 12 um, about 14 um, about 16 um, or about 18 um. In some embodiments, the conductive ink has a particle size of at most about 4 um, about 6 um, about 8 um, about 10 um, about 12 um, about 14 um, about 16 um, about 18 um, or about 20 um. In some embodiments, the specific particle sizes of the inks herein provide a tunable viscosity and surface tension to enable printing with a variety of methods and machines for production of a wide array of electronic components. In some embodiments, the above-described particle sizes refer a mean or average particle size. In some embodiments, the above-described particle sizes refer to at least 80%, at least 90%, or at least 95% of the ink having the recited particle size.

The viscosity of the conductive ink can be tuned by adjusting the shear mixing time, wherein longer shearing times reduce viscosity. In some embodiments, the conductive ink has a viscosity of about 25 cP to about 3,000 cP. In some embodiments, the conductive ink has a viscosity of about 25 cP to about 50 cP, about 25 cP to about 100 cP, about 25 cP to about 250 cP, about 25 cP to about 500 cP, about 25 cP to about 750 cP, about 25 cP to about 1,000 cP, about 25 cP to about 2,000 cP, about 25 cP to about 3,000 cP, about 25 cP to about 400 cP, about 50 cP to about 100 cP, about 50 cP to about 250 cP, about 50 cP to about 500 cP, about 50 cP to about 750 cP, about 50 cP to about 1,000 cP, about 50 cP to about 2,000 cP, about 50 cP to about 3,000 cP, about 50 cP to about 400 cP, about 100 cP to about 250 cP, about 100 cP to about 500 cP, about 100 cP to about 750 cP, about 100 cP to about 1,000 cP, about 100 cP to about 2,000 cP, about 100 cP to about 3,000 cP, about 100 cP to about 400 cP, about 250 cP to about 500 cP, about 250 cP to about 750 cP, about 250 cP to about 1,000 cP, about 250 cP to about 2,000 cP, about 250 cP to about 3,000 cP, about 250 cP to about 400 cP, about 500 cP to about 750 cP, about 500 cP to about 1,000 cP, about 500 cP to about 2,000 cP, about 500 cP to about 3,000 cP, about 500 cP to about 400 cP, about 750 cP to about 1,000 cP, about 750 cP to about 2,000 cP, about 750 cP to about 3,000 cP, about 750 cP to about 400 cP, about 1,000 cP to about 2,000 cP, about 1,000 cP to about 3,000 cP, about 1,000 cP to about 400 cP, about 2,000 cP to about 3,000 cP, about 2,000 cP to about 400 cP, or about 3,000 cP to about 400 cP, including increments therein. In some embodiments, the conductive ink has a viscosity of about 25 cP, about 50 cP, about 100 cP, about 250 cP, about 500 cP, about 750 cP, about 1,000 cP, about 2,000 cP, about 3,000 cP, or about 400 cP. In some embodiments, the conductive ink has a viscosity of at least about 25 cP, about 50 cP, about 100 cP, about 250 cP, about 500 cP, about 750 cP, about 1,000 cP, about 2,000 cP, or about 3,000 cP. In some embodiments, the conductive ink has a viscosity of at most about 50 cP, about 100 cP, about 250 cP, about 500 cP, about 750 cP, about 1,000 cP, about 2,000 cP, about 3,000 cP, or about 400 cP. In some embodiments, the viscosity of the inks herein enable its printing with a variety of methods and machines, to produce a wide array of electronic components.

In some embodiments, the conductive ink has a shear rate of about 100 s-1 to about 400 s-1. In some embodiments, the conductive ink has a shear rate of about 100 s-1 to about 150 s-1, about 100 s-1 to about 200 s-1, about 100 s-1 to about 250 s-1, about 100 s-1 to about 300 s-1, about 100 s-1 to about 350 s-1, about 100 s-1 to about 400 s-1, about 150 s-1 to about 200 s-1, about 150 s-1 to about 250 s-1, about 150 s-1 to about 300 s-1, about 150 s-1 to about 350 s-1, about 150 s-1 to about 400 s-1, about 200 s-1 to about 250 s-1, about 200 s-1 to about 300 s-1, about 200 s-1 to about 350 s-1, about 200 s-1 to about 400 s-1, about 250 s-1 to about 300 s-1, about 250 s-1 to about 350 s-1, about 250 s-1 to about 400 s-1, about 300 s-1 to about 350 s-1, about 300 s-1 to about 400 s-1, or about 350 s-1 to about 400 s-1, including increments therein. In some embodiments, the conductive ink has a shear rate of about 100 s-1, about 150 s-1, about 200 s-1, about 250 s-1, about 300 s-1, about 350 s-1, or about 400 s-1. In some embodiments, the conductive ink has a shear rate of at least about 100 s-1, about 150 s-1, about 200 s-1, about 250 s-1, about 300 s-1, or about 350 s-1. In some embodiments, the conductive ink has a shear rate of at most about 150 s-1, about 200 s-1, about 250 s-1, about 300 s-1, about 350 s-1, or about 400 s-1. In some embodiments, the shear rate of the inks herein enable its printing with a variety of methods and machines, to produce a wide array of electronic components.

In some embodiments, the conductive ink, when wet, has a w/w concentration of the graphene of about 0.1% to about 10%. In some embodiments, the conductive ink, when wet, has a w/w concentration of the graphene of about 0.1% to about 0.5%, about 0.1% to about 1%, about 0.1% to about 2%, about 0.1% to about 3%, about 0.1% to about 4%, about 0.1% to about 5%, about 0.1% to about 6%, about 0.1% to about 7%, about 0.1% to about 8%, about 0.1% to about 9%, about 0.1% to about 10%, about 0.5% to about 1%, about 0.5% to about 2%, about 0.5% to about 3%, about 0.5% to about 4%, about 0.5% to about 5%, about 0.5% to about 6%, about 0.5% to about 7%, about 0.5% to about 8%, about 0.5% to about 9%, about 0.5% to about 10%, about 1% to about 2%, about 1% to about 3%, about 1% to about 4%, about 1% to about 5%, about 1% to about 6%, about 1% to about 7%, about 1% to about 8%, about 1% to about 9%, about 1% to about 10%, about 2% to about 3%, about 2% to about 4%, about 2% to about 5%, about 2% to about 6%, about 2% to about 7%, about 2% to about 8%, about 2% to about 9%, about 2% to about 10%, about 3% to about 4%, about 3% to about 5%, about 3% to about 6%, about 3% to about 7%, about 3% to about 8%, about 3% to about 9%, about 3% to about 10%, about 4% to about 5%, about 4% to about 6%, about 4% to about 7%, about 4% to about 8%, about 4% to about 9%, about 4% to about 10%, about 5% to about 6%, about 5% to about 7%, about 5% to about 8%, about 5% to about 9%, about 5% to about 10%, about 6% to about 7%, about 6% to about 8%, about 6% to about 9%, about 6% to about 10%, about 7% to about 8%, about 7% to about 9%, about 7% to about 10%, about 8% to about 9%, about 8% to about 10%, or about 9% to about 10%, including increments therein. In some embodiments, the conductive ink, when wet, has a w/w concentration of the graphene of about 0.1%, about 0.5%, about 1%, about 2%, about 3%, about 4%, about 5%, about 6%, about 7%, about 8%, about 9%, or about 10%. In some embodiments, the conductive ink, when wet, has a w/w concentration of the graphene of at least about 0.1%, about 0.5%, about 1%, about 2%, about 3%, about 4%, about 5%, about 6%, about 7%, about 8%, or about 9%. In some embodiments, the conductive ink, when wet, has a w/w concentration of the graphene of at most about 0.5%, about 1%, about 2%, about 3%, about 4%, about 5%, about 6%, about 7%, about 8%, about 9%, or about 10%. In some embodiments, the low concentration of the graphene oxide herein, in addition to the additional elements of the conductive ink, reduces the cost of the conductive inks herein while maintaining a high conductivity and low resistance.

In some embodiments, the conductive ink, when wet, has a w/w concentration of the binder of about 10% to about 60%. In some embodiments, the conductive ink, when wet, has a w/w concentration of the binder of about 10% to about 15%, about 10% to about 20%, about 10% to about 25%, about 10% to about 30%, about 10% to about 35%, about 10% to about 40%, about 10% to about 45%, about 10% to about 50%, about 10% to about 55%, about 10% to about 60%, about 15% to about 20%, about 15% to about 25%, about 15% to about 30%, about 15% to about 35%, about 15% to about 40%, about 15% to about 45%, about 15% to about 50%, about 15% to about 55%, about 15% to about 60%, about 20% to about 25%, about 20% to about 30%, about 20% to about 35%, about 20% to about 40%, about 20% to about 45%, about 20% to about 50%, about 20% to about 55%, about 20% to about 60%, about 25% to about 30%, about 25% to about 35%, about 25% to about 40%, about 25% to about 45%, about 25% to about 50%, about 25% to about 55%, about 25% to about 60%, about 30% to about 35%, about 30% to about 40%, about 30% to about 45%, about 30% to about 50%, about 30% to about 55%, about 30% to about 60%, about 35% to about 40%, about 35% to about 45%, about 35% to about 50%, about 35% to about 55%, about 35% to about 60%, about 40% to about 45%, about 40% to about 50%, about 40% to about 55%, about 40% to about 60%, about 45% to about 50%, about 45% to about 55%, about 45% to about 60%, about 50% to about 55%, about 50% to about 60%, or about 55% to about 60%, including increments therein. In some embodiments, the conductive ink, when wet, has a w/w concentration of the binder of about 10%, about 15%, about 20%, about 25%, about 30%, about 35%, about 40%, about 45%, about 50%, about 55%, or about 60%. In some embodiments, the conductive ink, when wet, has a w/w concentration of the binder of at least about 10%, about 15%, about 20%, about 25%, about 30%, about 35%, about 40%, about 45%, about 50%, or about 55%. In some embodiments, the conductive ink, when wet, has a w/w concentration of the binder of at most about 15%, about 20%, about 25%, about 30%, about 35%, about 40%, about 45%, about 50%, about 55%, or about 60%. The specific w/w concentrations of the binder herein improve the elasticity, adhesion, thermal stability, and chemical stability of the inks herein, while maintaining tunable viscosities and surface tensions.

In some embodiments, the conductive ink, when wet, has a w/w concentration of the stabilizer of about 1% to about 80%. In some embodiments, the conductive ink, when wet, has a w/w concentration of the stabilizer of about 1% to about 5%, about 1% to about 10%, about 1% to about 15%, about 1% to about 20%, about 1% to about 25%, about 1% to about 30%, about 1% to about 40%, about 1% to about 50%, about 1% to about 60%, about 1% to about 70%, about 1% to about 80%, about 5% to about 10%, about 5% to about 15%, about 5% to about 20%, about 5% to about 25%, about 5% to about 30%, about 5% to about 40%, about 5% to about 50%, about 5% to about 60%, about 5% to about 70%, about 5% to about 80%, about 10% to about 15%, about 10% to about 20%, about 10% to about 25%, about 10% to about 30%, about 10% to about 40%, about 10% to about 50%, about 10% to about 60%, about 10% to about 70%, about 10% to about 80%, about 15% to about 20%, about 15% to about 25%, about 15% to about 30%, about 15% to about 40%, about 15% to about 50%, about 15% to about 60%, about 15% to about 70%, about 15% to about 80%, about 20% to about 25%, about 20% to about 30%, about 20% to about 40%, about 20% to about 50%, about 20% to about 60%, about 20% to about 70%, about 20% to about 80%, about 25% to about 30%, about 25% to about 40%, about 25% to about 50%, about 25% to about 60%, about 25% to about 70%, about 25% to about 80%, about 30% to about 40%, about 30% to about 50%, about 30% to about 60%, about 30% to about 70%, about 30% to about 80%, about 40% to about 50%, about 40% to about 60%, about 40% to about 70%, about 40% to about 80%, about 50% to about 60%, about 50% to about 70%, about 50% to about 80%, about 60% to about 70%, about 60% to about 80%, or about 70% to about 80%, including increments therein. In some embodiments, the conductive ink, when wet, has a w/w concentration of the stabilizer of about 1%, about 5%, about 10%, about 15%, about 20%, about 25%, about 30%, about 40%, about 50%, about 60%, about 70%, or about 80%. In some embodiments, the conductive ink, when wet, has a w/w concentration of the stabilizer of at least about 1%, about 5%, about 10%, about 15%, about 20%, about 25%, about 30%, about 40%, about 50%, about 60%, or about 70%. In some embodiments, the conductive ink, when wet, has a w/w concentration of the stabilizer of at most about 5%, about 10%, about 15%, about 20%, about 25%, about 30%, about 40%, about 50%, about 60%, about 70%, or about 80%. Various w/w concentrations of the stabilizer disclosed herein can improve the ink's ability for uniform coating on a substrate while preventing cracking and island formation, and stabilizes the graphene within the ink to prevent agglomeration, while maintaining tunable viscosities and surface tensions. In some embodiments, w/w concentrations of the stabilizer herein increases the drying time of the conductive ink, increases the time for coating a substrate with the conductive ink, and may permit for even drying of the conductive ink across the surface of the ink applied to the substrate. In some embodiments, the even drying of the ink across the surface of the ink applied to the substrate may prevent the edges from drying may prevent the edges from drying prior to the bulk of the conductive ink, and may prevent capillary flow of suspend reduced graphene oxide particles outward from the bulk of the conductive ink to the edges of the conductive ink as applied to the substrate, and may permit for an even coating of the conductive ink on a substrate with a uniform or substantially uniform dispersion of graphene oxide particles throughout the conductive ink applied to the substrate. In some embodiments, the slow, even drying of the ink across the surface of the ink applied to the substrate may allow for a highly uniform coating of the conductive ink applied to a substrate, improving the conductivity of the final product produced with the conductive ink applied to a substrate.

In some embodiments, a ratio between the polytetrahydrofuran and the diethylene glycol is about 8:1 to about 11:1. In some embodiments, a ratio between the polytetrahydrofuran and the diethylene glycol is about 8:1 to about 8.5:1, about 8:1 to about 9:1, about 8:1 to about 9.5:1, about 8:1 to about 10:1, about 8:1 to about 10.5:1, about 8:1 to about 11:1, about 8.5:1 to about 9:1, about 8.5:1 to about 9.5:1, about 8.5:1 to about 10:1, about 8.5:1 to about 10.5:1, about 8.5:1 to about 11:1, about 9:1 to about 9.5:1, about 9:1 to about 10:1, about 9:1 to about 10.5:1, about 9:1 to about 11:1, about 9.5:1 to about 10:1, about 9.5:1 to about 10.5:1, about 9.5:1 to about 11:1, about 10:1 to about 10.5:1, about 10:1 to about 11:1, or about 10.5:1 to about 11:1, including increments therein. In some embodiments, a ratio between the polytetrahydrofuran and the diethylene glycol is about 8:1, about 8.5:1, about 9:1, about 9.5:1, about 10:1, about 10.5:1, or about 11:1. In some embodiments, a ratio between the polytetrahydrofuran and the diethylene glycol is at least about 8:1, about 8.5:1, about 9:1, about 9.5:1, about 10:1, or about 10.5:1. In some embodiments, a ratio between the polytetrahydrofuran and the diethylene glycol is at most about 8.5:1, about 9:1, about 9.5:1, about 10:1, about 10.5:1, or about 11:1.

In some embodiments, the conductive ink, when wet, has a w/w concentration of the solvent of about 20% to about 90%. In some embodiments, the conductive ink, when wet, has a w/w concentration of the solvent of about 20% to about 30%, about 20% to about 40%, about 20% to about 50%, about 20% to about 60%, about 20% to about 70%, about 20% to about 80%, about 20% to about 90%, about 30% to about 40%, about 30% to about 50%, about 30% to about 60%, about 30% to about 70%, about 30% to about 80%, about 30% to about 90%, about 40% to about 50%, about 40% to about 60%, about 40% to about 70%, about 40% to about 80%, about 40% to about 90%, about 50% to about 60%, about 50% to about 70%, about 50% to about 80%, about 50% to about 90%, about 60% to about 70%, about 60% to about 80%, about 60% to about 90%, about 70% to about 80%, about 70% to about 90%, or about 80% to about 90%, including increments therein. In some embodiments, the conductive ink, when wet, has a w/w concentration of the solvent of about 20%, about 30%, about 40%, about 50%, about 60%, about 70%, about 80%, or about 90%. In some embodiments, the conductive ink, when wet, has a w/w concentration of the solvent of at least about 20%, about 30%, about 40%, about 50%, about 60%, about 70%, or about 80%. In some embodiments, the conductive ink, when wet, has a w/w concentration of the solvent of at most about 30%, about 40%, about 50%, about 60%, about 70%, about 80%, or about 90%. The specific w/w concentrations of the solvent herein unexpectedly improve the stability of the graphene within the inks, while maintaining tunable viscosities and surface tensions.

In some embodiments, the conductive ink 1000 further comprises a conductive additive 150. In some embodiments, the conductive additive 150 comprises a nanocarbon. In some embodiments, the nanocarbon comprises carbon nanoparticles, carbon nanodots, carbon nanotubes, graphene nanoribbons, carbon nanofibers, nanographite, carbon onions, carbon nanocones, or any combination thereof. In some embodiments, the conductive additives 150 herein improve the conductivity of the inks 2000 herein, while maintaining its rheological properties to enable printing through various means to form a wide array of electronic components. In some embodiments, the conductive additives 150 herein improve the electronic conductivity of the ink and lower overall viscosity to match the requirement for micro-gravure printing. In some embodiments, the carbon nanoparticles comprise carbon black.

In some embodiments, the conductive ink, when wet, has a w/w concentration of the conductive additive of about 1% to about 40%. In some embodiments, the conductive ink, when wet, has a w/w concentration of the conductive additive of about 1% to about 5%, about 1% to about 10%, about 1% to about 15%, about 1% to about 20%, about 1% to about 25%, about 1% to about 30%, about 1% to about 35%, about 1% to about 40%, about 5% to about 10%, about 5% to about 15%, about 5% to about 20%, about 5% to about 25%, about 5% to about 30%, about 5% to about 35%, about 5% to about 40%, about 10% to about 15%, about 10% to about 20%, about 10% to about 25%, about 10% to about 30%, about 10% to about 35%, about 10% to about 40%, about 15% to about 20%, about 15% to about 25%, about 15% to about 30%, about 15% to about 35%, about 15% to about 40%, about 20% to about 25%, about 20% to about 30%, about 20% to about 35%, about 20% to about 40%, about 25% to about 30%, about 25% to about 35%, about 25% to about 40%, about 30% to about 35%, about 30% to about 40%, or about 35% to about 40%, including increments therein. In some embodiments, the conductive ink, when wet, has a w/w concentration of the conductive additive of about 1%, about 5%, about 10%, about 15%, about 20%, about 25%, about 30%, about 35%, or about 40%. In some embodiments, the conductive ink, when wet, has a w/w concentration of the conductive additive of at least about 1%, about 5%, about 10%, about 15%, about 20%, about 25%, about 30%, or about 35%. In some embodiments, the conductive ink, when wet, has a w/w concentration of the conductive additive of at most about 5%, about 10%, about 15%, about 20%, about 25%, about 30%, about 35%, or about 40%.

Characterization of Conductive Inks

The conductive inks herein exhibit level 5B adhesion (ideal adhesion), enabling its use on a wide array of substrates, such as, for example Polyimide, glass, aluminum, and polyethylene terephthalate. Further, while the components in many current conductive inks separate and form non-dispersible clumps, the conductive inks herein exhibit a shelf life of over 1 year, wherein the components of the ink remain in solution. Further, unlike many current conductive inks, the conductive inks herein inks can be produced and supplied in large volumes. Additionally, the conductive inks herein improve the efficiency and speed of forming printed conductive materials, as they can be cured at any temperature, and at curing times as low as 10 minutes or less at temperatures below 110° C. Finally, the conductive inks herein are water soluble, and produce consistent continuous coatings when dried.

In some embodiments, the conductive ink has a solid content of about 5% to about 80%. In some embodiments, the conductive ink has a solid content of about 5% to about 10%, about 5% to about 20%, about 5% to about 30%, about 5% to about 40%, about 5% to about 50%, about 5% to about 60%, about 5% to about 70%, about 5% to about 80%, about 10% to about 20%, about 10% to about 30%, about 10% to about 40%, about 10% to about 50%, about 10% to about 60%, about 10% to about 70%, about 10% to about 80%, about 20% to about 30%, about 20% to about 40%, about 20% to about 50%, about 20% to about 60%, about 20% to about 70%, about 20% to about 80%, about 30% to about 40%, about 30% to about 50%, about 30% to about 60%, about 30% to about 70%, about 30% to about 80%, about 40% to about 50%, about 40% to about 60%, about 40% to about 70%, about 40% to about 80%, about 50% to about 60%, about 50% to about 70%, about 50% to about 80%, about 60% to about 70%, about 60% to about 80%, or about 70% to about 80%, including increments therein. In some embodiments, the conductive ink has a solid content of about 5%, about 10%, about 20%, about 30%, about 40%, about 50%, about 60%, about 70%, or about 80%. In some embodiments, the conductive ink has a solid content of at least about 5%, about 10%, about 20%, about 30%, about 40%, about 50%, about 60%, or about 70%. In some embodiments, the conductive ink has a solid content of at most about 10%, about 20%, about 30%, about 40%, about 50%, about 60%, about 70%, or about 80%.

In some embodiments, a ratio between a wet thickness of the conductive ink dispersed on a substrate and a dry thickness of the conductive ink dried on the substrate is about 2:1 to about 6:1. In some embodiments, a ratio between a wet thickness of the conductive ink dispersed on a substrate and a dry thickness of the conductive ink dried on the substrate is about 2:1 to about 2.5:1, about 2:1 to about 3:1, about 2:1 to about 3.5:1, about 2:1 to about 4:1, about 2:1 to about 4.5:1, about 2:1 to about 5:1, about 2:1 to about 5.5:1, about 2:1 to about 6:1, about 2.5:1 to about 3:1, about 2.5:1 to about 3.5:1, about 2.5:1 to about 4:1, about 2.5:1 to about 4.5:1, about 2.5:1 to about 5:1, about 2.5:1 to about 5.5:1, about 2.5:1 to about 6:1, about 3:1 to about 3.5:1, about 3:1 to about 4:1, about 3:1 to about 4.5:1, about 3:1 to about 5:1, about 3:1 to about 5.5:1, about 3:1 to about 6:1, about 3.5:1 to about 4:1, about 3.5:1 to about 4.5:1, about 3.5:1 to about 5:1, about 3.5:1 to about 5.5:1, about 3.5:1 to about 6:1, about 4:1 to about 4.5:1, about 4:1 to about 5:1, about 4:1 to about 5.5:1, about 4:1 to about 6:1, about 4.5:1 to about 5:1, about 4.5:1 to about 5.5:1, about 4.5:1 to about 6:1, about 5:1 to about 5.5:1, about 5:1 to about 6:1, or about 5.5:1 to about 6:1, including increments therein. In some embodiments, a ratio between a wet thickness of the conductive ink dispersed on a substrate and a dry thickness of the conductive ink dried on the substrate is about 2:1, about 2.5:1, about 3:1, about 3.5:1, about 4:1, about 4.5:1, about 5:1, about 5.5:1, or about 6:1. In some embodiments, a ratio between a wet thickness of the conductive ink dispersed on a substrate and a dry thickness of the conductive ink dried on the substrate is at least about 2:1, about 2.5:1, about 3:1, about 3.5:1, about 4:1, about 4.5:1, about 5:1, or about 5.5:1. In some embodiments, a ratio between a wet thickness of the conductive ink dispersed on a substrate and a dry thickness of the conductive ink dried on the substrate is at most about 2.5:1, about 3:1, about 3.5:1, about 4:1, about 4.5:1, about 5:1, about 5.5:1, or about 6:1.

In some embodiments, the conductive ink has a resistance when dry of about 300 ohm/sq to about 80,000 ohm/sq. In some embodiments, the conductive ink has a resistance when dry of about 300 ohm/sq to about 500 ohm/sq, about 300 ohm/sq to about 750 ohm/sq, about 300 ohm/sq to about 1,000 ohm/sq, about 300 ohm/sq to about 2,500 ohm/sq, about 300 ohm/sq to about 5,000 ohm/sq, about 300 ohm/sq to about 7,500 ohm/sq, about 300 ohm/sq to about 10,000 ohm/sq, about 300 ohm/sq to about 25,000 ohm/sq, about 300 ohm/sq to about 50,000 ohm/sq, about 300 ohm/sq to about 80,000 ohm/sq, about 500 ohm/sq to about 750 ohm/sq, about 500 ohm/sq to about 1,000 ohm/sq, about 500 ohm/sq to about 2,500 ohm/sq, about 500 ohm/sq to about 5,000 ohm/sq, about 500 ohm/sq to about 7,500 ohm/sq, about 500 ohm/sq to about 10,000 ohm/sq, about 500 ohm/sq to about 25,000 ohm/sq, about 500 ohm/sq to about 50,000 ohm/sq, about 500 ohm/sq to about 80,000 ohm/sq, about 750 ohm/sq to about 1,000 ohm/sq, about 750 ohm/sq to about 2,500 ohm/sq, about 750 ohm/sq to about 5,000 ohm/sq, about 750 ohm/sq to about 7,500 ohm/sq, about 750 ohm/sq to about 10,000 ohm/sq, about 750 ohm/sq to about 25,000 ohm/sq, about 750 ohm/sq to about 50,000 ohm/sq, about 750 ohm/sq to about 80,000 ohm/sq, about 1,000 ohm/sq to about 2,500 ohm/sq, about 1,000 ohm/sq to about 5,000 ohm/sq, about 1,000 ohm/sq to about 7,500 ohm/sq, about 1,000 ohm/sq to about 10,000 ohm/sq, about 1,000 ohm/sq to about 25,000 ohm/sq, about 1,000 ohm/sq to about 50,000 ohm/sq, about 1,000 ohm/sq to about 80,000 ohm/sq, about 2,500 ohm/sq to about 5,000 ohm/sq, about 2,500 ohm/sq to about 7,500 ohm/sq, about 2,500 ohm/sq to about 10,000 ohm/sq, about 2,500 ohm/sq to about 25,000 ohm/sq, about 2,500 ohm/sq to about 50,000 ohm/sq, about 2,500 ohm/sq to about 80,000 ohm/sq, about 5,000 ohm/sq to about 7,500 ohm/sq, about 5,000 ohm/sq to about 10,000 ohm/sq, about 5,000 ohm/sq to about 25,000 ohm/sq, about 5,000 ohm/sq to about 50,000 ohm/sq, about 5,000 ohm/sq to about 80,000 ohm/sq, about 7,500 ohm/sq to about 10,000 ohm/sq, about 7,500 ohm/sq to about 25,000 ohm/sq, about 7,500 ohm/sq to about 50,000 ohm/sq, about 7,500 ohm/sq to about 80,000 ohm/sq, about 10,000 ohm/sq to about 25,000 ohm/sq, about 10,000 ohm/sq to about 50,000 ohm/sq, about 10,000 ohm/sq to about 80,000 ohm/sq, about 25,000 ohm/sq to about 50,000 ohm/sq, about 25,000 ohm/sq to about 80,000 ohm/sq, or about 50,000 ohm/sq to about 80,000 ohm/sq, including increments therein. In some embodiments, the conductive ink has a resistance when dry of about 300 ohm/sq, about 500 ohm/sq, about 750 ohm/sq, about 1,000 ohm/sq, about 2,500 ohm/sq, about 5,000 ohm/sq, about 7,500 ohm/sq, about 10,000 ohm/sq, about 25,000 ohm/sq, about 50,000 ohm/sq, or about 80,000 ohm/sq. In some embodiments, the conductive ink has a resistance when dry of at least about 300 ohm/sq, about 500 ohm/sq, about 750 ohm/sq, about 1,000 ohm/sq, about 2,500 ohm/sq, about 5,000 ohm/sq, about 7,500 ohm/sq, about 10,000 ohm/sq, about 25,000 ohm/sq, or about 50,000 ohm/sq. In some embodiments, the conductive ink has a resistance when dry of at most about 500 ohm/sq, about 750 ohm/sq, about 1,000 ohm/sq, about 2,500 ohm/sq, about 5,000 ohm/sq, about 7,500 ohm/sq, about 10,000 ohm/sq, about 25,000 ohm/sq, about 50,000 ohm/sq, or about 80,000 ohm/sq.

In some embodiments, the conductive ink printed on a substrate is thermally stable up to about 400° C. In some embodiments, the conductive ink is flexible when dried and applied to a substrate. In some embodiments, flexibility of the conductive ink is measured by measuring the sheet resistance of the conductive ink when applied to a substrate upon bending. In some embodiments, the sheet resistance of the conductive ink does not decrease upon bending the substrate, folding the substrate, or creasing the substrate. In some embodiments, the sheet resistance of the conductive ink decreases by less than 10%, 9%, 8%, 7%, 6%, 5%, 4%, 3% 2%, 1%, 0.5%, 0.1% or less upon bending the substrate, folding the substrate, or creasing the substrate.

In some embodiments, the conductive ink is adhesive and is resistant to cracking. Cracking of the conductive ink can be measured by making an incision on the coating of the surface of the conductive ink, and by applying an adhesive surface to the incised surface of the conductive ink. In some embodiments, the conductive ink is resistant to cracking and none of the conductive ink is removed from the incised surface of the conductive ink upon application of an adhesive surface to the incised surface. In some embodiments, the conductive ink is resistant to cracking and less than 10%, 9%, 8%, 7%, 6%, 5%, 4%, 3% 2%, 1%, 0.5%, 0.1% or less upon of the conductive ink is removed from the incised surface of the conductive ink upon application of an adhesive surface to the incised surface.

Methods of Forming Conductive Inks

A method of forming a conductive ink, the method comprising mixing a solution comprising graphene; a binder; a stabilizer; and a solvent; heating the solution to a first temperature; maintaining the first temperature of the solution for a holding time; and heating the solution to a second temperature;

In some embodiments, the graphene comprises reduced graphene oxide or activated reduced graphene oxide. In some embodiments, the binder is a polymeric binder. In some embodiments, the polymeric binder is a thermoplastic copolymer. In some embodiments, the binder comprises polyvinylpyrrolidone, ethyl methacrylate, butyl methacrylate, or any combination thereof. In some embodiments, the stabilizer comprises polytetrahydrofuran, fluorinated triethylene glycol monomethyl ether, a wax, ethyl cellulose, or any combination thereof. In some embodiments, the stabilizer comprises polytetrahydrofuran and diethylene glycol. In some embodiments, a ratio between the polytetrahydrofuran and the diethylene glycol in the stabilizer is about 8:1 to about 11:1.

In some embodiments, the solvent comprises propylene glycol n-propyl ether, 2-ethyl-1-hexanol, diethylene glycol monobutyl ether, 2-ethyl-1-butanol, 2-methyl-1-pentanol, propylene glycol monomethyl ether acetate, hexamine, cycloheptylamine, isoamyl amine, 3-methoxypropylamine, parachlorobenzotrifluoride, ethylene glycol, isopropanol, ethyl acetate, chloroform, dimethylformamide, n-methyl-2-pyrrolidone, tetrahydrofuran, and dichlorobenzene, or any combination thereof.

In some embodiments, the solution has a w/w concentration of the graphene of about 0.1% to about 10%. In some embodiments, the solution has a w/w concentration of the binder of about 5% to about 60%. In some embodiments, the solution has a w/w concentration of the stabilizer of about 1% to about 80%. In some embodiments, the solution has a w/w concentration of the solvent of about 20% to about 90%. In some embodiments, the solution has a solid content of about 5% to about 80%. In some embodiments, the solution is mixed for a time period of about 1 hour to about 4 hours. In some embodiments, the first temperature is about 100° C. to about 200° C. In some embodiments, the solution is heated to the first temperature at a rate of about 1° C./min to about 10° C./min. In some embodiments, the holding time is about 2 hours to about 5 hours. In some embodiments, the second temperature is about 800° C. to 1,000° C. In some embodiments, the solution is heated to the second temperature at a rate of about 1° C./min to about 10° C./min. In some embodiments, the conductive ink has a viscosity of about 25 cP to about 4,000 cP. In some embodiments, the conductive ink has a shear rate of about 100 s-1 to about 400 s-1. In some embodiments, a ratio between a wet thickness of the conductive ink dispersed on a substrate and a dry thickness of the conductive ink dried on the substrate is about 21 to about 61. In some embodiments, the conductive ink has a resistance when dry of about 300 ohm/sq to about 80,000 ohm/sq. In some embodiments, the conductive ink has a particle size of about 3 um to about 40 um.

In some embodiments, the solution further comprises a conductive additive. In some embodiments, the conductive additive comprises a nanocarbon. In some embodiments, the nanocarbon comprises carbon nanoparticles, carbon nanodots, carbon nanotubes, graphene nanoribbons, carbon nanofibers, nanographite, carbon onions, carbon nanocones, or any combination thereof. In some embodiments, the solution has a w/w concentration of the conductive additive of about 1% to about 40%. In some embodiments, the solution further comprises graphene. In some embodiments, the solution has w/w concentration of the graphene of about 5% to about 80%.

Methods of Printing Conductive Inks

Provided herein are methods of printing the conductive inks herein. In some embodiments, the method comprises depositing at most two layers of the conductive ink herein on a substrate and drying the ink on the substrate. In some embodiments, the method further comprises annealing the ink on the substrate. In some embodiments, the method comprises depositing at most 1, 2, 3, 4, 5, 6, 7, 8, 9 or 10 layers of the conductive ink herein on a substrate.

In some embodiments, depositing is performed by screen printing, flexographic printing, slot-die printing, knife-over edge coating, roll-to-roll coating, screen printing, gravure printing, spraying, dipping, or any combination thereof. The viscosities and surface tensions of the inks herein enable its deposition by a variety of such methods to produce a broad array of electronics components. Further the components and rheological properties of the inks herein enable the formation of durable, thermally stable, and chemically stable electrical components using any one or more of the methods described herein.

In some embodiments, the conductive inks are printed onto the substrate by a Meyers rod. A Meyer rod is a wire-covered metal bar used to apply a controlled and consistent thickness of ink onto a surface. Per below, the size of the Meyer rod dictates the wet thickness.

| Meyer rod size | Wet thickness (um) |
|---|---|
| 22 | 38.1 |
| 28 | 50.8 |
| 34 | 63.5 |
| 40 | 76.2 |
| 52 | 100 |

In some embodiments, the conductive inks herein are printed onto a substrate with a wet thickness, wherein the wet thickness is a maximum, minimum, or average thickness of the ink applied to the substrate. In some embodiments, the substrate comprises the substrate comprises mica, glass, silicon, glass, metal, plastic, fabric, graphite sheets, gold, or any combination thereof. In some embodiments, the plastic comprises PET, HDPE, LDPE, PTFE, Kapton, or any combination thereof. In some embodiments, the metal comprises copper, aluminum, steel, platinum, or any combination thereof. In some embodiments, the printed conductive ink has a resistance of about 300 ohm/sq to about 80,000 ohm/sq. In some embodiments, the ink is deposited on the substrate with a line width of about 150 um to about 3,000 um.

In some embodiments, the ink is dried at a temperature of about 100° C. to about 180° C. In some embodiments, the ink is dried at a temperature of about 100° ° C. to about 110° C., about 100° ° C. to about 120° C., about 100° C. to about 130° C., about 100° C. to about 140° C., about 100° C. to about 150° C., about 100° C. to about 160° C., about 100° C. to about 170° C., about 100° C. to about 180° C., about 110° C. to about 120° C., about 110° C. to about 130° C., about 110° C. to about 140° C., about 110° C. to about 150° C., about 110° C. to about 160° C., about 110° C. to about 170° C., about 110° C. to about 180° ° C., about 120° C. to about 130° C., about 120° C. to about 140° C., about 120° C. to about 150° C., about 120° C. to about 160° C., about 120° C. to about 170° C., about 120° ° C. to about 180° C., about 130° ° C. to about 140° C., about 130° C. to about 150° C., about 130° ° C. to about 160° C., about 130° C. to about 170° C., about 130° C. to about 180° C., about 140° ° C. to about 150° C., about 140° C. to about 160° C., about 140° C. to about 170° C., about 140° ° C. to about 180° C., about 150° C. to about 160° C., about 150° C. to about 170° C., about 150° ° C. to about 180° C., about 160° C. to about 170° C., about 160° C. to about 180° C., or about 170° ° C. to about 180° C., including increments therein. In some embodiments, the ink is dried at a temperature of about 100° C., about 110° C., about 120° C., about 130° C., about 140° C., about 150° ° C., about 160° C., about 170° C., or about 180° C. In some embodiments, the ink is dried at a temperature of at least about 100° C., about 110° C., about 120° C., about 130° C., about 140° ° C., about 150° C., about 160° C., or about 170° C. In some embodiments, the ink is dried at a temperature of at most about 110° C., about 120° C., about 130° C., about 140° C., about 150° C., about 160° C., about 170° C., or about 180° C.

In some embodiments, the ink is dried for a period of time of about 10 minutes to about 60 minutes. In some embodiments, the ink is dried for a period of time of about 10 minutes to about 15 minutes, about 10 minutes to about 20 minutes, about 10 minutes to about 25 minutes, about 10 minutes to about 30 minutes, about 10 minutes to about 35 minutes, about 10 minutes to about 40 minutes, about 10 minutes to about 45 minutes, about 10 minutes to about 50 minutes, about 10 minutes to about 55 minutes, about 10 minutes to about 60 minutes, about 15 minutes to about 20 minutes, about 15 minutes to about 25 minutes, about 15 minutes to about 30 minutes, about 15 minutes to about 35 minutes, about 15 minutes to about 40 minutes, about 15 minutes to about 45 minutes, about 15 minutes to about 50 minutes, about 15 minutes to about 55 minutes, about 15 minutes to about 60 minutes, about 20 minutes to about 25 minutes, about 20 minutes to about 30 minutes, about 20 minutes to about 35 minutes, about 20 minutes to about 40 minutes, about 20 minutes to about 45 minutes, about 20 minutes to about 50 minutes, about 20 minutes to about 55 minutes, about 20 minutes to about 60 minutes, about 25 minutes to about 30 minutes, about 25 minutes to about 35 minutes, about 25 minutes to about 40 minutes, about 25 minutes to about 45 minutes, about 25 minutes to about 50 minutes, about 25 minutes to about 55 minutes, about 25 minutes to about 60 minutes, about 30 minutes to about 35 minutes, about 30 minutes to about 40 minutes, about 30 minutes to about 45 minutes, about 30 minutes to about 50 minutes, about 30 minutes to about 55 minutes, about 30 minutes to about 60 minutes, about 35 minutes to about 40 minutes, about 35 minutes to about 45 minutes, about 35 minutes to about 50 minutes, about 35 minutes to about 55 minutes, about 35 minutes to about 60 minutes, about 40 minutes to about 45 minutes, about 40 minutes to about 50 minutes, about 40 minutes to about 55 minutes, about 40 minutes to about 60 minutes, about 45 minutes to about 50 minutes, about 45 minutes to about 55 minutes, about 45 minutes to about 60 minutes, about 50 minutes to about 55 minutes, about 50 minutes to about 60 minutes, or about 55 minutes to about 60 minutes, including increments therein. In some embodiments, the ink is dried for a period of time of about 10 minutes, about 15 minutes, about 20 minutes, about 25 minutes, about 30 minutes, about 35 minutes, about 40 minutes, about 45 minutes, about 50 minutes, about 55 minutes, or about 60 minutes. In some embodiments, the ink is dried for a period of time of at least about 10 minutes, about 15 minutes, about 20 minutes, about 25 minutes, about 30 minutes, about 35 minutes, about 40 minutes, about 45 minutes, about 50 minutes, or about 55 minutes. In some embodiments, the ink is dried for a period of time of at most about 15 minutes, about 20 minutes, about 25 minutes, about 30 minutes, about 35 minutes, about 40 minutes, about 45 minutes, about 50 minutes, about 55 minutes, or about 60 minutes.

In some embodiments, the conductive inks described herein are printed using only as single pass, and produce a single layer of reduced graphene oxide on the surface of the substrate coated with the conductive ink. In some embodiments, the single pass printing produces a substrate coated with conductive ink, wherein the conductive surface resulting from the single pass printing process produces a conductive surface characterized by: at least about 90% of the graphene sheets consist of a single layer; a graphene w/w concentration of about 0.25% to about 5%; the graphene sheets have an oxygen content of at most about 6%; a resistance when dry of about 1,000 ohm/sq to about 5,000 ohm/sq. In some embodiments, the single pass printing produces a substrate coated with conductive ink, wherein the conductive surface resulting from the single pass printing process produces a conductive surface characterized by: wherein the graphene sheets consist of a single layer; a graphene w/w concentration of about 0.25% to about 5%; the graphene sheets have an oxygen content of at most about 6%; a resistance when dry of about 1,000 ohm/sq to about 5,000 ohm/sq.

In some embodiments, the substrate upon which the conductive inks are printed includes: silicon wafers, glass, Kapton tape, polyamide, PET, mica, silicon wafer, ITO glass, polyethylene sheets, Teflon, acrylic, polymers, plastics, graphite sheets, gold coated Kapton, aluminum, copper, metals, current collectors, metallic current collectors, non-metallic current collectors, paper, but the present disclosure is not limited to these materials, and may include any other suitable materials.

Reduced Graphene Oxide

The reduced graphene oxide (rGO) used to form the conductive inks herein can be easily dispersed and processed from a wide range of solvents and enables conductive inks with tunable electronic and mechanical properties for a wide range of applications.

Figure 20A:
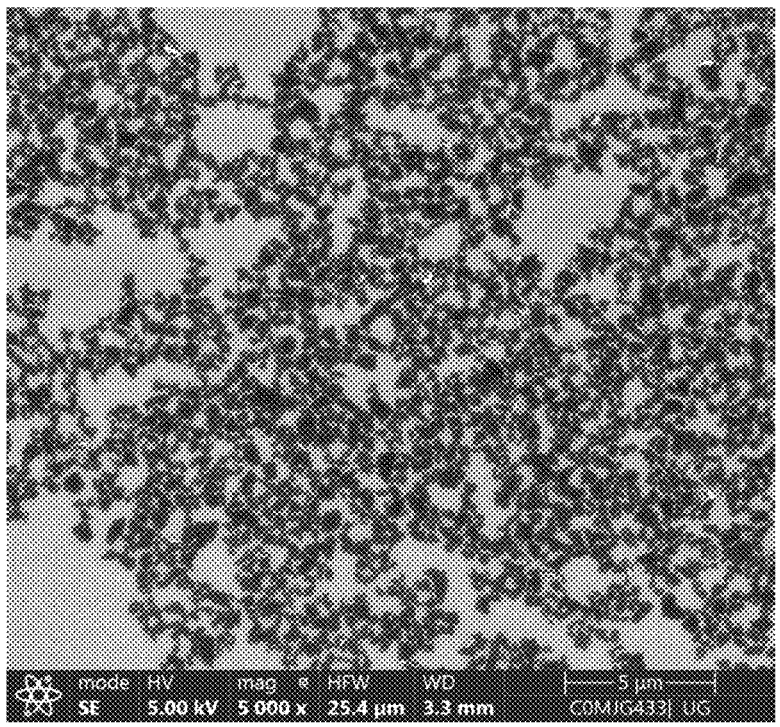
FIG. 20A is a first Scanning Electron Microscope (SEM) image of exemplary reduced graphene oxide sheets, per one or more embodiments, herein.
Figure 20B:
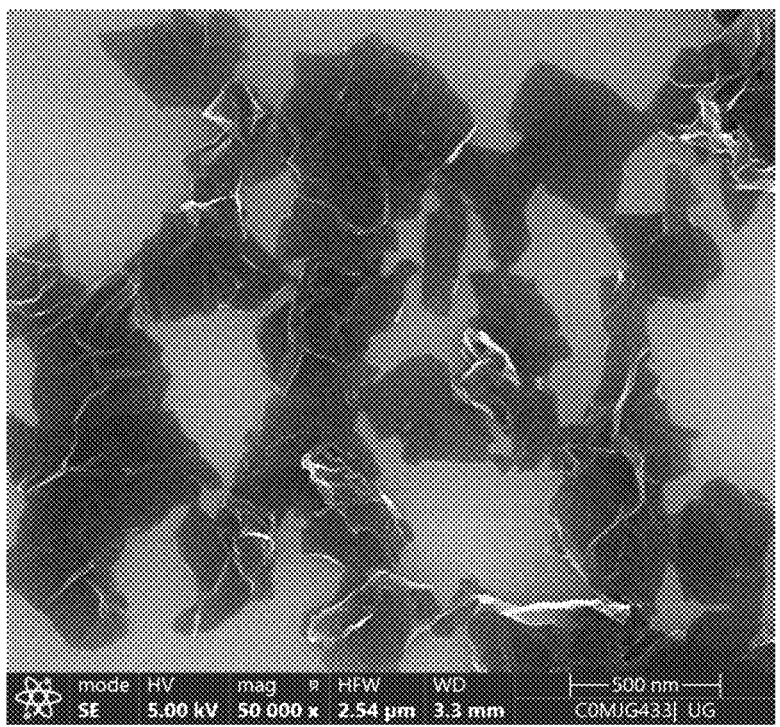
FIG. 20B is a second SEM image of exemplary reduced graphene oxide sheets, per one or more embodiments, herein.
Figure 21A:
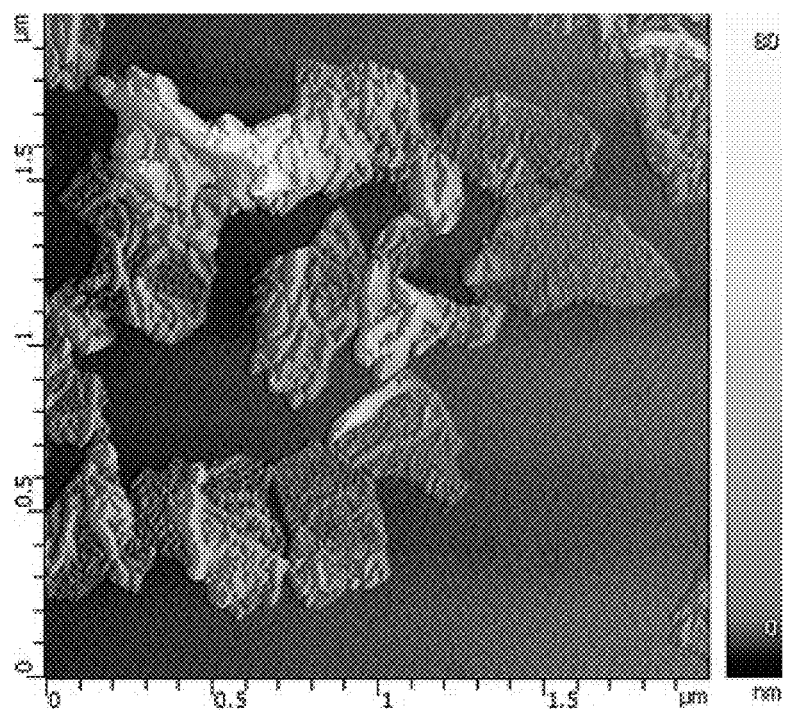
FIG. 21A is a first Atomic Force Microscope (AFM) image of exemplary reduced graphene oxide sheets, per one or more embodiments, herein.
Figure 21B:
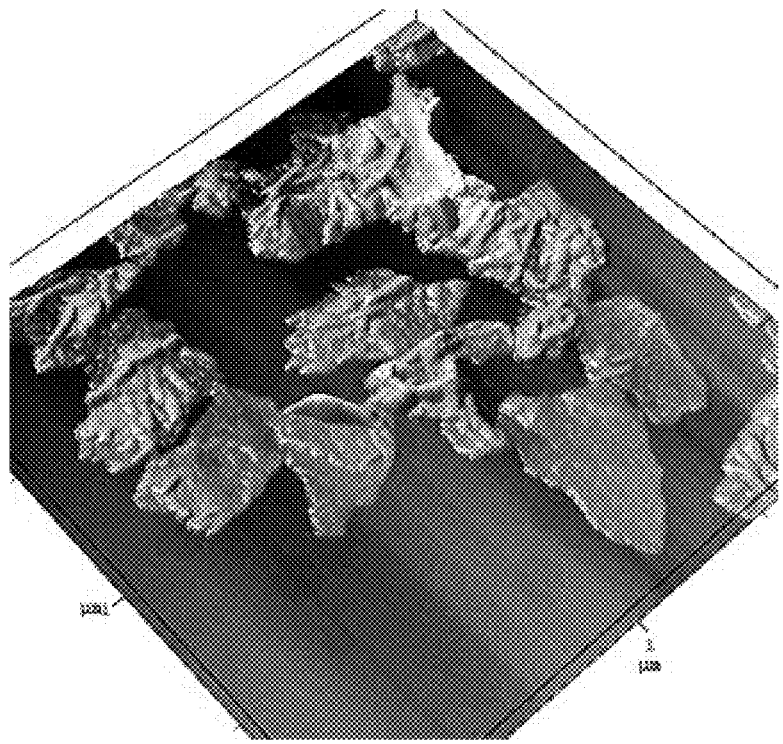
FIG. 21B is a second AFM image of exemplary reduced graphene oxide sheets, per one or more embodiments, herein.

FIG. 20A is a first Scanning Electron Microscope (SEM) image of exemplary rGO sheets. FIG. 20B is a second SEM image of exemplary rGO sheets. FIG. 21A is a first Atomic Force Microscope (AFM) image of exemplary rGO sheets. FIG. 21B is a second AFM image of exemplary rGO sheets.

In some embodiments, the rGO sheets have a dendritic morphology having a large perimeter length. In some embodiments, the rGO has a morphology comprising a nanoplate, a nanosheet, a nanoparticle, a nanoflake, a nanoplatelet, or any combination thereof.

In some embodiments, the rGO is a single layer of rGO. In some embodiments, the rGO sheets are flakes having a single wrinkled layer. In some embodiments, large wrinkles and ridges in the basal planes of the graphene nanosheets prevents the collapse and restacking of graphene sheets from van der Waals interactions.

In some embodiments, the rGO comprises 2, 3, 4, 5, 6, 7, 8, 9, 10, or more layers. In some embodiments, the rGO comprises a plurality of layers forming interlayer pores therebetween. In some embodiments, the interlayer pores form a continuous network. In some embodiments, one or more of the interlayer pores are closed. In some embodiments, one or more of the interlayer pores are defined by 2, 3, 4, 5, 6, 7, 8, 9, 10, or more layers. In some embodiments, the layers are interconnected. In some embodiments, one or more of the layers are corrugated. In some embodiments, one or more of the layers have a wrinkle. In some embodiments, one or more of the layers have a crease. In some embodiments, the plurality of layers form an accordion-like structure. In some embodiments, the plurality of layers form an foam-like structure. In some embodiments, the plurality of layers in the rGO are generally parallel. In some embodiments, the layers are not stacked. The large size of the interlayer spaces shown therein enable the high surface area and ion diffusion rate within dried inks made thereof.

In some embodiments, the rGO sheets have a size ranging from about 1 μm to about 5 μm. In some embodiments, the rGO sheets have a size ranging from about 0.1 μm to about 1 μm, with a median of about 0.5 μm. In some embodiments, the rGO sheets have a size of at least about 0.1 μm, 0.25 μm, 0.5 μm, 0.75 μm, 1 μm, 1.25 μm, 1.5 μm, 2 μm, 2.5 μm, or about 3 μm including increments therein. In some embodiments, the rGO sheets have a size of at most about 0.25 μm, 0.5 μm, 0.75 μm, 1 μm, 1.25 μm, 1.5 μm, 2 μm, 2.5 μm, 3 μm, or 3.5 μm, including increments therein In some embodiments, the size of the rGO sheets is measured as a mean particle size or a median particle size. In some embodiments, the size of the rGO sheets is measured as a length, a width, or a diagonal length. In some embodiments, the size (e.g., length, width, or diagonal length) is measured as an average. For example, multiple measurements may be taken and averaged to determine an average size.

In some embodiments, the rGO sheets have an maximum, minimum, or average thickness of about 0.5 nm to about 20 nm. In some embodiments, the rGO sheets have an maximum, minimum, or average thickness of about 0.5 nm to about 0.75 nm, about 0.5 nm to about 1 nm, about 0.5 nm to about 1.25 nm, about 0.5 nm to about 1.5 nm, about 0.5 nm to about 1.75 nm, about 0.5 nm to about 2 nm, about 0.5 nm to about 3 nm, about 0.5 nm to about 4 nm, about 0.5 nm to about 5 nm, about 0.5 nm to about 10 nm, about 0.5 nm to about 20 nm, about 0.75 nm to about 1 nm, about 0.75 nm to about 1.25 nm, about 0.75 nm to about 1.5 nm, about 0.75 nm to about 1.75 nm, about 0.75 nm to about 2 nm, about 0.75 nm to about 3 nm, about 0.75 nm to about 4 nm, about 0.75 nm to about 5 nm, about 0.75 nm to about 10 nm, about 0.75 nm to about 20 nm, about 1 nm to about 1.25 nm, about 1 nm to about 1.5 nm, about 1 nm to about 1.75 nm, about 1 nm to about 2 nm, about 1 nm to about 3 nm, about 1 nm to about 4 nm, about 1 nm to about 5 nm, about 1 nm to about 10 nm, about 1 nm to about 20 nm, about 1.25 nm to about 1.5 nm, about 1.25 nm to about 1.75 nm, about 1.25 nm to about 2 nm, about 1.25 nm to about 3 nm, about 1.25 nm to about 4 nm, about 1.25 nm to about 5 nm, about 1.25 nm to about 10 nm, about 1.25 nm to about 20 nm, about 1.5 nm to about 1.75 nm, about 1.5 nm to about 2 nm, about 1.5 nm to about 3 nm, about 1.5 nm to about 4 nm, about 1.5 nm to about 5 nm, about 1.5 nm to about 10 nm, about 1.5 nm to about 20 nm, about 1.75 nm to about 2 nm, about 1.75 nm to about 3 nm, about 1.75 nm to about 4 nm, about 1.75 nm to about 5 nm, about 1.75 nm to about 10 nm, about 1.75 nm to about 20 nm, about 2 nm to about 3 nm, about 2 nm to about 4 nm, about 2 nm to about 5 nm, about 2 nm to about 10 nm, about 2 nm to about 20 nm, about 3 nm to about 4 nm, about 3 nm to about 5 nm, about 3 nm to about 10 nm, about 3 nm to about 20 nm, about 4 nm to about 5 nm, about 4 nm to about 10 nm, about 4 nm to about 20 nm, about 5 nm to about 10 nm, about 5 nm to about 20 nm, or about 10 nm to about 20 nm, including increments therein. In some embodiments, the rGO sheets have an maximum, minimum, or average thickness of about 0.5 nm, about 0.75 nm, about 1 nm, about 1.25 nm, about 1.5 nm, about 1.75 nm, about 2 nm, about 3 nm, about 4 nm, about 5 nm, about 10 nm, or about 20 nm. In some embodiments, the rGO sheets have an maximum, minimum, or average thickness of at most about 0.75 nm, about 1 nm, about 1.25 nm, about 1.5 nm, about 1.75 nm, about 2 nm, about 3 nm, about 4 nm, about 5 nm, about 10 nm, or about 20 nm.

In some embodiments, the small height of the rGO sheets greatly increases its surface area and minimizes restacking. In some embodiments, the oxygen-containing functionalities of the rGO sheets herein enables its formation of an ink with a polar solvent.

Methods of Forming Reduced Graphene Oxide

In some embodiments, graphene comprises reduced graphene oxide (rGO) or activated reduced graphene oxide (ArGO). In some embodiments, the rGO, the ArGO, or both are thermally reduced. In some embodiments, the rGO, the ArGO, or both are not chemically reduced. In some embodiments, the thermal reduction lowers the oxygen content of the rGO, the ArGO, or both.

In some embodiments, the graphene oxide is activated to form activated graphene oxide (AGO) by a method comprising: (a) heating a first solution comprising an etchant and a graphene oxide solution; (b) cooling the first solution; (c) filtering and washing the first solution; and (d) spray drying the first solution. Graphene oxide activation can be used to create in-plane defects within individual graphene oxide sheets. The number and/or size of these defects in the sheets can be modulated through this activation step, for example, by modulating the reaction temperature and/or w/w concentration of etchant. Alternative mechanisms to spray drying can be used to dry the first solution in order to obtain the graphene oxide sheets, for example, air drying, heating, freeze drying, and vacuum drying.

In some embodiments, the first solution has a w/w concentration of graphene oxide of about 1 mg/ml to about 20 mg/ml. In some embodiments, the first solution has a w/w concentration of graphene oxide of at least about 1 mg/ml, 2 mg/ml, 3 mg/ml, 4 mg/ml, 6 mg/ml, 8 mg/ml, 10 mg/ml, 12 mg/ml, 14 mg/ml, 16 mg/ml, 18 mg/ml, or more, including increments therein. In some embodiments, the first solution has a w/w concentration of graphene oxide of at most about 2 mg/ml, 3 mg/ml, 4 mg/ml, 6 mg/ml, 8 mg/ml, 10 mg/ml, 12 mg/ml, 14 mg/ml, 16 mg/ml, 18 mg/ml, 20 mg/ml, or more, including increments therein. In some embodiments, the first solution has a w/w concentration by volume of the etchant of about 60% to about 98%. In some embodiments, the first solution has a w/w concentration by volume of the etchant of at least about 60%, 65%, 70%, 75%, 80%, 85%, 90%, 95%, or more, including increments therein. In some embodiments, the first solution has a w/w concentration by volume of the etchant of at most about 65%, 70%, 75%, 80%, 85%, 90%, 95%, 98%, or more, including increments therein. In some embodiments, the w/w concentration by volume of the etchant in the first solution dictates a size and/or density of the defects in the graphene sheets. In some embodiments, the w/w concentrations of the graphene oxide, the etchant or both affect the oxygen content of the AGO.

In some embodiments, the first solution is heated to a temperature of about 60° C. to about 120° C. In some embodiments, the first solution is heated to a temperature of at least about 60° C., 70° C., 80° C., 90° C., 100° C., 110° C., or more, including increments therein. In some embodiments, the first solution is heated to a temperature of at most about 70° C., 80° C., 90° C., 100° C., 110° C., 120° C. or more, including increments therein. In some embodiments, the first solution is cooled after the heating step. In some embodiments, the first solution is cooled to a temperature of about 70° ° C. to about 90° C. In some embodiments, the first solution is cooled to a temperature of at least about 70° C., 75° C., 80° C., 85° C., or more including increments therein. In some embodiments, the first solution is cooled to a temperature of at most about 75° C., 80° C., 85° C., 90° C., or more including increments therein. In some embodiments, the heating and/or cooling temperature affect the water content and thus the oxygen content of the AGO.

In some embodiments, filtering the first solution is performed with a filter having a mesh size of about 0.5 µm to about 3 µm. In some embodiments, filtering the first solution is performed with a filter having a mesh size of at least about 0.5 µm, 1 µm, 1.5 µm, 2 µm, 2.5 µm, or more, including increments therein. In some embodiments, filtering the first solution is performed with a filter having a mesh size of at most about 1 µm, 1.5 µm, 2 µm, 2.5 µm, 3 µm, or more, including increments therein. In some embodiments, the filter comprises two or more filtering layers. In some embodiments, the filter comprises at least 1, 2, 3, 4, 5, 6, 7, 8, 9, or 10 filter layers. In some embodiments, the at least one mesh filter layer is metal. In some embodiments, the filter comprises a vacuum filter. In some embodiments, the vacuum filter comprises at least one spray bar assembly positioned to dispense at least one of the first solution and a wash liquid onto the filter. In some embodiments, the vacuum filter comprises a vacuum source configured to apply negative pressure to the filter to enhance filtration. In some embodiments, the vacuum filter comprises a pH sensor for measuring a pH of the first solution. In some embodiments, the filtered and washed first solution has a pH of about 1 to about 5. In some embodiments, the filtered and washed first solution has a pH of at least about 1, 1.5, 2, 2.5, 3, 3.5, 4, 4.5, or more including increments therein. In some embodiments, the filtered and washed first solution has a pH of at most about 1.5, 2, 2.5, 3, 3.5, 4, 4.5, 5, or more including increments therein. In some embodiments, the pH of the first solution, the filtration methods, or both dictate a size and/or density of the defects in the graphene sheets In some embodiments, the spray drying is performed by passing the first solution through a spray drying nozzle. In some embodiments, the spray drying nozzle is an ultrasonic nozzle, wherein the first solution passes therethrough at a velocity greater than the speed of sound in the first solution. In some embodiments, the spray drying nozzle is a subsonic nozzle, wherein the first solution passes therethrough at a velocity less than the speed of sound in the first solution. In some embodiments, the spray drying nozzle is a plain-orifice nozzle which atomizes the first solution. In some embodiments, the spray drying nozzle has a pressure-swirl spray to reduce a particle size of the first solution. In some embodiments, the spray drying nozzle is a single-effect nozzle. In some embodiments, the spray drying nozzle is multiple-effect nozzle. In some embodiments, the spray drying nozzle comprises an atomizer.

In some embodiments, the spray drying is performed at a flow rate of about 1 ml/hr to about 6,000 ml/hr. In some embodiments, the spray drying is performed at a flow rate of at least about 1 ml/hr, 5 ml/hr, 10 ml/hr, 50 ml/hr, 100 ml/hr, 500 ml/hr, 1,000 ml/hr, 2,000 ml/hr, 4,000 ml/hr, or more including increments therein. In some embodiments, the spray drying is performed at a flow rate of at most about 5 ml/hr, 10 ml/hr, 50 ml/hr, 100 ml/hr, 500 ml/hr, 1,000 ml/hr, 2,000 ml/hr, 4,000 ml/hr, 6,000 ml/hr, or more including increments therein. In some embodiments, the spray drying is performed at a pressure of about 10 psi to about 50 psi. In some embodiments, the spray drying is performed at a pressure of at least about 10 psi, 15 psi, 20 psi, 25 psi, 30 psi, 35 psi, 40 psi, 45 psi, or more including increments therein. In some embodiments, the spray drying is performed at a pressure of at most about 15 psi, 20 psi, 25 psi, 30 psi, 35 psi, 40 psi, 45 psi, 50 psi, or more including increments therein. In some embodiments, the spray drying is performed with an inlet temperature of about 120° C. to about 200° ° C. In some embodiments, the spray drying is performed with an inlet temperature of at least about 120° C., 130° C., 140° C., 150° C., 160° C., 170° C., 180° C., 190° C., or more including increments therein. In some embodiments, the spray drying is performed with an inlet temperature of at most about 130° C., 140° C., 150° C., 160° C., 170° C., 180° C., 190° C., 200° C., or more including increments therein. In some embodiments, an outlet temperature of the spray drying is about 30° C. to about 80° C. In some embodiments, an outlet temperature of the spray drying is at least about 30° C., 40° C., 50° C., 60° C., 70° ° C., or more including increments therein. In some embodiments, an outlet temperature of the spray drying is at most about 40° C., 50° C., 60° C., 70° C., 80° C., or more including increments therein.

In some embodiments, heating the first solution comprises stirring the first solution. In some embodiments, the annealing is performed in air, nitrogen, argon, or any combination thereof. In some embodiments, the first solution is cooled by adding ice to the first solution. In some embodiments, the etchant comprises hydrogen peroxide, bromine, iodine, potassium permanganate, potassium chlorate, potassium dichromate, manganese oxide, iron(iii) chloride, sodium peroxide, potassium persulfate, hypochlorous acid, or any combination thereof.

While graphene may be difficult to disperse in a solvent medium, the oxygen-containing functionalities of the AGO herein enables its dispersion in a polar solvent. In some embodiments, the AGO herein is dispersed in an organic or aqueous solvent (e.g. n-methyl-2-pyrrolidone (NMP), dimethylformamide (DMF), tetrahydrofuran (THF), chloroform and dichlorobenzene) by adding a surfactant and applying a mechanical force by, for example, as shear mixing, ultrasonic agitation, ball milling, or any combination thereof.

In some embodiments, the graphene oxide is reduced to form rGO. In some embodiments, the activated graphene oxide is reduced to form ArGO. For example, the activated graphene oxide formed from the activation steps can be subjected to a chemical reduction step to obtain ArGO.

In some embodiments, chemical reduction to form the rGO comprises: heating a second solution comprising the AGO, a strong base and a reducing agent to the second solution, and optionally filtering and washing the reducing agent and the second solution. In some embodiments, the strong base comprises sodium hydroxide, ammonium hydroxide, potassium hydroxide, urea, melamine, sodium carbonate, or any combination thereof. In some embodiments, the reducing agent comprises ascorbic acid, hydrazine, sodium borohydride, pyrogallol, lithium aluminum hydride, ammonia borane, thiourea dioxide, hydroiodic acid, hydrogen bromide, ethanethiol-aluminum chloride, Lawesson's reagent, sodium bisulfite, sodium dithionite, aluminum, iron, zinc, magnesium, or any combination thereof.

In some embodiments, reducing the AGO comprises annealing the spray dried first solution. In some embodiments, the annealing is performed by a flame torch, a heating strip, a heating coil, or any combination thereof. In some embodiments, the annealing is performed in air, nitrogen, argon, or any combination thereof. In some embodiments, the annealing is performed at a temperature of less than about 3,000° C., 2,500° C., 2,000° C., including increments therein. In some embodiments, reducing the AGO does not comprise annealing the spray dried first solution. In some embodiments, the annealing is performed at a temperature of about 100 C to about 1,500° C. In some embodiments, the annealing is performed at a temperature of at least about 100° C., 110° C., 150° C., 250° C., 500° C., 750° C., 1,000° C., or 1,250° C., including increments therein. In some embodiments, the annealing is performed at a temperature of at most about 250° C., 500° C., 750° C., 1,000° ° C., or 1,250° C., or 1,500° C., including increments therein. In some embodiments, annealing occurs for a period of time of about 1 minute to about 1,500 minutes. In some embodiments, the annealing temperature, means, time, or any combination thereof affect the ignition, explosion, and expansion, and thus the morphology, of the AGO. In some embodiments, reducing the AGO comprises an initial thermal expansion followed by annealing. The annealing step can improve the properties of the AGO such as surface area and conductivity. In some embodiments, annealing the activated graphene oxide removes oxygen functional groups therein. In some embodiments, annealing the activated graphene oxide removes oxygen functional groups therein by about 25% to about 75%. In some embodiments, removing the oxygen functional groups from the activated graphene oxide increases its conductivity. In some embodiments, removing the oxygen functional groups from the activated graphene oxide increases its conductivity by about 75% to about 125%. In some embodiments, annealing the activated graphene oxide increases its surface area. In some embodiments, annealing the activated graphene oxide increases its surface area by about 75% to about 125%. In one example, annealing the activated graphene oxide increases its surface area from about 350 m²/g to 700 m²/g, and reduces its oxygen content from about 30% to about 16% which increases its conductivity from about 50 S/m to about 100 S/m.

In some embodiments, the drying occurs for a period of time of about 3 minutes to about 60 minutes. In some embodiments, the drying occurs for a period of time of at least about 3 minutes, 5 minutes, 10 minutes, 20 minutes, 30 minutes, 40 minutes, 50 minutes, or more including increments therein. In some embodiments, the drying occurs for a period of time of at most about 5 minutes, 10 minutes, 20 minutes, 30 minutes, 40 minutes, 50 minutes, 60 minutes, or more including increments therein. In some embodiments, the second solution is heated to a temperature of about 60° ° C. to about 120° C. In some embodiments, the second solution is heated to a temperature of at least about 60° C., 70° C., 80° C., 90° C., 100° C., 110° C., or more including increments therein. In some embodiments, the second solution is heated to a temperature of at most about 70° C., 80° C., 90° C., 100° C., 110° C., 120° C., or more including increments therein. In some embodiments, filtering and washing the second solution occurs within a period of time after the addition of the reducing agent to the second solution of about 0.5 hours and 10 hours. In some embodiments, filtering and washing the second solution occurs when the second solution has a pH of about 8 to about 11.

In some embodiments, reducing the AGO comprises the methods of thermal reduction as described above to form the first ARGO, and microwaving the first ARGO to form a second ARGO. In some embodiments, the second ARGO has a reduced oxygen content compared to the first ARGO. In some embodiments, the microwaving occurs over a period of time of about 10 seconds to about 60 seconds. In some embodiments, the microwaving occurs at a power of about 500 W to about 2,000 W. In some embodiments, the microwaving occurs at a power of at least about 500 W, 750 W, 1,000 W, 1,250 W, 1,500 W, 1,750 W, or more, including increments therein. In some embodiments, the microwaving time, wattage, or both affect the ignition, explosion, and expansion, and thus the morphology, of the AGO.

Characterization of Printed Conductive Inks

Figure 14A:
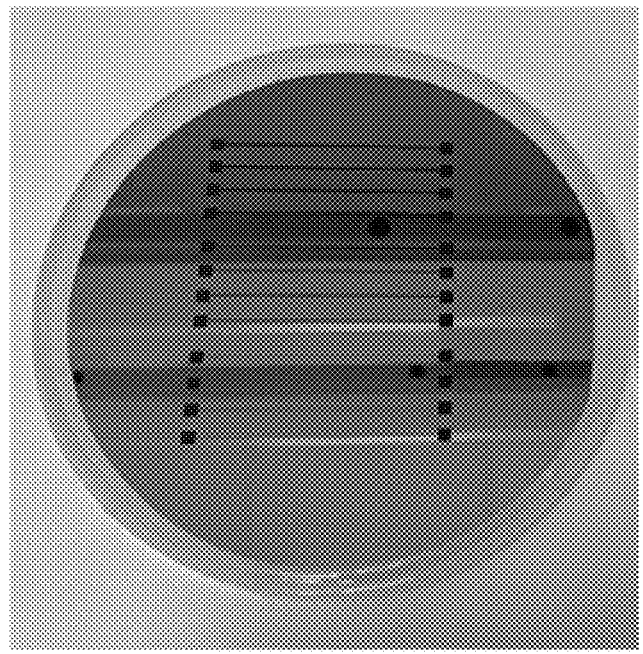
FIG. 14A is a photograph of an exemplary conductive ink screen printed onto a silicon wafer, per one or more embodiments, herein.
Figure 14B:
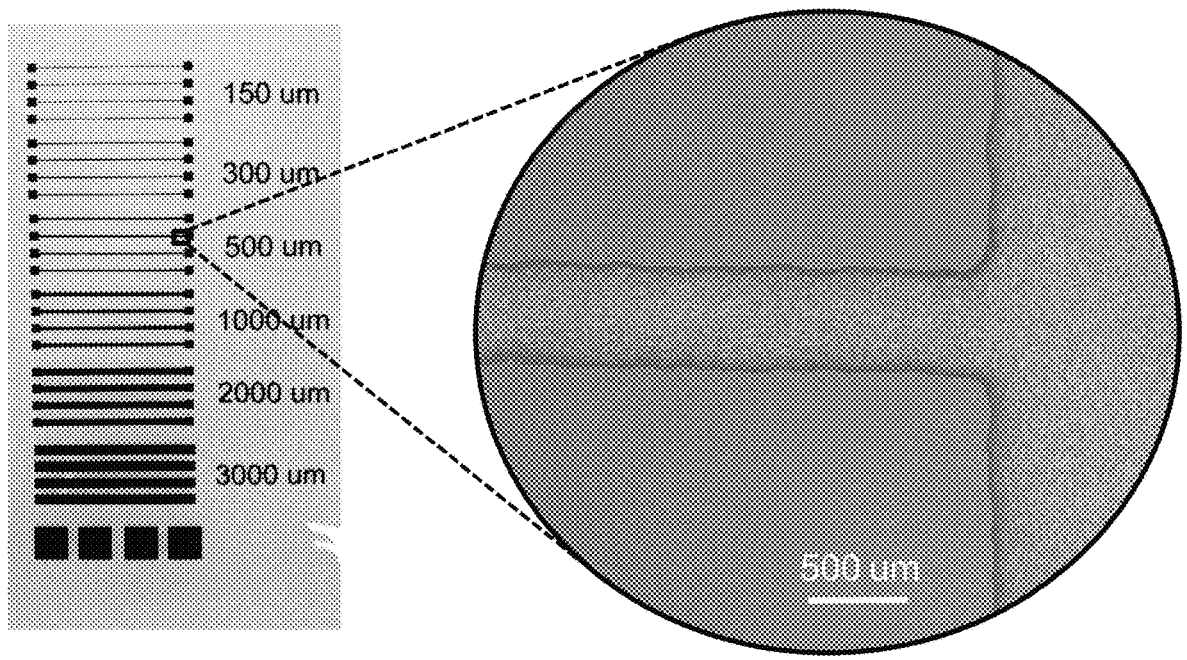
FIG. 14B shows a photograph of traces of different widths of the exemplary conductive ink screen printed onto a silicon wafer and a high magnification photograph of a trace, per one or more embodiments, herein.

FIGS. 14A and 14B show photographs of an exemplary conductive ink screen printed onto a silicon wafer with a Meyer rod. In some embodiments, as shown, ink traces having thickness of 150 um, 300 um, 500 um, 1,000 um, 2,000 um, and 3,000 um can be printed in one pass, without gaps or separation. As shown, the ink traces have a length of about 4 cm. While current conductive inks are less dispersible and form agglomerations that clog printers and dry inconsistently, the conductive inks herein enable consistent printing of conductive traces and other shapes even at small scales.

Figure 15A:
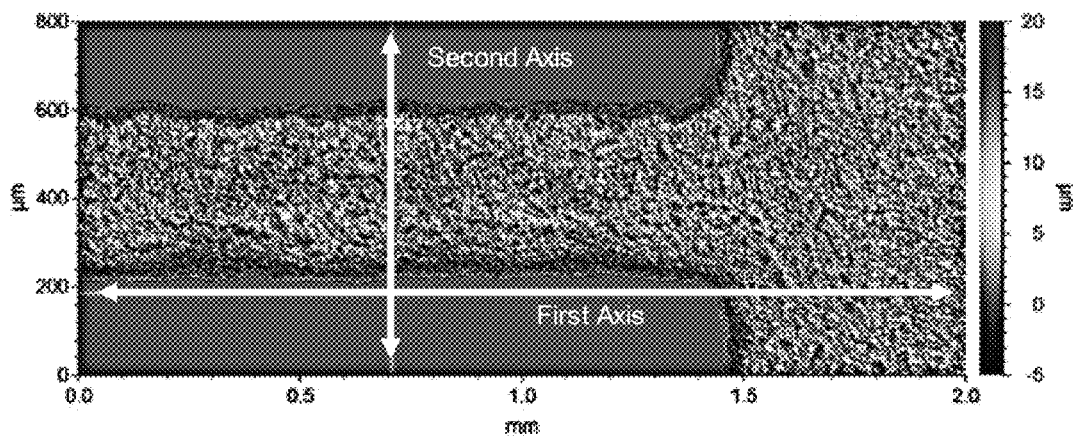
FIG. 15A is an optical profilometry image of the trace of FIG. 14A, per one or more embodiments, herein.
Figure 15B:
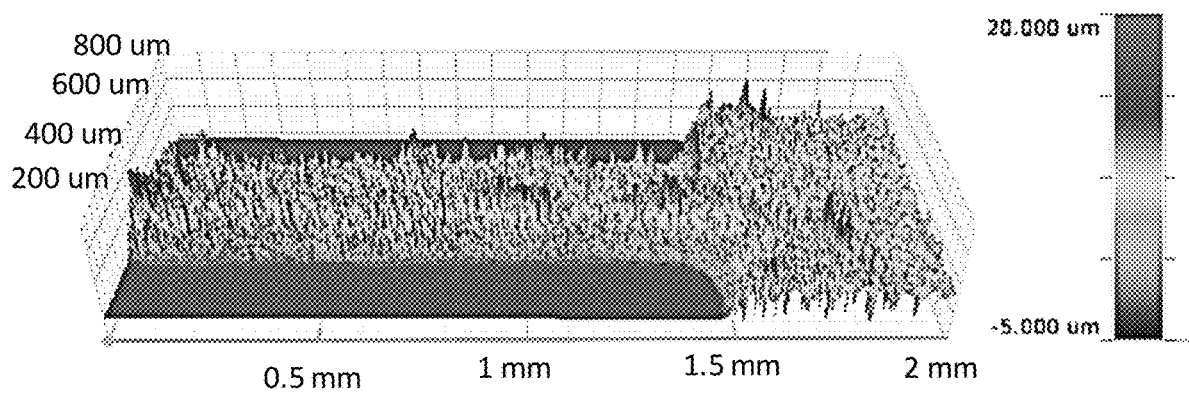
FIG. 15B is a three-dimensional rendering of the optical profilometry image of FIG. 15A, per one or more embodiments, herein.
Figure 16A:
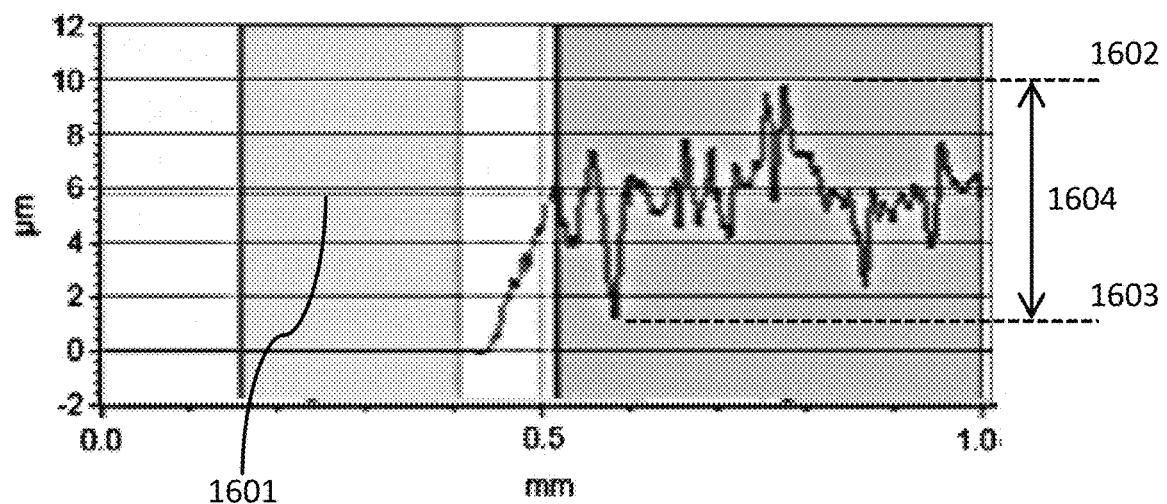
FIG. 16A is a graph of the height of optical profilometry image along a first axis of the trace of FIG. 15A, per one or more embodiments, herein.
Figure 16B:
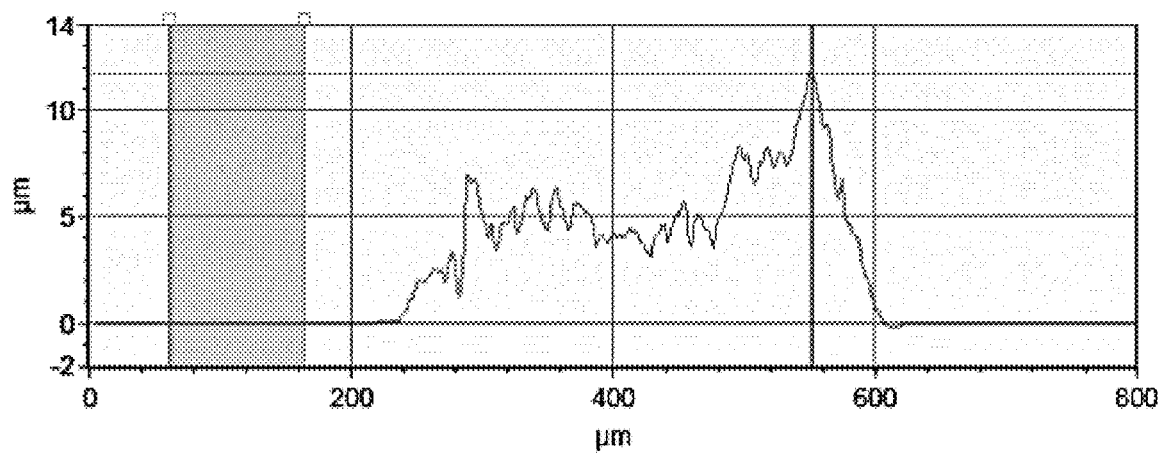
FIG. 16B is a graph of the height of optical profilometry image along a second axis of the trace of FIG. 15A, per one or more embodiments, herein.

FIG. 15A is an optical profilometry image of the trace of FIG. 14B. FIG. 15B is a three-dimensional rendering of the optical profilometry image of FIG. 15A. As shown therein, the traces printed with an exemplary conductive ink have straight and clean edges with a highly uniform cross-sectional profile. FIGS. 16A and 16B are graphs of the height of optical profilometry image along a first axis of the trace, and a second axis of the trace of FIG. 15A and FIG. 15B, respectively. From the data in FIGS. 15A-16B, the following roughness measurements can be calculated:

| Measurement | Abbreviation | Units | Value |
| --- | --- | --- | --- |
| Roughness Average | Sa | um | 1-2 |
| Root-Mean-Square Roughness | Sq | um | 1.5-2.5 |
| Maximum Height | Sp | um | 9-15 |
| Maximum Valley Depth | Sv | um | 3-8 |
| Maximum Peak Height | Sz | um | 15-25 |
| Skewness | Ssk | — | 0.05-0.1 |
| Kurtosis | Sku | — | 3.5-5 |
| Auto-Correlation Length | Sal | um | 20-40 |
| Texture Aspect Ratio | Str | ° | 0.65-0.85 |

FIG. 16A shows exemplary measurements for the Roughness Average (Sa) 1601, the Maximum Height (Sp) 1602, the Maximum Valley Depth (Sv) 1603, and the Maximum Peak Height (Sz) 1604. For a conductive ink printed with a thickness of T(x) across a set length (l) on a substrate, the roughness variables are calculated as $$S_a = \frac{1}{l} \int_0^l |T(x)| dx$$

$$S_q = \sqrt{\frac{1}{l} \int_0^l T(x)^2 dx}$$

$$S_p = \max T(x)$$

$$S_v = |\min T(x)|$$

$$S_z = S_p - S_v$$

$$S_{sk} = \frac{1}{l * R_q^3} \int_0^l T^3(x) dx$$

$$S_{ku} = \frac{1}{l * R_q^4} \int_0^l T^4(x) dx$$

In some embodiments, the printed exemplary conductive ink has a Kurtosis of about 3.5 to about 5. Kurtosis is a measure of the sharpness of the roughness profile, wherein a Kurtosis of 3 represents a roughness profile equivalent to a normal distribution curve, and wherein large Kurtosis values correlates with greater sharpness. In some embodiments, depositing is performed by coat screen printing and wherein a roughness of the dried ink is about 0.02 to about 0.15. In some embodiments, depositing is performed by coat screen printing, wherein a Kurtosis of the dried ink is about 2 to about 8. In some embodiments, depositing is performed by coat screen printing and wherein a texture aspect ratio of the dried ink is about 0.25° to about 1.5°.

Texture Aspect Ratio is a measure of the isotropy or uniformity of a predominant surface pattern or lay. Texture Aspect Ratio also represents a directionality of an otherwise even texture. A surface with a highly patterned texture has a Texture Aspect Ratio of 0, wherein a highly isotropic surface has a Texture Aspect Ratio of 1.

The Auto-Correlation Length (Sal) corresponds to a wavelength of a predominant surface pattern or lay. For example, a surface with a high Auto-Correlation Length (Sal) has a predominant surface pattern or lay with a low frequency and long wavelength, wherein a surface with a low Auto-Correlation Length (Sal) has a predominant surface pattern or lay with a high frequency and short wavelength.

Figure 17:
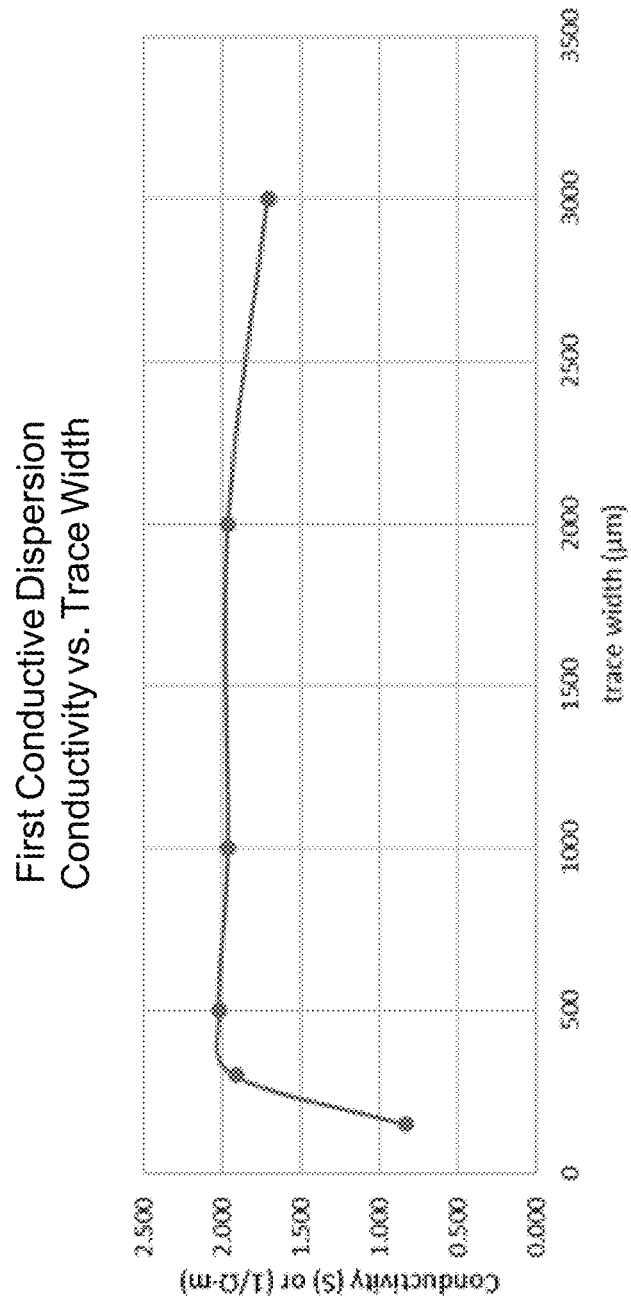
FIG. 17 is a graph of the conductivity vs the width of a trace formed with an exemplary conductive ink, per one or more embodiments, herein.

FIG. 17 is a graph of the conductivity vs the width of a trace formed with an exemplary conductive ink. As shown, traces having widths of 300 um to 3,000 um exhibit a high conductivity of about 2,000 S, and wherein trace widths of at least 150 um can be successfully printed.

Figure 18A:
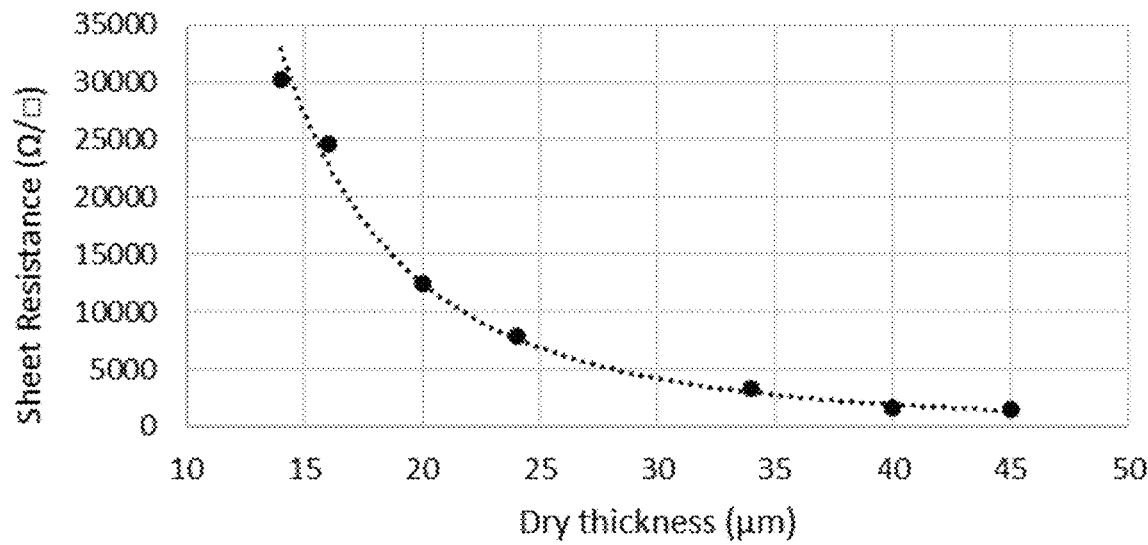
FIG. 18A is a graph of the dry thickness vs the sheet resistance of a trace formed with an exemplary conductive ink, per one or more embodiments, herein.
Figure 18B:
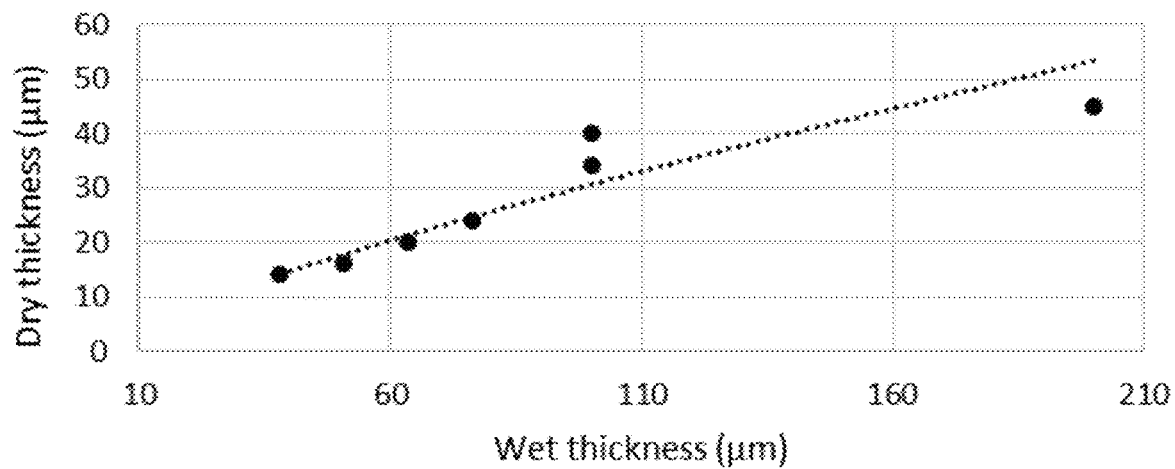
FIG. 18B is a graph of the wet thickness vs dry thickness of a trace formed with an exemplary conductive ink, per one or more embodiments, herein.

FIG. 18A is a graph of the dry thickness vs the sheet resistance of a trace formed with an exemplary conductive ink. FIG. 18B is a graph of the wet thickness vs dry thickness of a trace formed with an exemplary conductive ink.

Figure 19A:
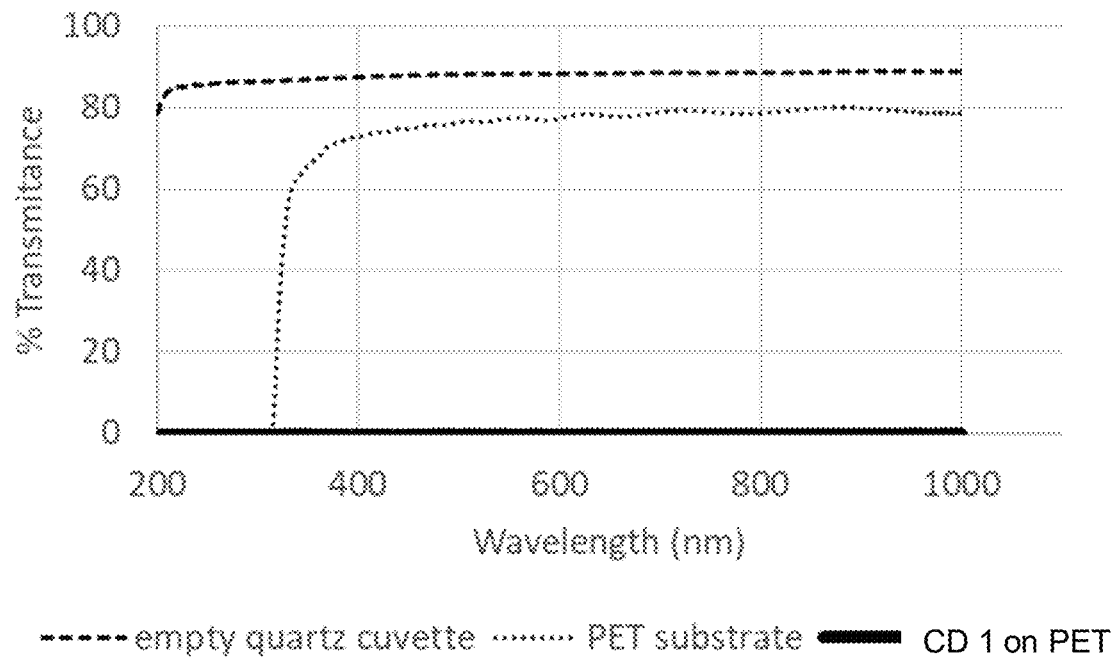
FIG. 19A is a graph of the wavelength transmittance of an exemplary trace formed with an exemplary conductive ink, per one or more embodiments, herein.
Figure 19B:
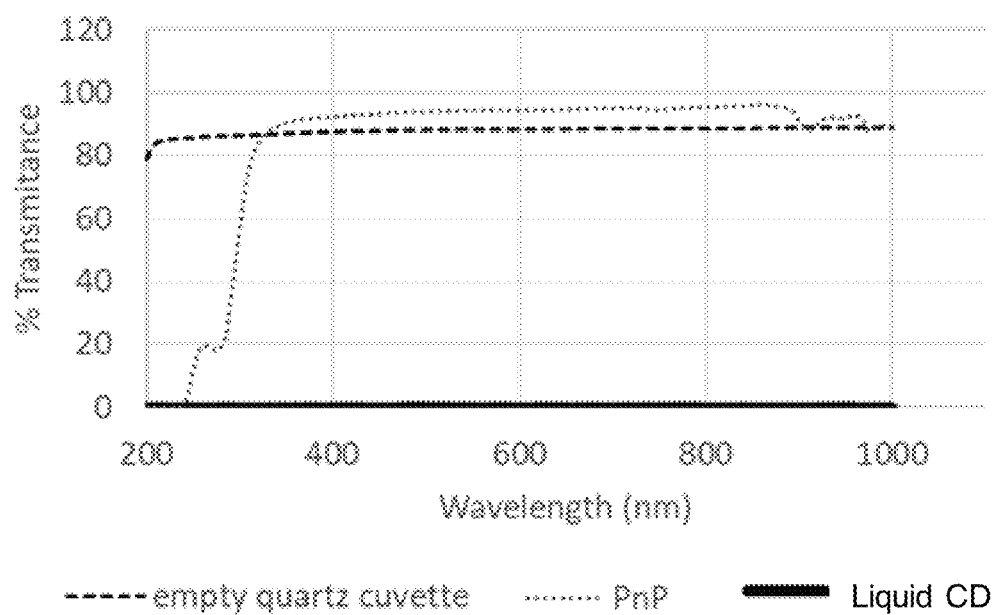
FIG. 19B is a graph of the wavelength transmittance of an exemplary conductive ink, per one or more embodiments, herein.

FIG. 19A is a graph of the wavelength transmittance of an exemplary trace formed with an exemplary conductive ink. FIG. 19B is a graph of the wavelength transmittance of an exemplary conductive ink. As seen therein transmission through the liquid ink and printed trace is approximately 0, wherein a maximum transmittance is 0.0092% and 0.0177% through the liquid ink and printed trace, respectively. In some embodiments, the conductive inks herein have a maximum transmittance of about 0.004% to about 0.015%. In some embodiments, the conductive inks herein have a maximum transmittance of at least about 0.004%. In some embodiments, the conductive inks herein, when printed and dried, have a maximum transmittance of about 0.01% to about 0.03%. In some embodiments, the conductive inks herein, when printed and dried, have a maximum transmittance of at least about 0.01%.

Terms and Definitions

Unless otherwise defined, all technical terms used herein have the same meaning as commonly understood by one of ordinary skill in the art to which this disclosure belongs.

As used herein, the term "single layer graphene" refers to graphene or reduced graphene oxide that consists of single sheets of graphene that are not aggregated into multi-layer graphene. Single sheets of graphene are separated from one another such that the 2-dimensional structured sheets are not stacked into multi-layer or graphite-like structures, but may still have partial physical contact (e.g. interconnected sheets that form a three-dimensional network). For example, single layer graphene may be formed by high efficiency exfoliation from graphite according to the methods disclosed herein.

As used herein, the singular forms "a," "an," and "the" include plural references unless the context clearly dictates otherwise. Any reference to "or" herein is intended to encompass "and/or" unless otherwise stated.

As used herein, the term "about" in some cases refers to an amount that is approximately the stated amount.

As used herein, the term "about" can refer to an amount that is near the stated amount by 10%, 5%, or 1%, including increments therein. Unless specifically stated otherwise, the term "about" refers to an amount that is greater or less than the stated percentage by 10%.

As used herein, the term "about" in reference to a percentage can refer to an amount that is greater or less the stated percentage by 10%, 5%, or 1%, including increments therein. Unless specifically stated otherwise, the term "about" in reference to a percentage refers to an amount that is greater or less than the stated percentage by 10%.

As used herein, the phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

As used herein, the term "solid content" refers to a percentage of a dispersion or ink remaining after being dried, wherein volatile solvent are vaporized.

EXAMPLES

The following illustrative examples are representative of embodiments, of the compositions and methods described herein and are not meant to be limiting in any way. Per below 6 exemplary inks are provided herein.

|  | Component |  | Ink 1 | Ink 2 | Ink 3 | Ink 4 | Ink 5 | Ink 6 |
|---|---|---|---|---|---|---|---|---|
| Graphene | Reduced graphene oxide | % | 1-2 | 0.25-1 | 1.5-2.5 | 0.2-0.5 | 0.2-0.5 | 0.3-1 |
| Binder | Polyvinylpyrrolidone | % | 25-35 | 15-25 | 15-25 | 15-25 | 15-25 | 15-25 |
| Stabilizer-1 | Polytetrahydrofuran | % | 1-3 | 1-3 | 1-3 | 1-3 | 1-3 | 1-3 |
| Stabilizer-2 | Diethylene Glycol |  | — | — | 15-25 | 15-25 | 15-25 | 15-25 |
| Solvent | Propylene glycol n-propyl ether | % | 65-85 | 70-80 | 50-60 | 50-60 | 20-30 | 40-50 |
| Conductive Additive | Carbon black | % | — | 4-5 | — | 2-9 | 2-8 | 2-7 |
| Graphite | Graphite | % | — | — | — | — | 30-40 | 5-15 |

Example 1—First Conductive Ink

Figure 2A:
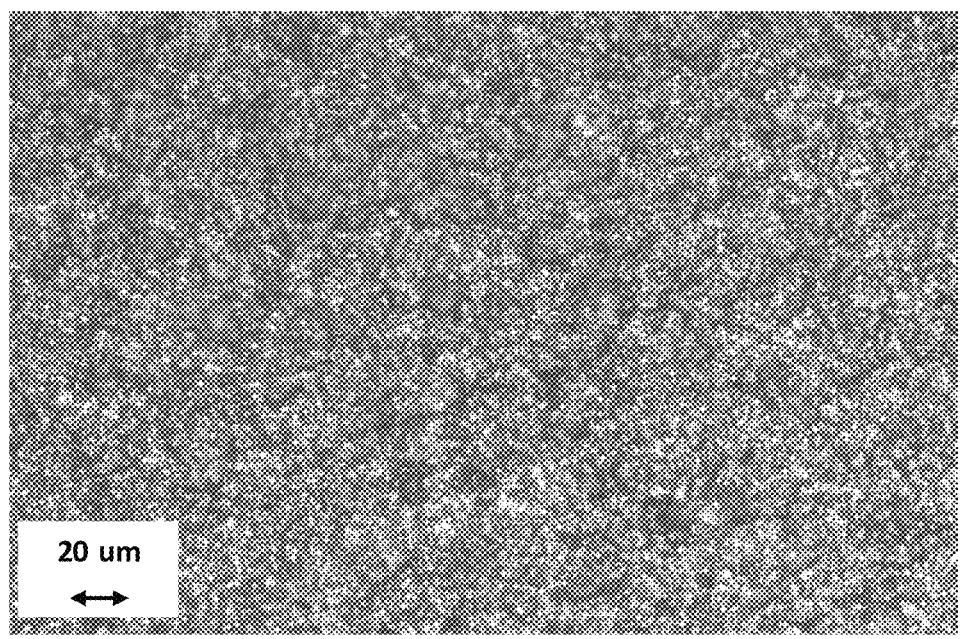
FIG. 2A is a first optical microscope image of an exemplary first conductive ink, per one or more embodiments, herein.
Figure 2B:
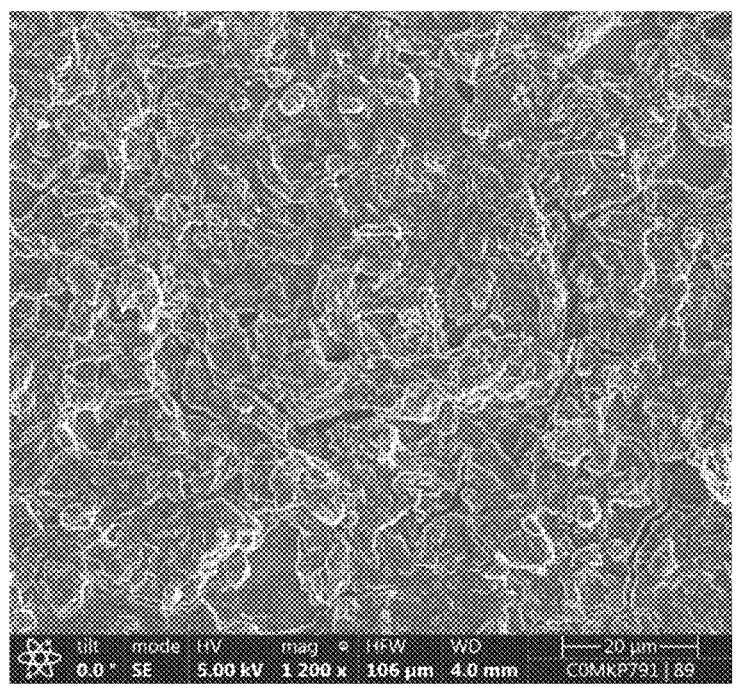
FIG. 2B is a second optical microscope image of an exemplary first conductive ink, per one or more embodiments, herein.

FIGS. 2A and 2B show optical microscope images of an exemplary first conductive ink. As shown therein, the first conductive ink is very stable and coats the substrate evenly to form a smooth surface without holes or shrinkage. Further as shown, the interaction between 2D graphene sheets and zero dimensional carbon nanoparticles produces a seamless carbon network with excellent electronic conductivity and reduced resistance.

Figure 3A:
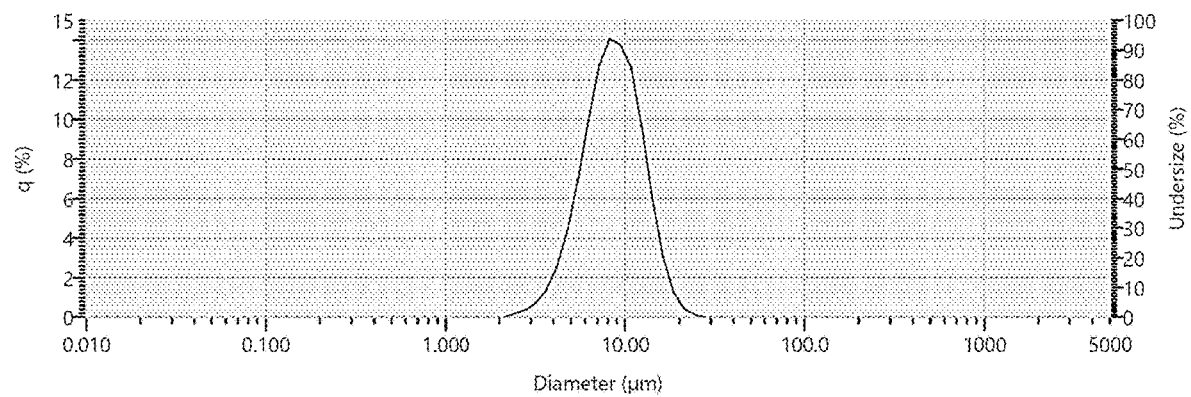
FIG. 3A is a particle size distribution of an exemplary first conductive ink, per one or more embodiments, herein.
Figure 3B:
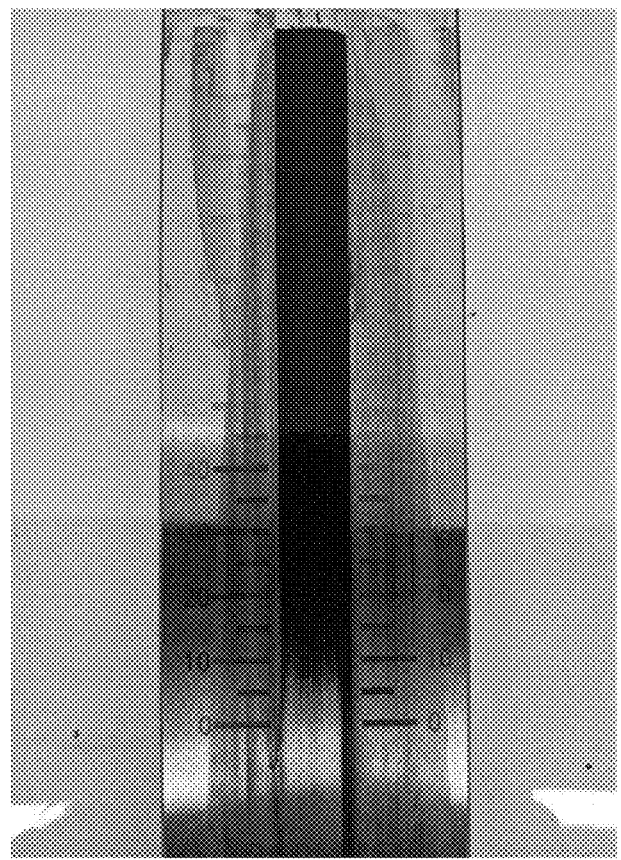
FIG. 3B is an image of an exemplary first conductive ink on a Hegman gauge, per one or more embodiments, herein.

FIG. 3A is a particle size distribution of an exemplary first conductive ink. FIG. 3B is an image of an exemplary first conductive ink on a Hegman gauge. As shown the exemplary first conductive ink has a mono-modal particle size distribution with a mean of about 9 um and a maximum of about 26 um, wherein 90% of the particles have a size of less than about 13.5 um.

Figure 4A:
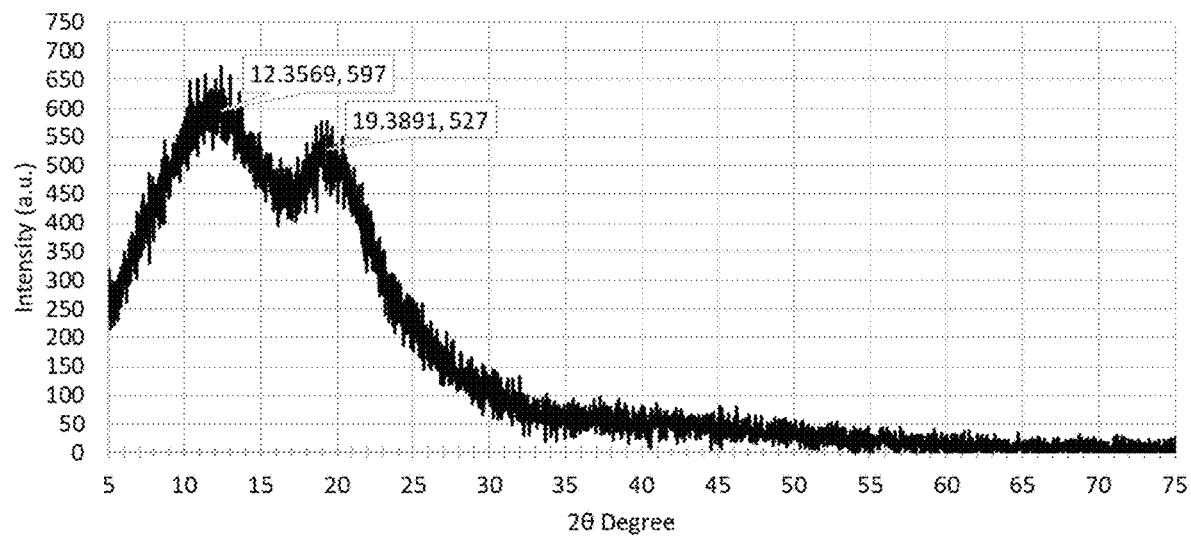
FIG. 4A is an X-ray Diffraction graph of an exemplary first conductive ink, per one or more embodiments, herein.
Figure 4B:
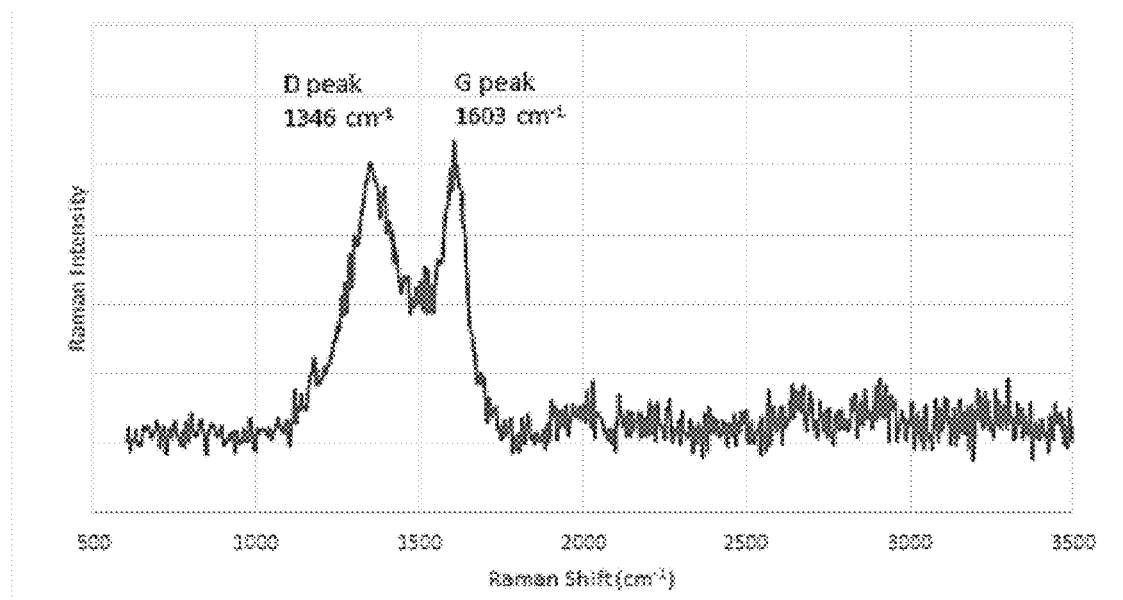
FIG. 4B is a Raman Spectroscopy graph of an exemplary first conductive ink, per one or more embodiments, herein.

FIG. 4A is an X-ray Diffraction graph of an exemplary first conductive ink coated on a substrate. Therein the two broad characteristic peaks at 2 theta of 12.3° and 19.4°, which correspond to d-values of 7.5 and 4.5° angstroms, respectively, are consistent with XRD charts of the binder. FIG. 4B is a Raman Spectroscopy graph of an exemplary first conductive ink printed on a substrate, wherein D and G bands at 1346 cm-1 and 1603 cm-1 respectively are characteristic for rGO.

Figure 5:
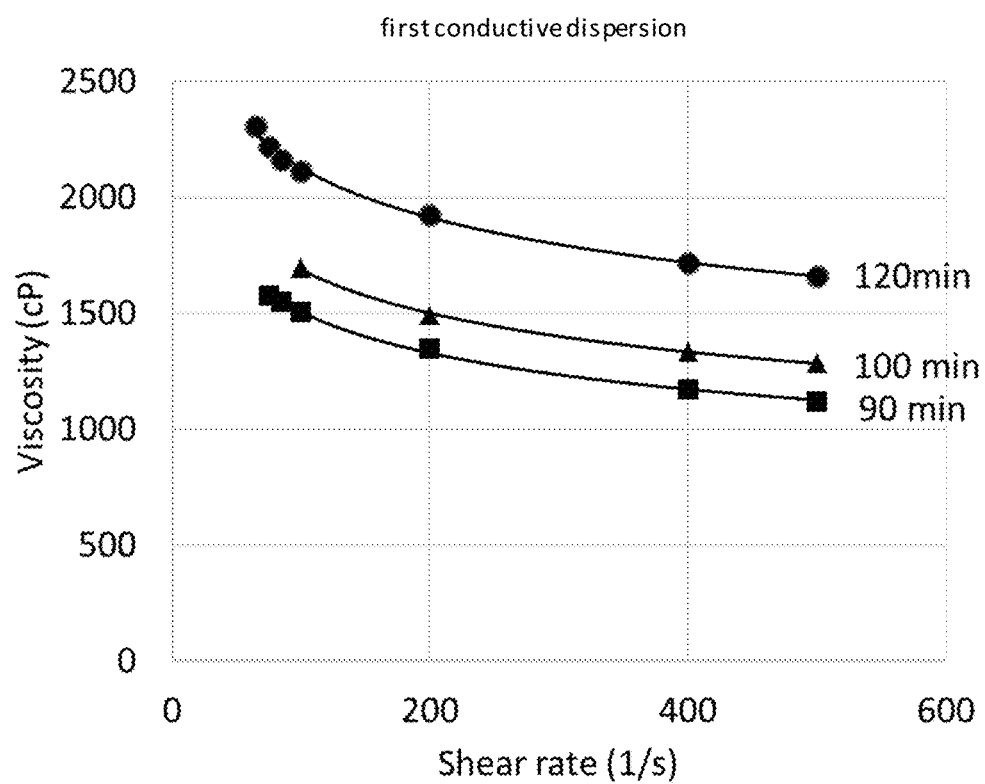
FIG. 5 is a shear rate vs. viscosity graph of an exemplary first conductive ink, per one or more embodiments, herein.

FIG. 5 is a shear rate vs. viscosity graph of an exemplary first conductive ink. As shown, the viscosity of the first conductive ink can be tuned by adjusting the shear mixing time, wherein longer shearing times reduce viscosity.

Figure 6A:
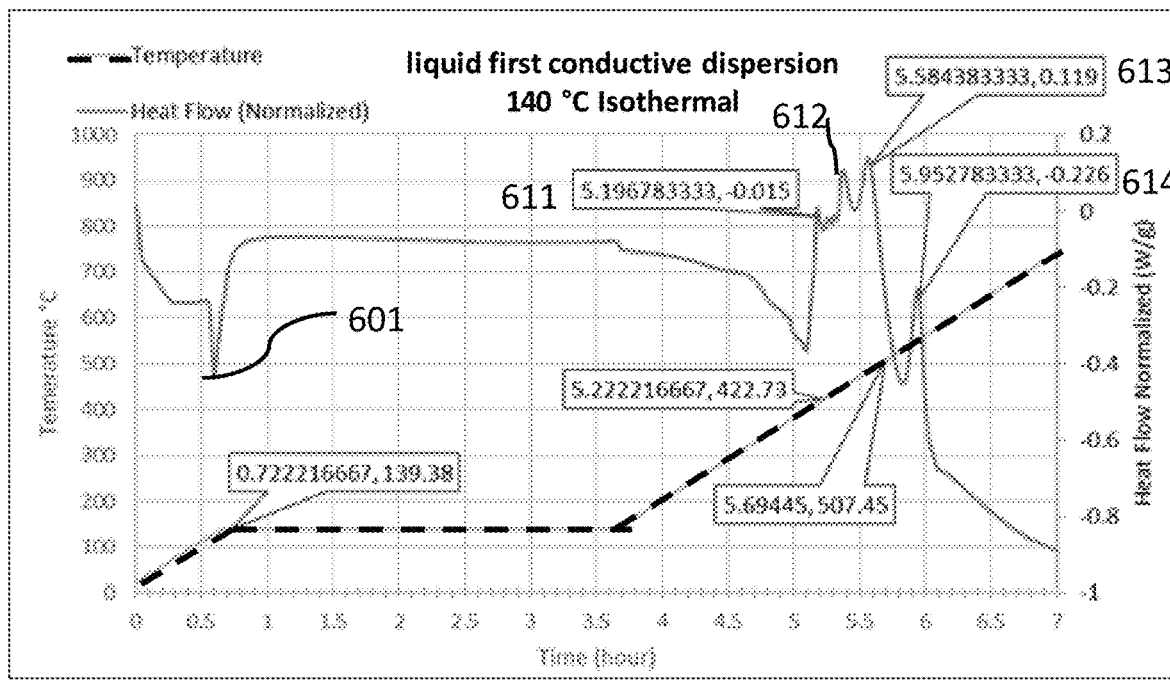
FIG. 6A is an exemplary first graph of a thermal analysis of an exemplary first conductive ink, per one or more embodiments, herein.
Figure 6B:
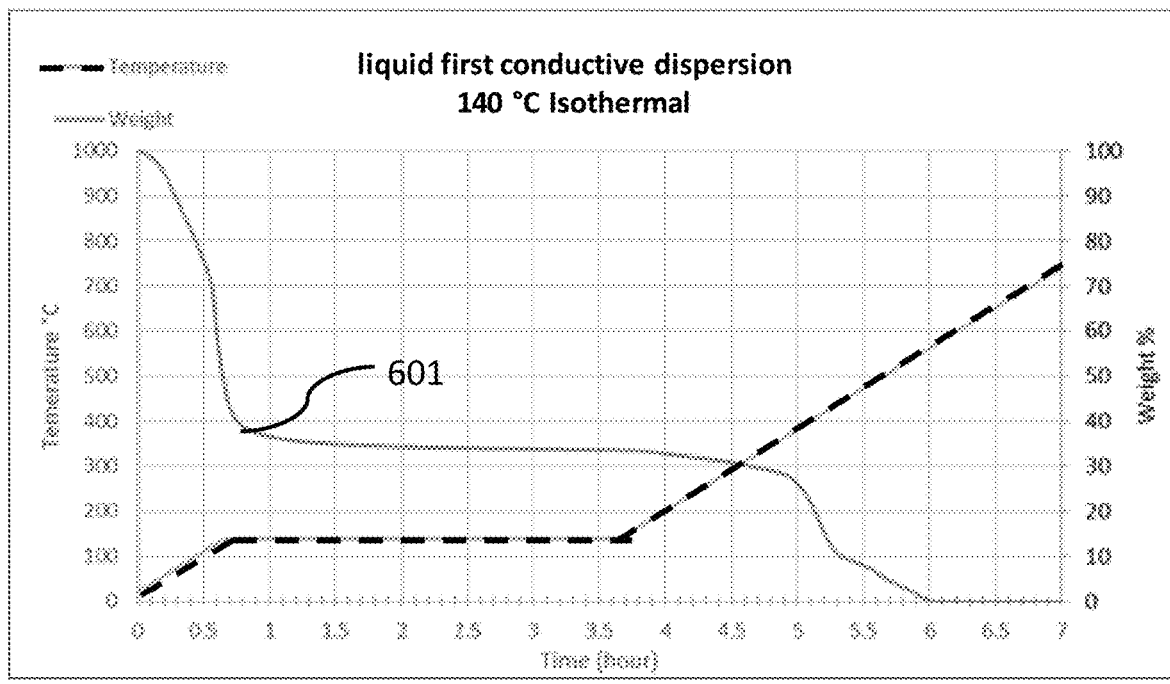
FIG. 6B is an exemplary second graph of a thermal analysis of an exemplary first conductive ink, per one or more embodiments, herein.

FIGS. 6A and 6B are graphs of a thermal analysis of an exemplary first conductive ink. In the thermal analysis the first conductive ink herein in liquid form was heated to about 140° C. at a rate of about 3° C./min, maintained at about 140° ° C. for about 3 hours, and heated to about 900° C. at a rate of about 3° C./min. Per FIGS. 6A and 6B, in some embodiments, the first conductive ink has an endothermal peak 601 at about 129° C., displaying rapid mass loss due to the evaporation of the solvent having a high vapor pressure. Further as shown, in some embodiments, the first conductive ink has exothermal peaks 611 612 613 614 at about 415.75° C., 449.98° C., 485.78° C., and 552.40° C., respectively. As, per FIG. 6B, the mass of the ink at about 900° C. is close to 0, all or almost all of the first conductive ink is consumed during its reaction with oxygen at that temperature.

Figure 7:
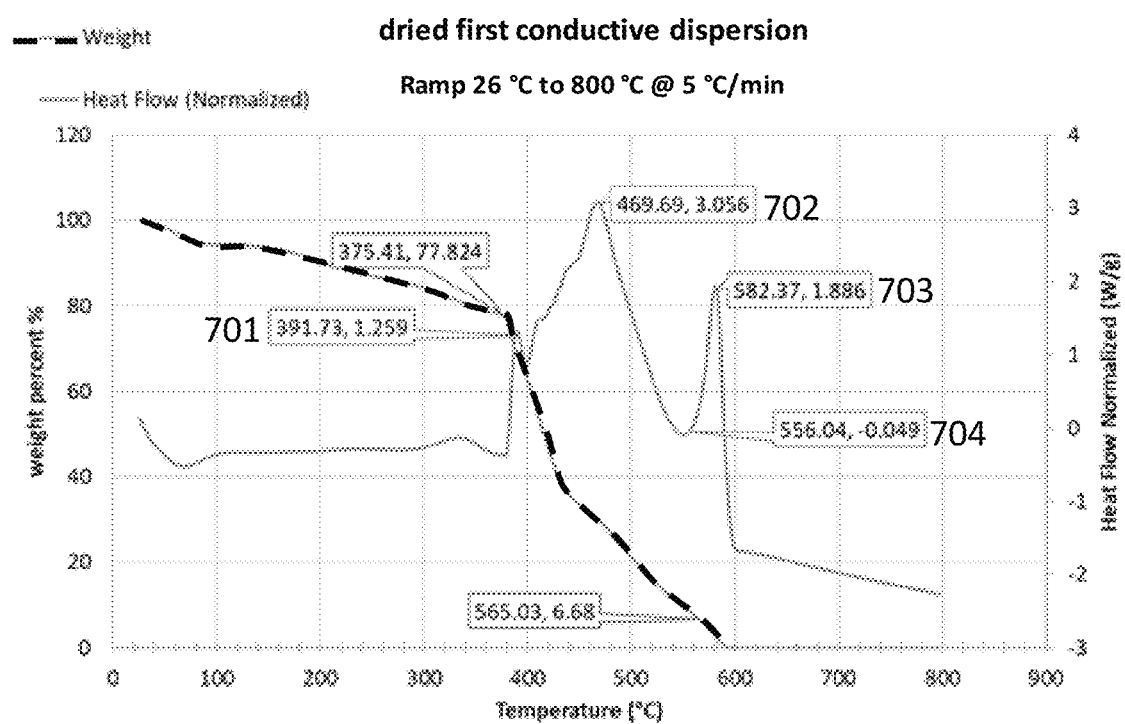
FIG. 7 is an exemplary third graph of a thermal analysis of an exemplary first conductive ink, per one or more embodiments, herein.

FIG. 7 is a graph of a thermal analysis of an exemplary first conductive ink dried on a substrate. As shown, in some embodiments, the first conductive ink has exothermal peaks 701 702 703 at about 391.73° C., 469.69° C., and 582.37° C., respectively. The first and second exothermal peaks 701 702 may correspond to the evaporation of the binder, the softener, or both, wherein the third exothermal peak 703 may correspond to the graphene. As shown, at a temperature of about 550° C., the mass of the printed first conductive ink has been reduced by about 93.5%. At a temperature of about 800° ° C. almost all of the first conductive ink is consumed during its reaction with oxygen. This thermal analysis proves that the first conductive ink printed on a substrate is thermally stable up to about 400° C.

Example 2—Second Conductive Ink

Figure 8A:
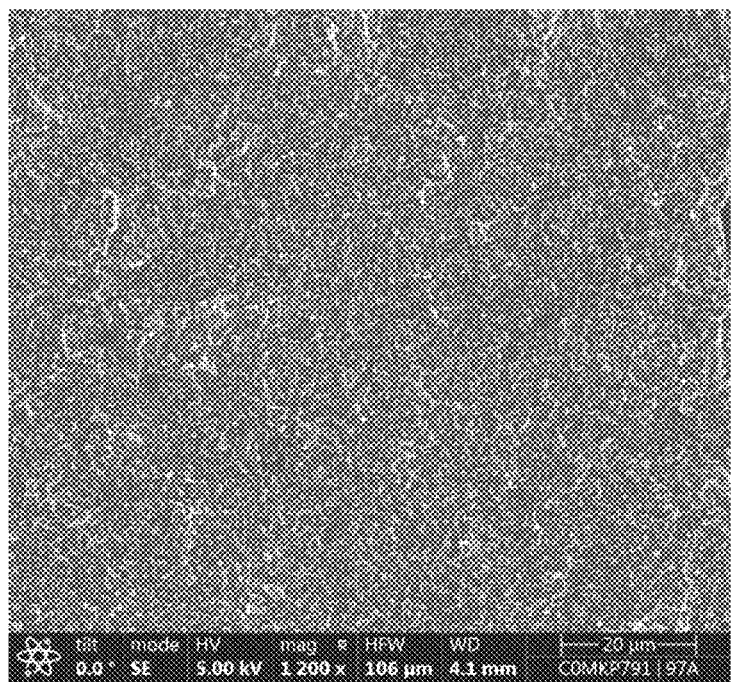
FIG. 8A is a first SEM image of an exemplary second conductive ink, per one or more embodiments, herein.
Figure 8B:
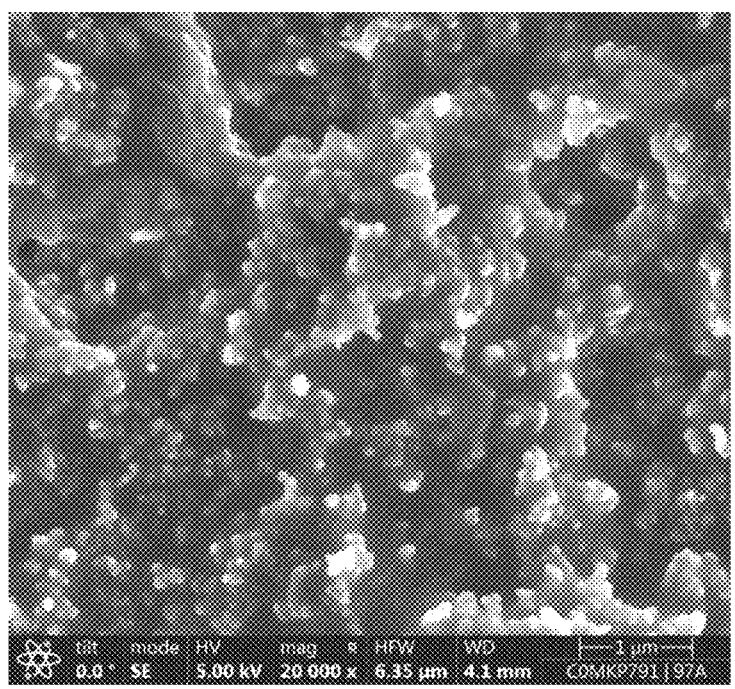
FIG. 8B is a second SEM image of an exemplary second conductive ink, per one or more embodiments, herein.

FIGS. 8A and 8B show optical microscope images of an exemplary second conductive ink. As shown therein, the second conductive ink is very stable and coats the substrate evenly to form a smooth surface without holes or shrinkage. Further, as shown, the interaction between 2D graphene sheets and zero dimensional carbon nanoparticles produces a seamless carbon network with excellent electronic conductivity. Graphene and carbon nanoparticles are in intimate seamless contact therein, thereby reducing the overall resistance of the coated films.

Figure 9A:
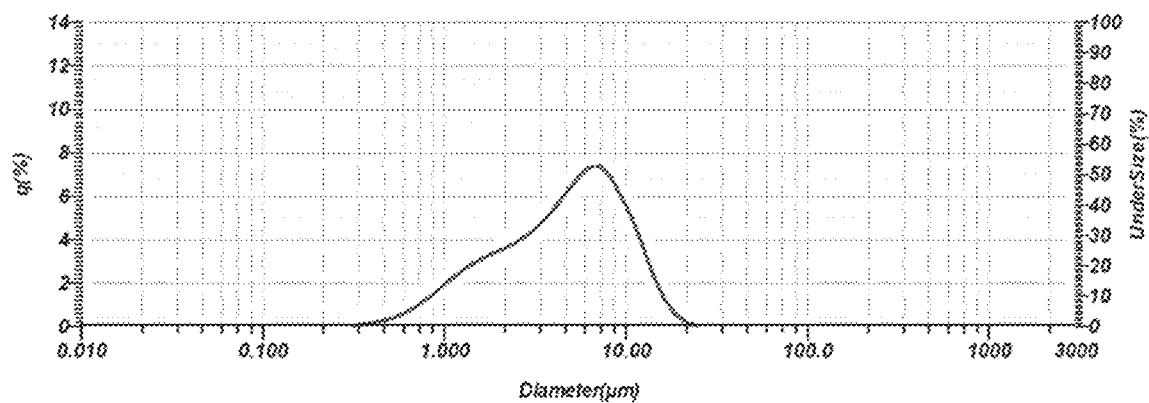
FIG. 9A is a particle size distribution of an exemplary second conductive ink, per one or more embodiments, herein.
Figure 9B:
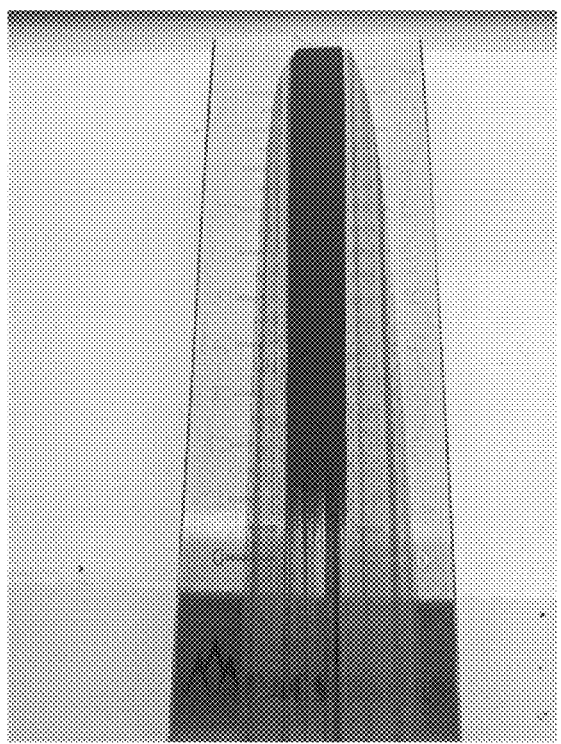
FIG. 9B is an image of an exemplary second conductive ink on a Hegman gauge, per one or more embodiments, herein.

FIG. 9A is a particle size distribution of an exemplary second conductive ink. FIG. 9B is an image of an exemplary second conductive ink on a Hegman gauge with a streak at a particle size of about 10 um. As shown the exemplary second conductive ink has a mono-modal particle size distribution with a mean of about 9 um and a maximum of about 26 um, wherein 90% of the particles have a size of less than about 13.5 um.

Figure 10:
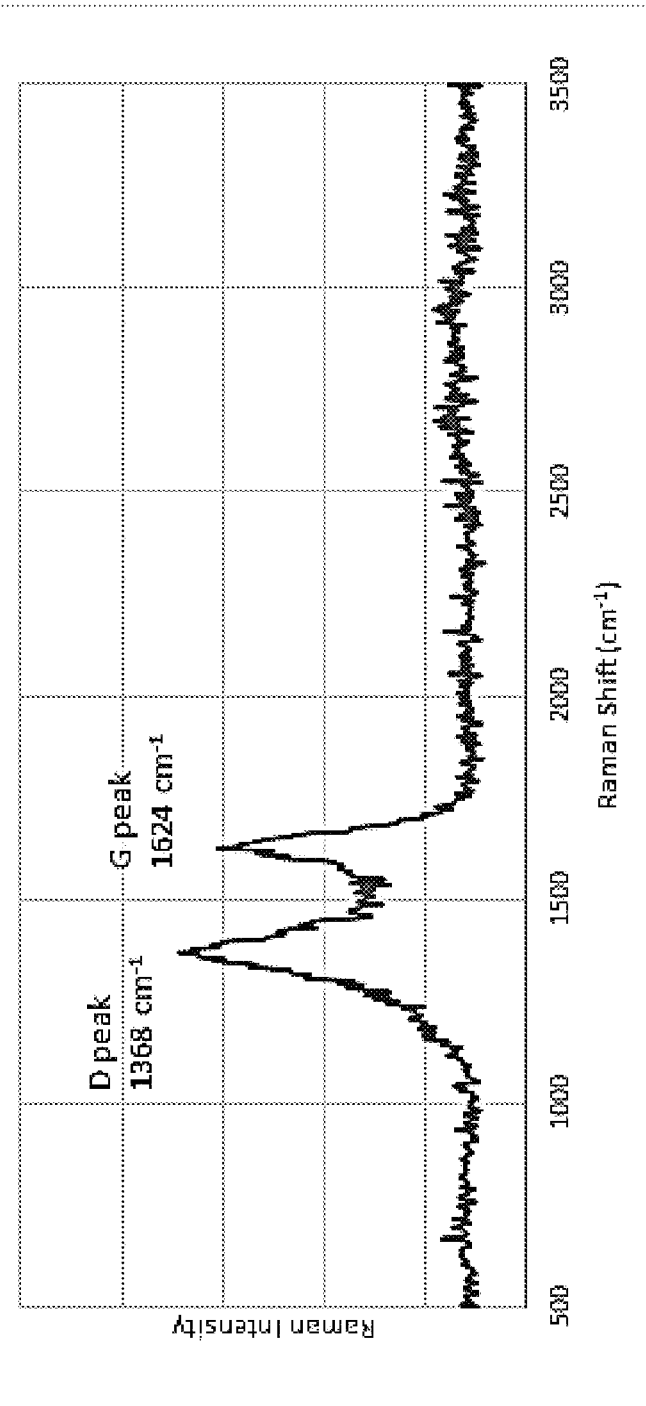
FIG. 10 is a Raman Spectroscopy graph of an exemplary second conductive ink, per one or more embodiments, herein.

FIG. 10 is a Raman Spectroscopy graph of an exemplary second conductive ink showing a D peak at about 1,368 cm-1 and a G peak at about 1,624 cm-1.

Figure 11A:
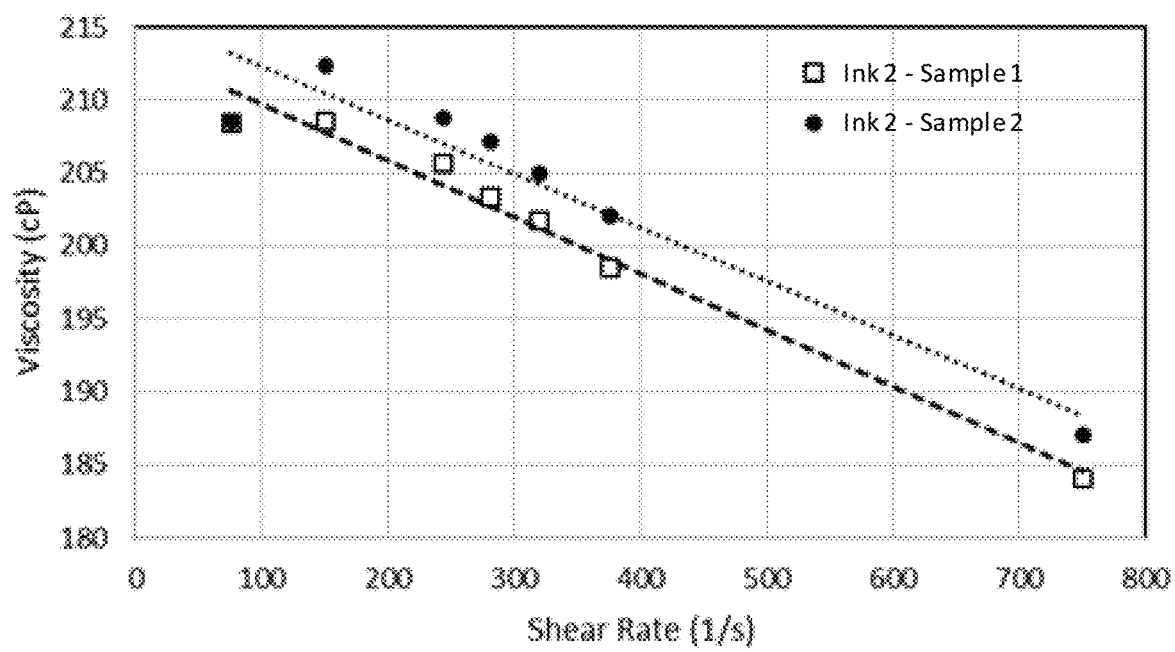
FIG. 11A is a shear rate vs. viscosity graph of an exemplary second conductive ink, per one or more embodiments, herein.

FIG. 11A shows the linear relationship between shear rate and viscosity of an exemplary second conductive ink. As shown, the exemplary second conductive ink has a viscosity of about 210 cP at a shear rate of about 100 s-1, and a viscosity of about 185 cP at a shear rate of about 750 s-1. As shown, the viscosity of the conductive ink can be tuned by adjusting the shear mixing time, wherein longer shearing times reduce viscosity.

Figure 11B:
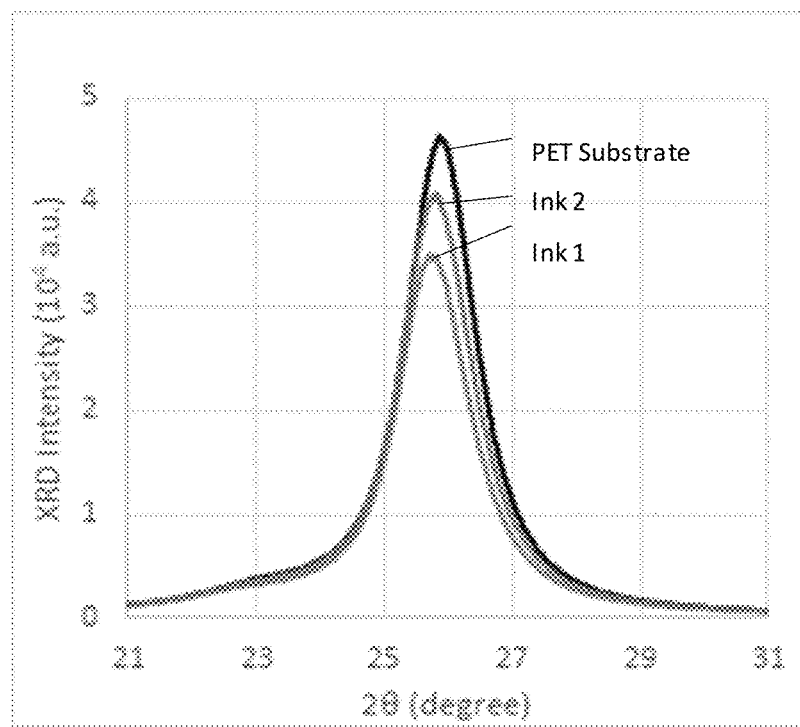
FIG. 11B is an X-ray Diffraction graph of exemplary first and second conductive inks, per one or more embodiments, herein.

FIG. 11B is an X-ray Diffraction graph of exemplary second and second conductive inks, which both show a peak at about 26°.

Figure 12A:
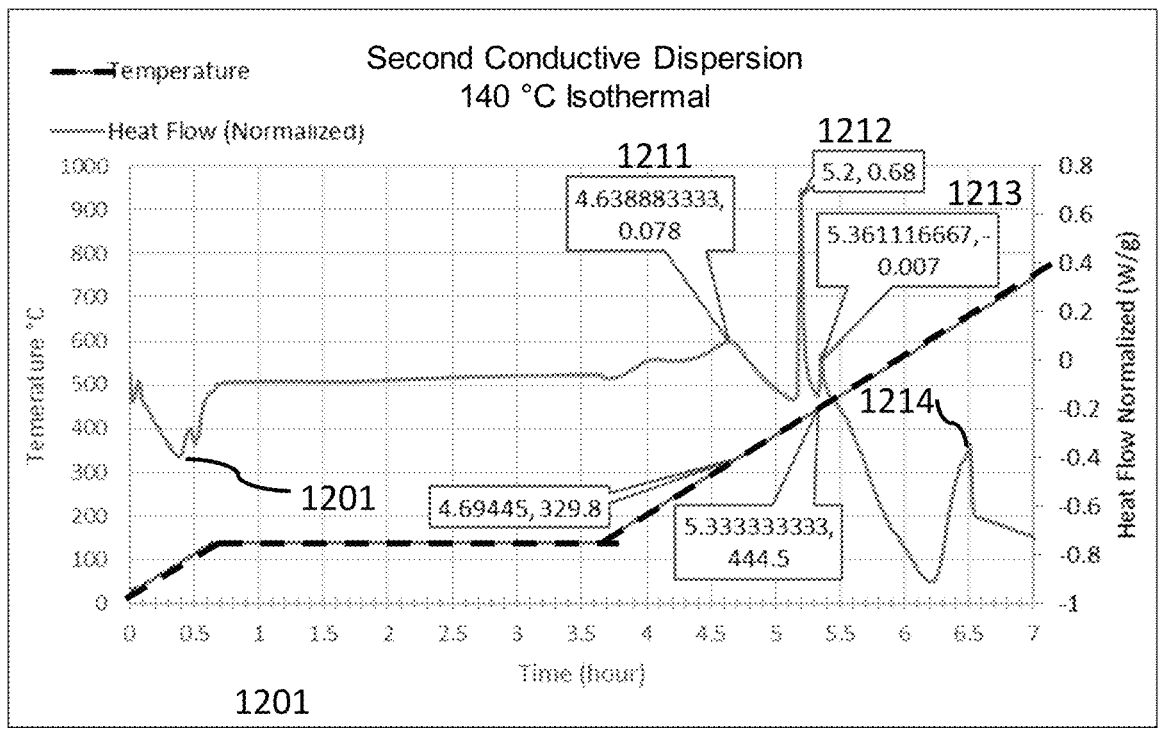
FIG. 12A is an exemplary first graph of a thermal analysis of an exemplary second conductive ink, per one or more embodiments, herein.
Figure 12B:
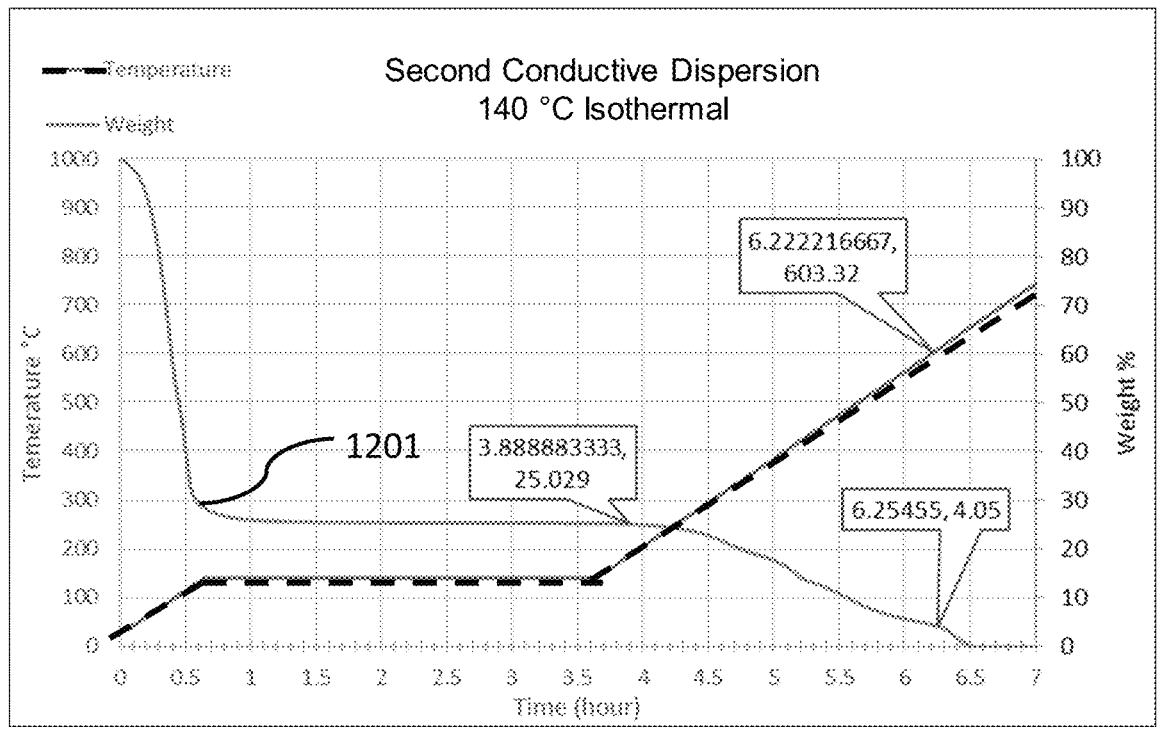
FIG. 12B is an exemplary second graph of a thermal analysis of an exemplary second conductive ink, per one or more embodiments, herein.

FIGS. 12A and 12B are graphs of a thermal analysis of an exemplary second conductive ink. In the thermal analysis the second conductive ink herein in liquid form was heated to about 140° C. at a rate of about 3° C./min, maintained at about 140° ° C. for about 3 hours, and heated to about 900° C. at a rate of about 3° C./min. Per FIGS. 12A and 12B, in some embodiments, the second conductive ink has an endothermal peak 1201 at about 92° C., displaying rapid mass loss due to the evaporation of the solvent having a high vapor pressure. Further as shown, in some embodiments, the second conductive ink has exothermal peaks 1211 1212 1213 1214 at about 329° C., 422.04° C., 448.37° C., and 654.98° C., respectively. As, per FIG. 12B, the mass of the ink at about 900° ° C. is close to 0, all or almost all of the second conductive ink is consumed during its reaction with oxygen at that temperature.

Figure 13:
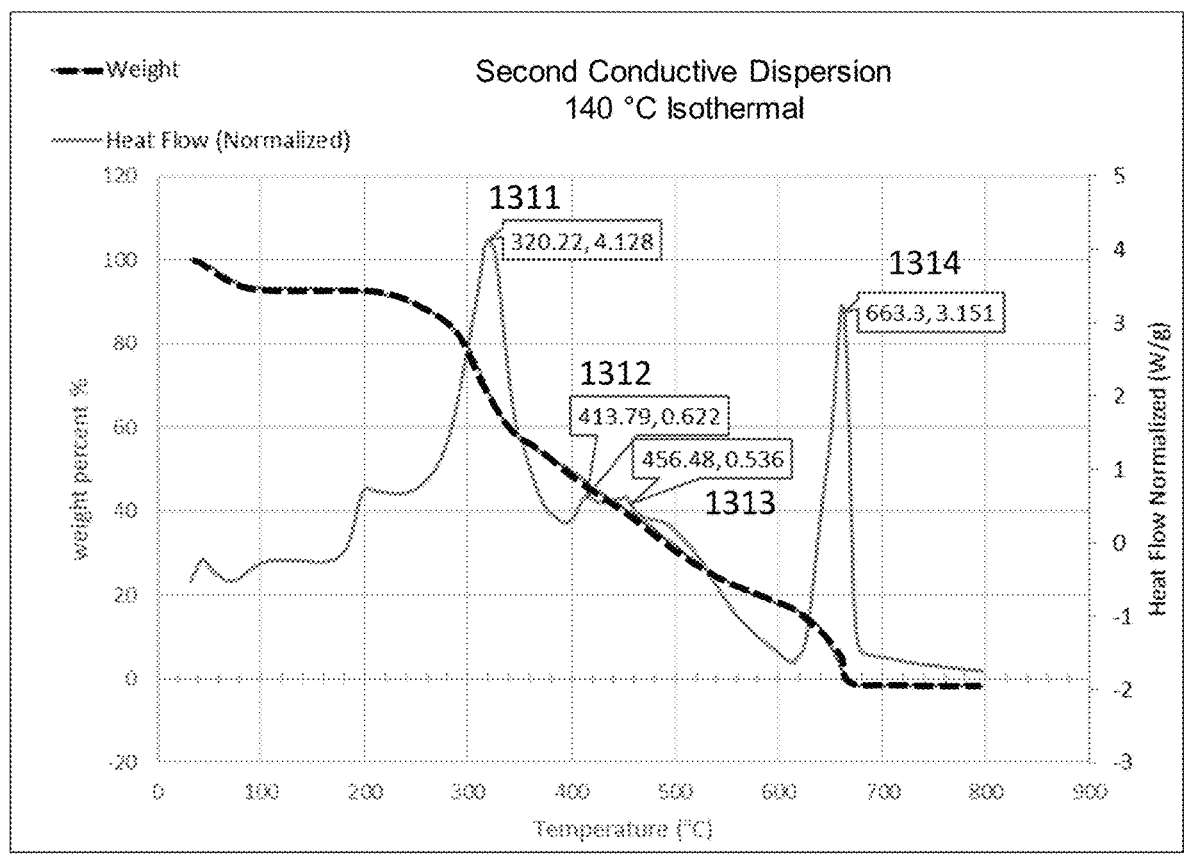
FIG. 13 is an exemplary third graph of a thermal analysis of an exemplary second conductive ink, per one or more embodiments, herein.

FIG. 13 is a graph of a thermal analysis of an exemplary second conductive ink dried on a substrate. As shown, in some embodiments, the second conductive ink has exothermal peaks 1301 1302 1303 1304 at about 320.22° C., 413.79° C., 456.48° C. and 663.3° C., respectively. The second exothermal peak 1301 may correspond to the evaporation of the binder, the softener, or both, wherein the second and third exothermal peaks 1302 1303 may correspond to the graphene. As shown, at a temperature of about 680° C., the mass of the printed second conductive ink has been reduced by about 95%. At a temperature of about 800° C. almost all of the second conductive ink is consumed during its reaction with oxygen. This thermal analysis proves that the second conductive ink printed on a substrate is thermally stable up to about 400° C., enabling increased use cases for the second conductive ink herein.

Example 3—Third Conductive Inks

Figure 22A:
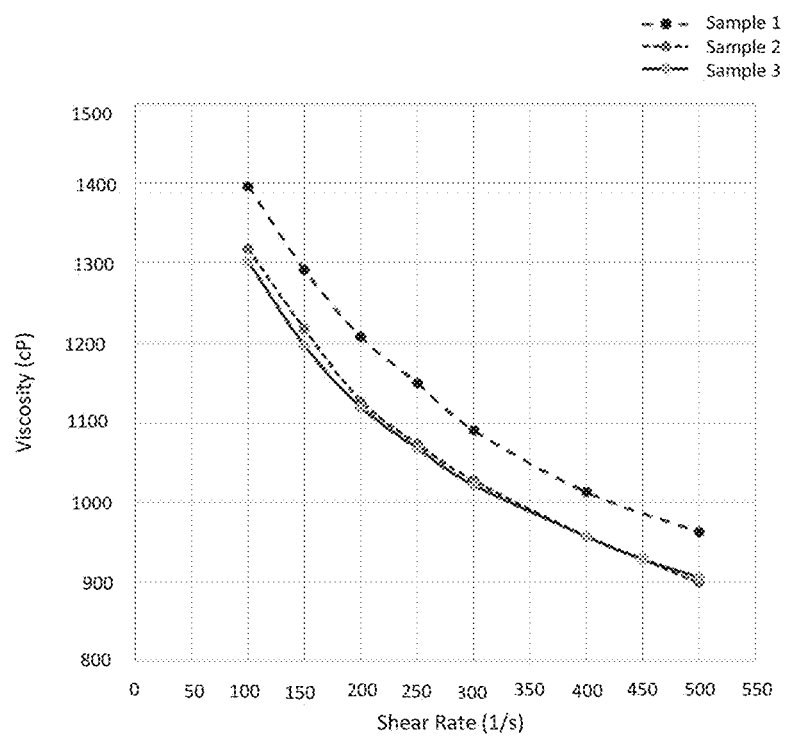
FIG. 22A is a shear rate vs. viscosity graph of an exemplary third conductive ink, per one or more embodiments, herein.
Figure 22B:
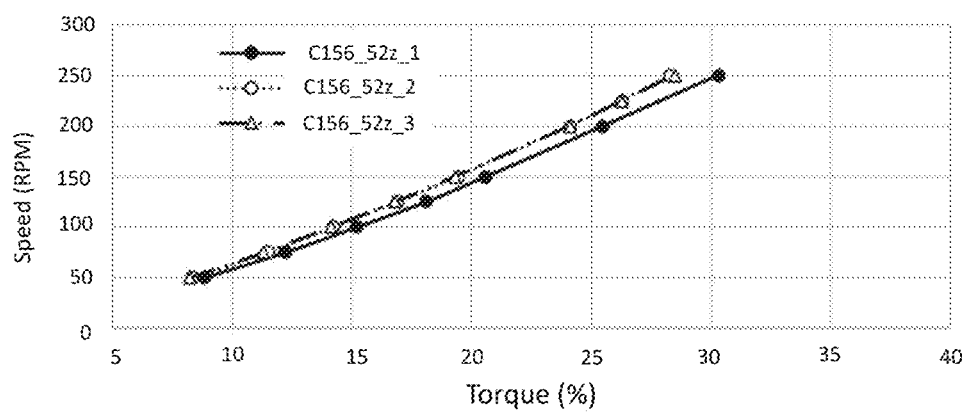
FIG. 22B is a torque vs. speed graph of the exemplary third conductive ink, per one or more embodiments, herein.

FIG. 22A is a shear rate vs. viscosity graph of an exemplary third conductive ink. Although the Rheogram appears linear or Newtonian, the exemplary third conductive ink exhibits slight curvature, shear thinning and/or pseudoplastic orientation. The ink is suitable for screen printing, roll-coating with slot-die or reverse comma blade, and even flexographic printing. FIG. 22B is a torque vs. speed graph of an exemplary third conductive ink.

Figure 23A:
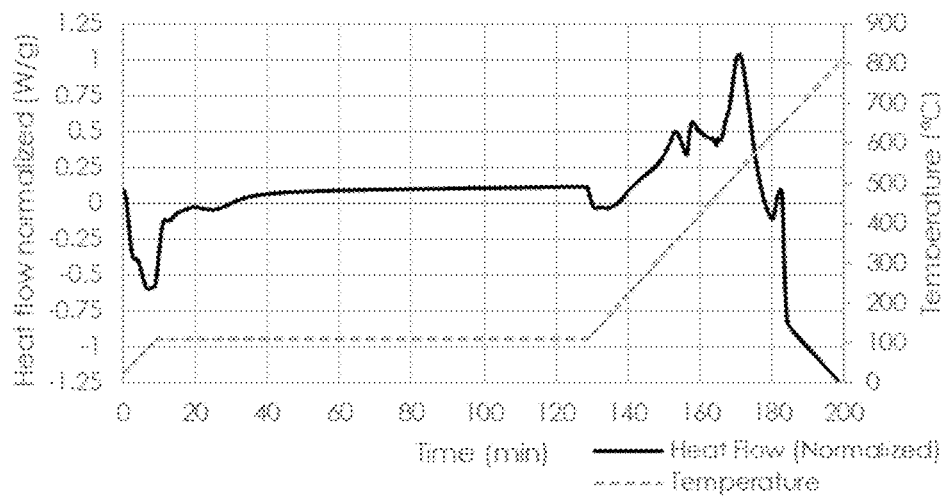
FIG. 23A is a time vs. heat flow graph of the exemplary third conductive ink, per one or more embodiments, herein.
Figure 23B:
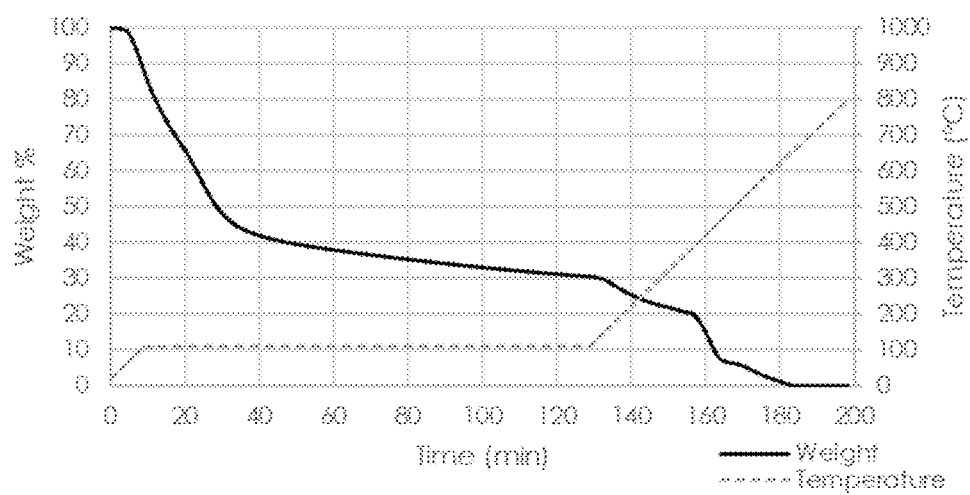
FIG. 23B is a time vs. weight graph of the exemplary third conductive ink, per one or more embodiments, herein.

In one experiment, per FIGS. 23A and 23B, the exemplary third conductive ink was heated to 110° C. at a rate of 10° C./min, held at 110° C. for 2 hours, and heated to 800° C. at a rate of 10° C./min. As shown, an endothermal peak is detected at 110° C., corresponding to rapid weight loss of the ink, due to the evaporation of the high vapor pressure solvent. In some embodiments, annealing the exemplary third conductive ink, once printed on a substrate, at a temperature of about 110° C. achieves optimal conductivity, ideal adhesion, and flexibility. Further as shown, several exothermal peaks are found at 350° C., 411° C., 537° ° C., and 637° C., which may correspond to the decomposition of the binder, dispersing agent, and/or graphene. As residue at 637° C. is close to 0, all ink components are consumed by reacting with oxygen from air flow at that temperature.

Figure 24A:
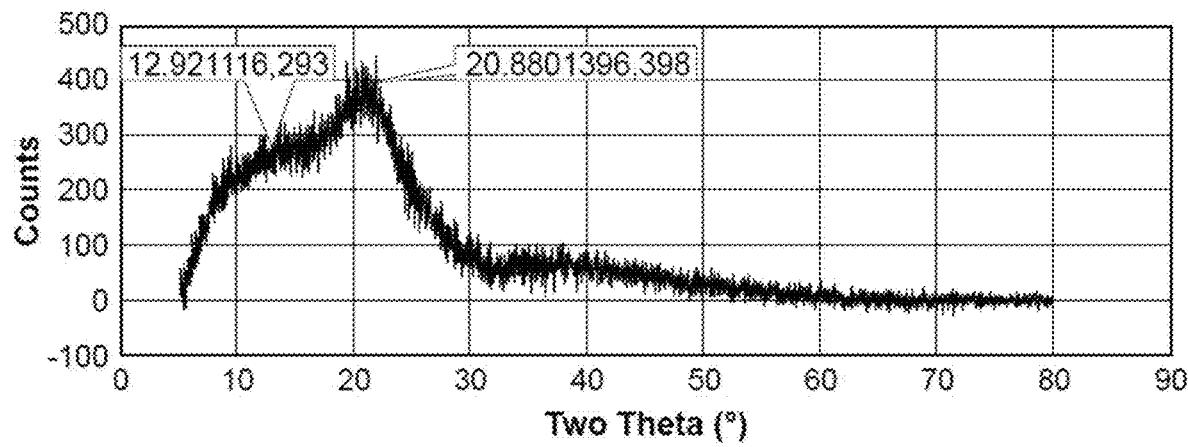
FIG. 24A is an XRD pattern of a substrate coated with the exemplary third conductive ink, per one or more embodiments, herein.

The XRD pattern of a substrate coated with the exemplary third conductive ink, per FIG. 24A, displays show two broad characteristic peaks at 2 theta of 12.9° and 20.8°, corresponding to d-values of 7.5 and 4.5° angstroms, respectively, which are consistent with the values reported for the polymer binder.

Figure 24B:
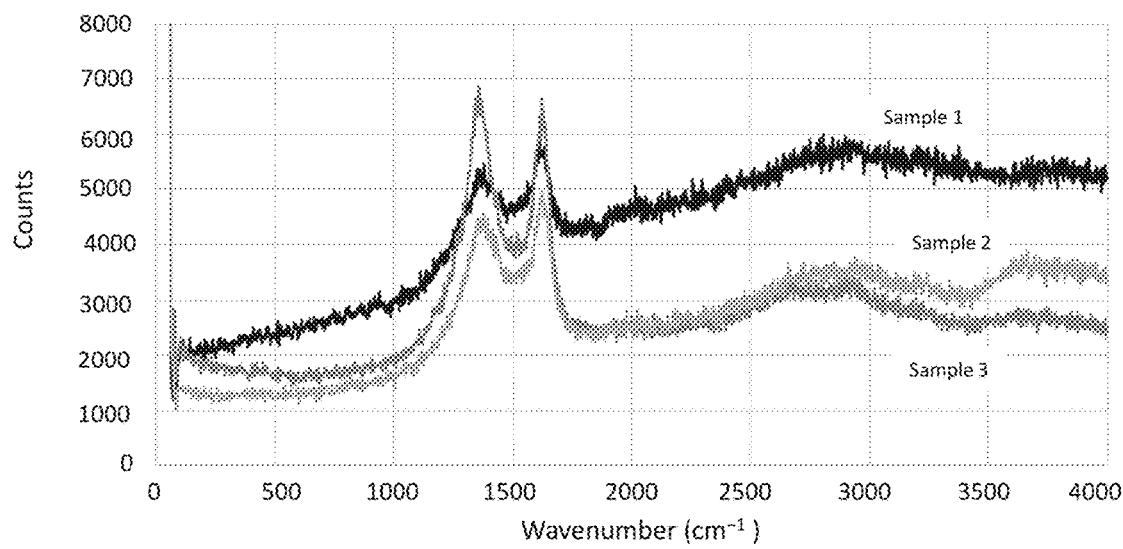
FIG. 24B is a Raman spectrum of a substrate coated with the exemplary third conductive ink, per one or more embodiments, herein.

Raman spectrum of the exemplary third conductive ink printed on a substrate, per FIG. 24B, displays D and G bands that are characteristic for rGO at approximately 1400 cm-1 and 1600 cm-1 respectively.

Figure 25A:
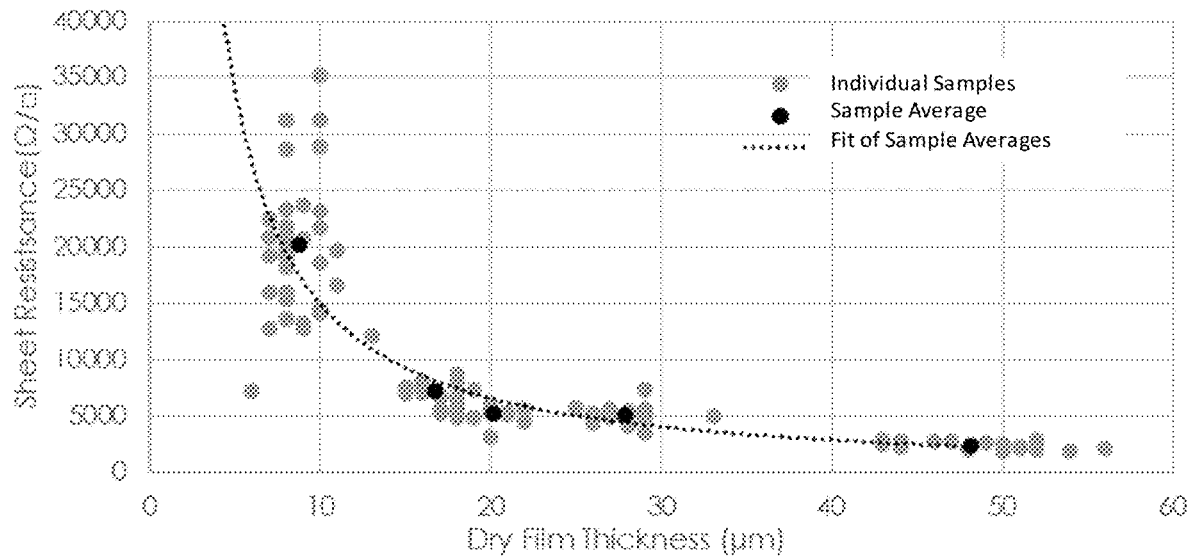
FIG. 25A is a dry film thickness vs. sheet resistance graph of a substrate coated with the exemplary third conductive ink, per one or more embodiments, herein.
Figure 25B:
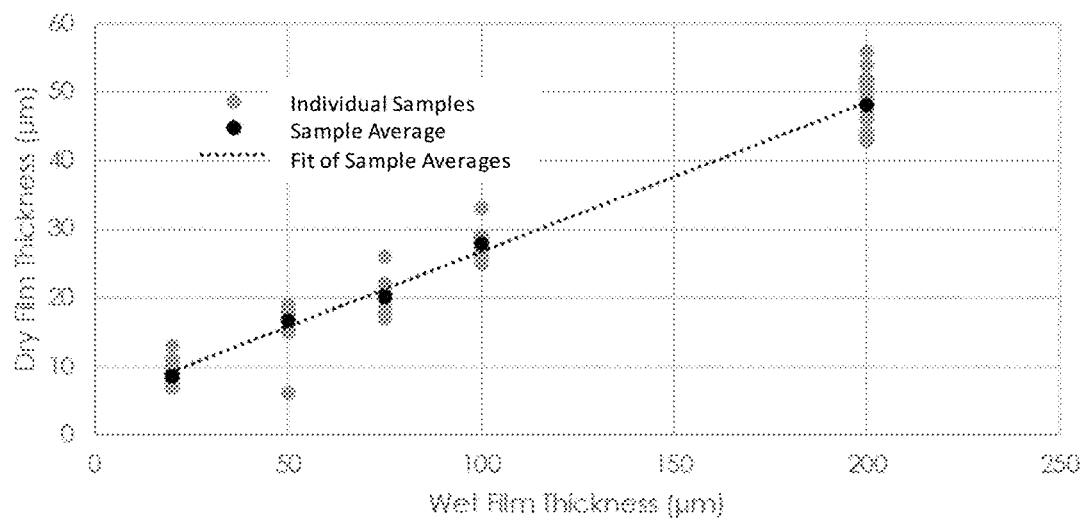
FIG. 25B is a wet film thickness vs. dry film thickness graph of a substrate coated with the exemplary third conductive ink, per one or more embodiments, herein.

Per FIG. 25A-25B, a 1 μm thick Polyimide substrate was coated with various thicknesses of the exemplary third conductive ink by a Mayer rods, wherein the coated substrates were cured at 110° C. until dry. As expected, the results show an increases in sheet resistance associated to decrease in dry thickness, wherein the average conductivity is about 7.6 S/m with a standard deviation of about 1.8 S/m.

Figure 26A:
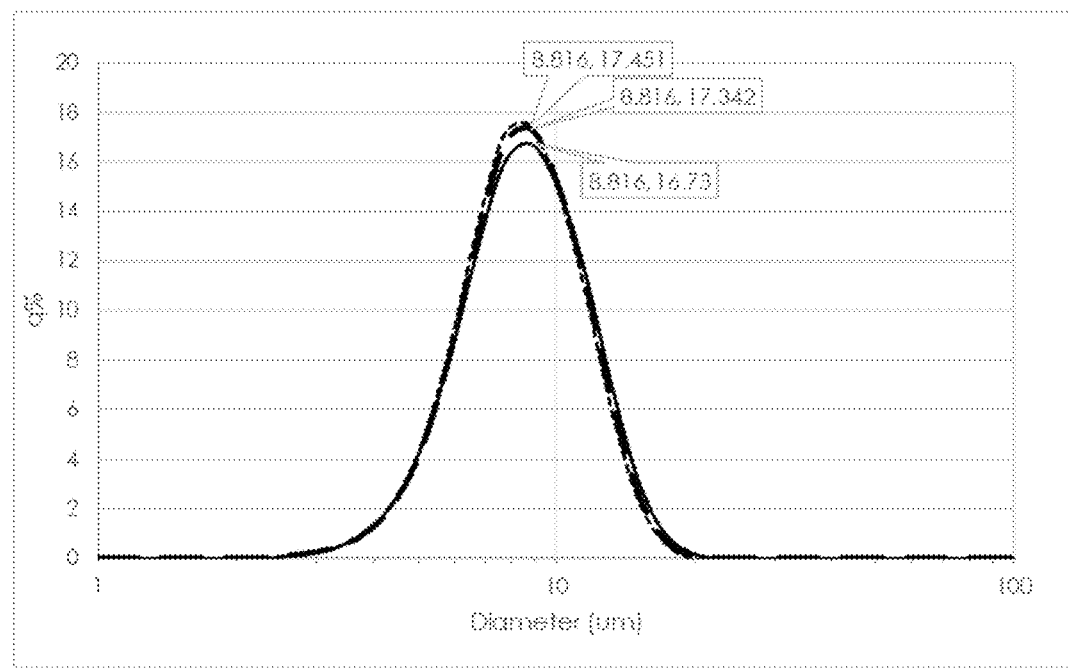
FIG. 26A is a particle distribution graph of the exemplary third conductive ink, per one or more embodiments, herein.

Per FIG. 26A, the exemplary third conductive ink had a median particle size of about 8.8 μm, a mean particle size of about 7.9 μm, and a maximum size of about 19 μm, wherein 90% of the particles had a size of less than about 11.5 μm.

Figure 26B:
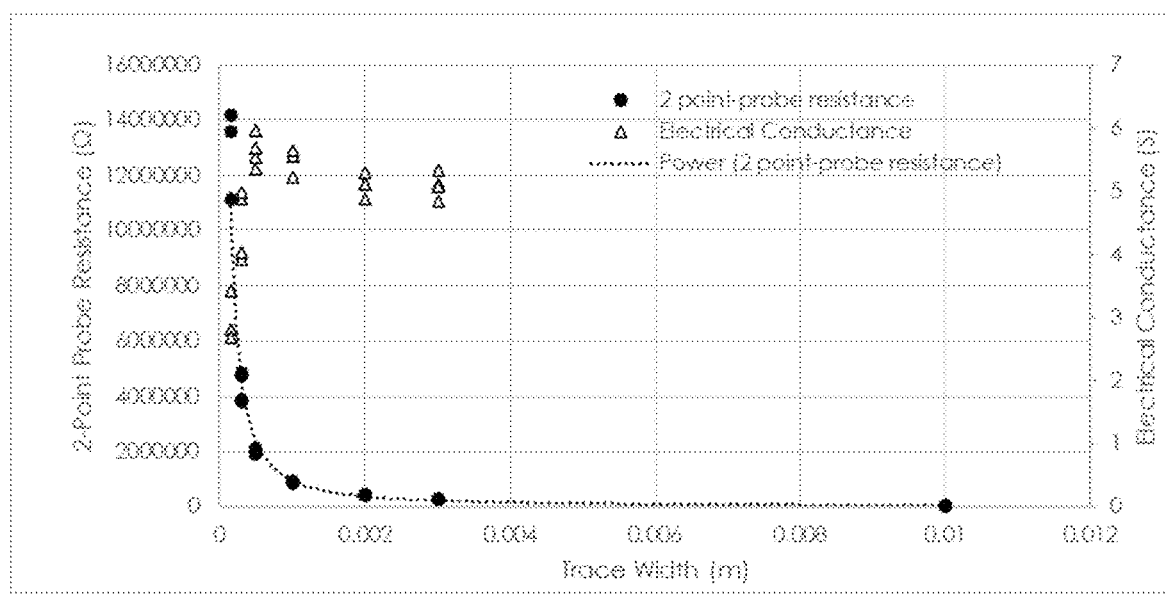
FIG. 26B, shows a trace width vs. resistance for a substrate covered with the exemplary third conductive ink, per one or more embodiments, herein.

FIG. 26B, shows a trace width vs. resistance for a substrate covered with the exemplary third conductive ink, wherein the exemplary third conductive ink can be successfully screen printed into traces with a line width from 150 to 3000 micrometers.

A polyimide substrate was coated with 50 μm wet film thickness of the exemplary third conductive ink, whereafter the coating was cured at 110° C. for 10 minutes and at 300° C. for 30 minutes, and then sprayed with water. The coating showed no signs of damage Immersion test results are shown below.

| Water Immersion Period (days) | Water Temp (° C.) | Dry Film Thickness (μm) | Sheet Resistance (Ω/□) | ASTM Cross Hatch Adhesion (−) |
|---|---|---|---|---|
| 0 | room | 16.2 | 3621.85 | 5B |
| 7 | 20 | 21 | 3991.63 | 5B |
| 7 | 80 | 22 | 5115.83 | 5B |

Example 4—Fourth Conductive Inks

Figure 27A:
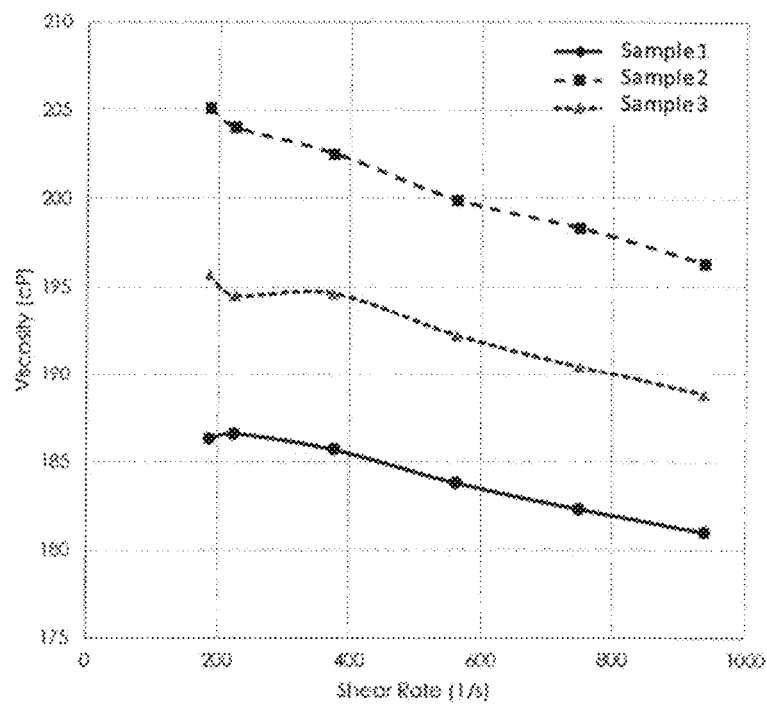
FIG. 27A is a shear rate vs. viscosity graph of an exemplary fourth conductive ink, per one or more embodiments, herein.
Figure 27B:
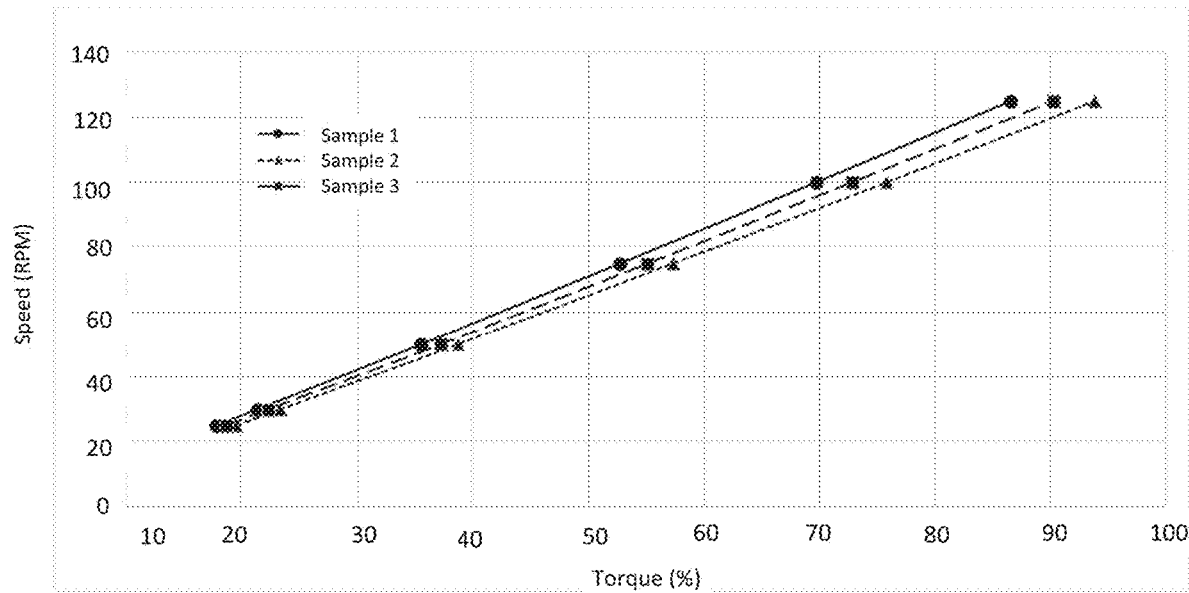
FIG. 27B is a torque vs. speed graph of the exemplary fourth conductive ink, per one or more embodiments, herein.

FIG. 27A is a shear rate vs. viscosity graph of an exemplary fourth conductive ink. FIG. 27B is a torque vs. speed graph of the exemplary fourth conductive ink. As shown, the Rheogram appears linear or Newtonian, the graphs of the exemplary fourth conductive exhibit a slight curvature in the shear thinning or pseudoplastic orientation.

Figure 28A:
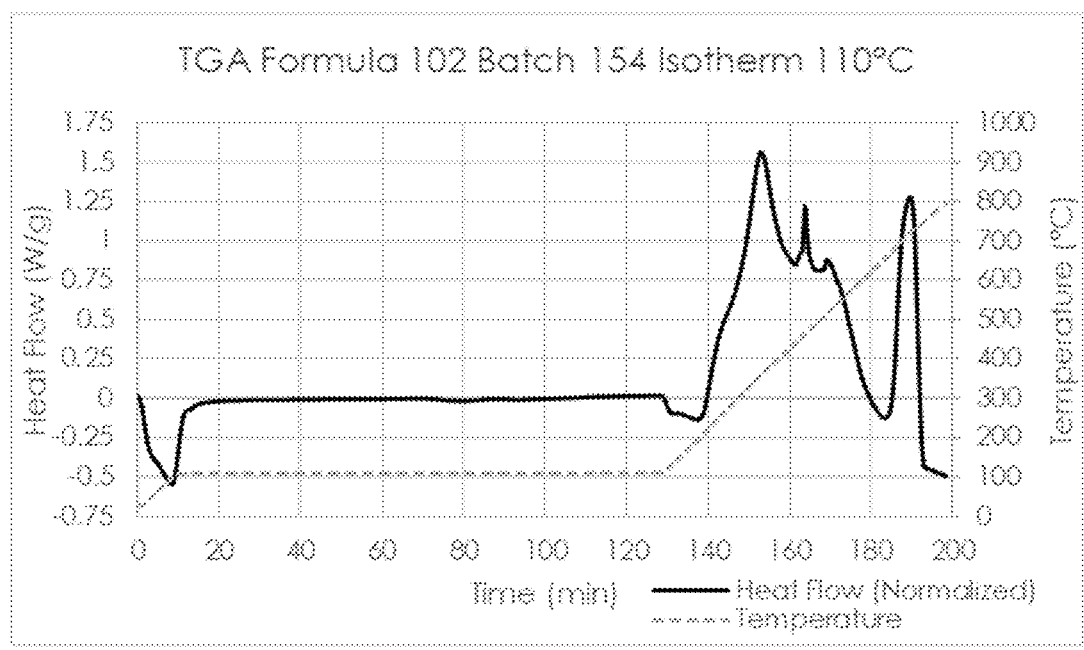
FIG. 28A is a time vs. heat flow graph of an exemplary fourth conductive ink, per one or more embodiments, herein.
Figure 28B:
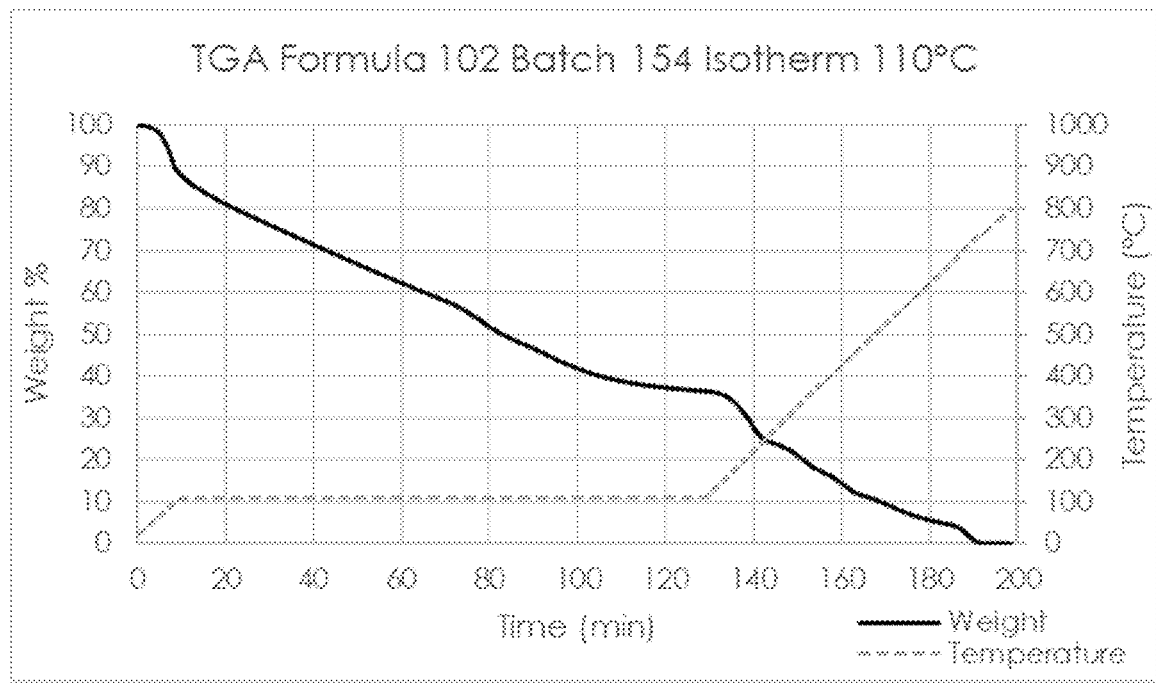
FIG. 28B is a time vs. weight graph of the exemplary fourth conductive ink, per one or more embodiments, herein.

In a thermal analysis per FIGS. 28A-28B, liquid of the exemplary fourth conductive ink was heated to 110° C. at a rate of 10° C./min, kept at 110° C. for 2 hours, and heated to 800° C. at a rate of 10° C./min. As shown, an endothermal peak is detected at 110° C., corresponding to a fast weight loss of the ink associated to the evaporation of the high vapor pressure solvents. Further, as shown, annealing the exemplary third conductive ink, once printed on a substrate, at a temperature of about 110° C. achieves optimal conductivity, ideal adhesion, and flexibility. Several exothermal peaks are found at 358° C., 466° C., 515.79° C., and 726.24° C., which correspond to the decomposition of the binder, dispersing agent, carbons, and graphene. The residue at 797.48° C. is close to 0, meaning that all ink components are consumed by reacting with oxygen from air flow.

Figure 29A:
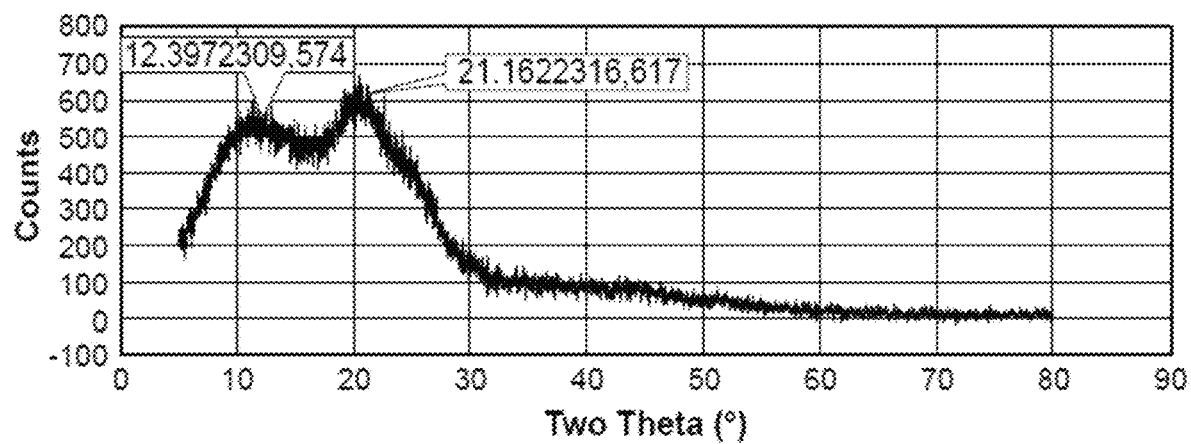
FIG. 29A is an XRD graph of an exemplary fourth conductive ink, per one or more embodiments, herein.

The XRD pattern in FIG. 29A, of a substrate coated with the exemplary fourth conductive ink displays two broad characteristic peaks at 2 theta of 12.4° and 21.1°, which correspond to d-values of 7.5 and 4.5° angstroms, respectively which are consistent with the values reported for the polymer binder.

Figure 29B:
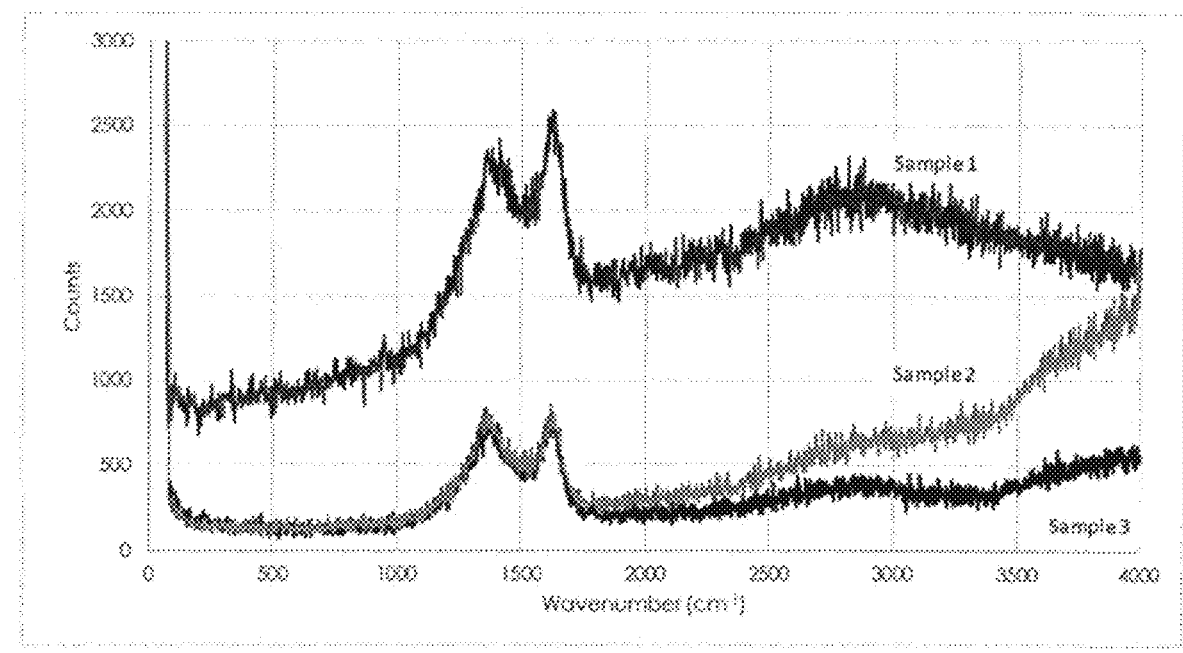
FIG. 29B is a Raman spectrum of the exemplary fourth conductive ink, per one or more embodiments, herein.

Per FIG. 29B, a Raman spectrum of a substrate coated with the exemplary fourth conductive ink displays D and G bands that are characteristic for rGO at approximately 1400 $cm^{-1}$ and 1600 $cm^{-1}$ respectively.

Figure 30A:
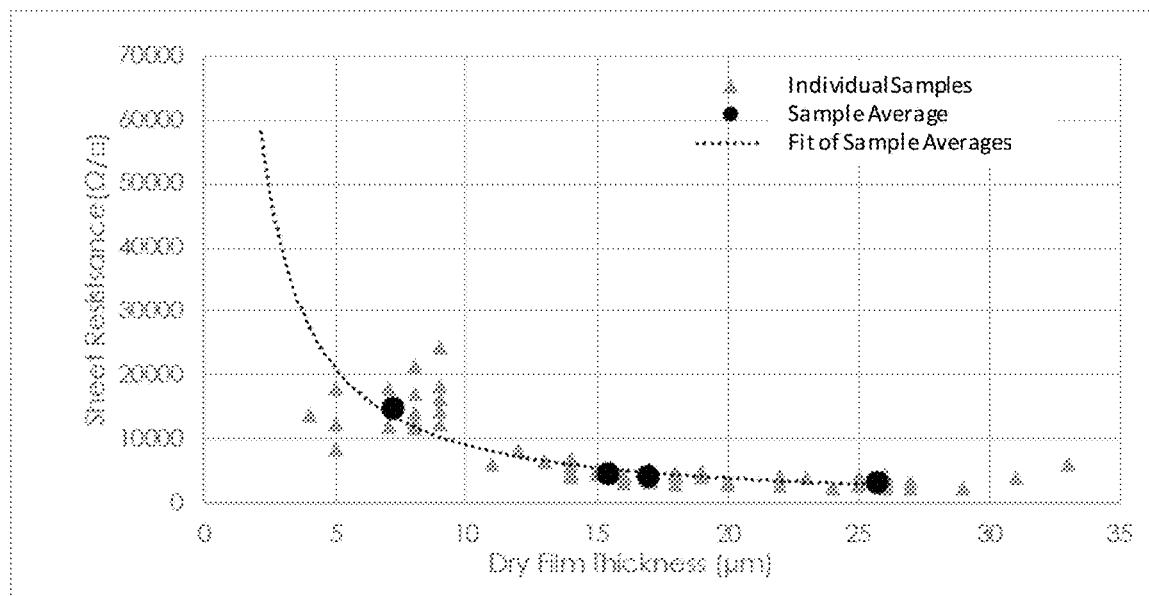
FIG. 30A is a dry film thickness vs. sheet resistance graph of a substrate coated with the exemplary fourth conductive ink, per one or more embodiments, herein.
Figure 30B:
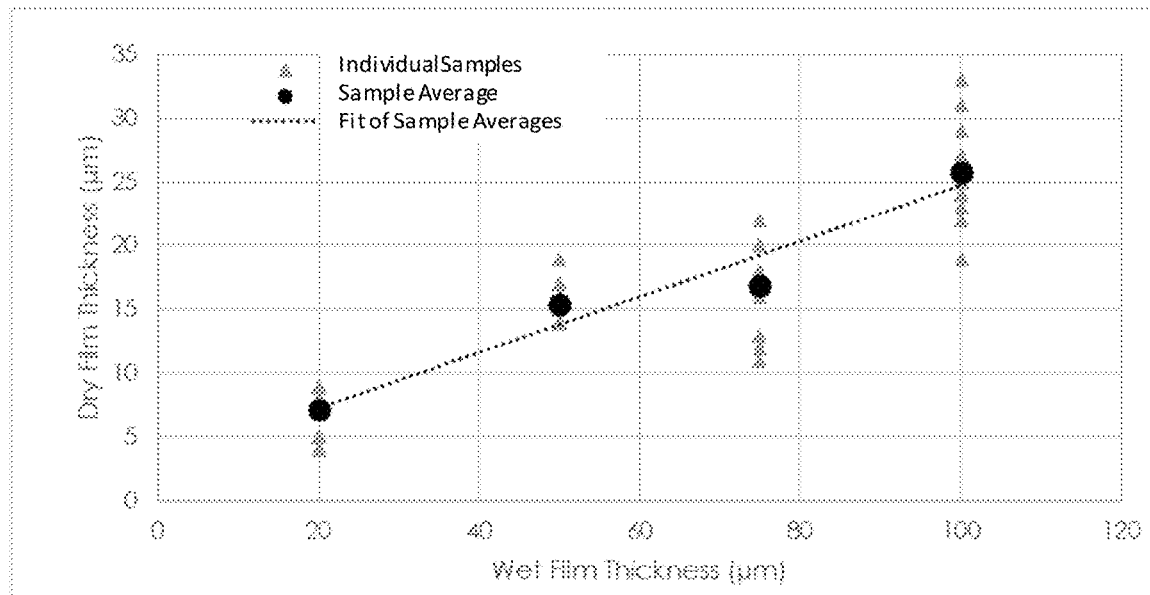
FIG. 30B is a wet film thickness vs. dry film thickness graph of a substrate coated with the exemplary fourth conductive ink, per one or more embodiments, herein.

Per FIG. 30A-30B, a 1 μm thick Polyimide substrate was coated with various thicknesses of the exemplary fourth conductive ink by a Mayer rods, wherein the coated substrates were cured at 110° C. until dry. As expected, the results show an increases in sheet resistance associated to decrease in dry thickness, wherein the average conductivity is about 12.7 S/m with a standard deviation of about 3.7 S/m.

Figure 31:
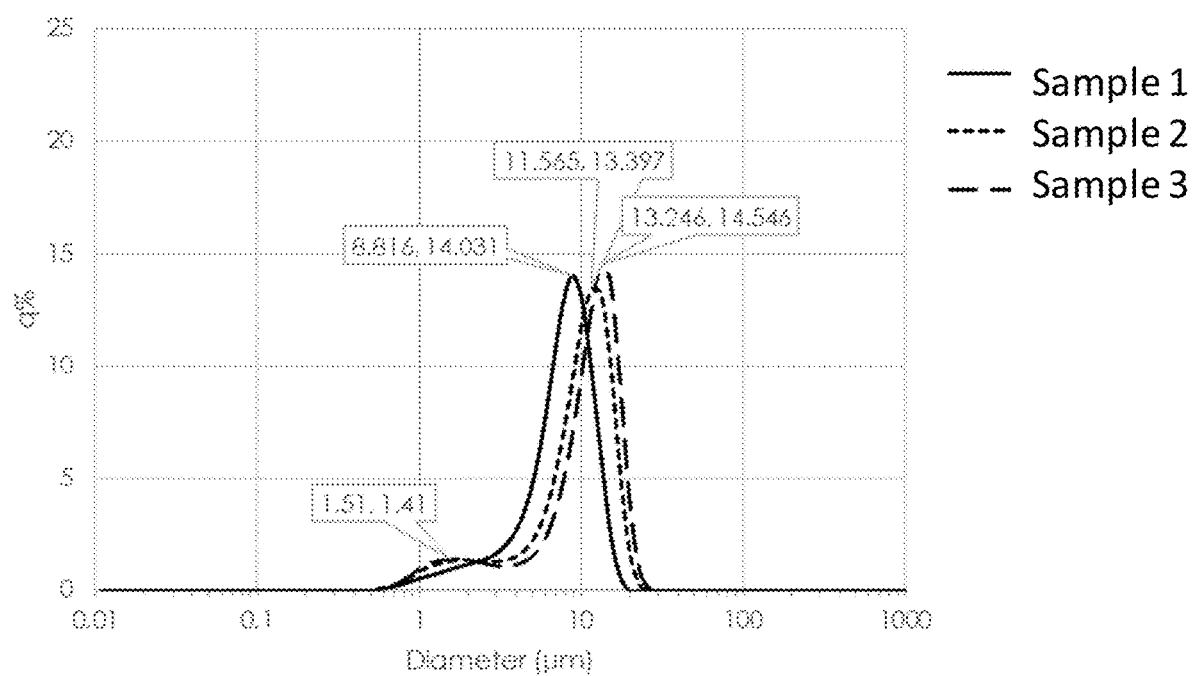
FIG. 31 is a particle distribution graph of the exemplary fourth conductive ink, per one or more embodiments, herein.

FIG. 31, shows a trace width vs. resistance for a substrate covered with the exemplary fourth conductive ink, wherein the exemplary third conductive ink can be successfully screen printed into traces with a line width from 150 to 3000 micrometers.

Example 5—Fifth Conductive Inks

Figure 32A:
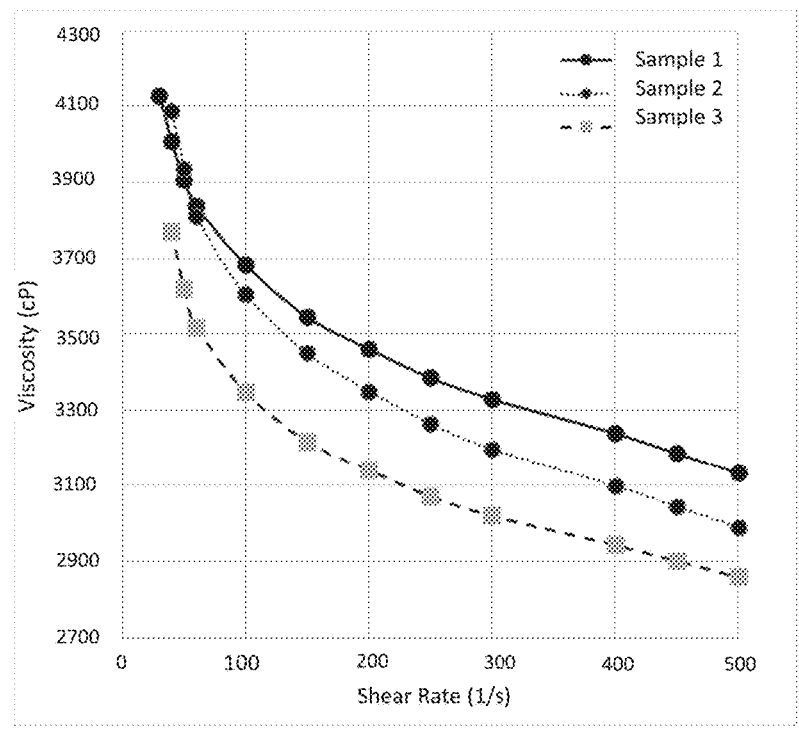
FIG. 32A is a shear rate vs. viscosity graph of an exemplary fifth conductive ink, per one or more embodiments, herein.
Figure 32B:
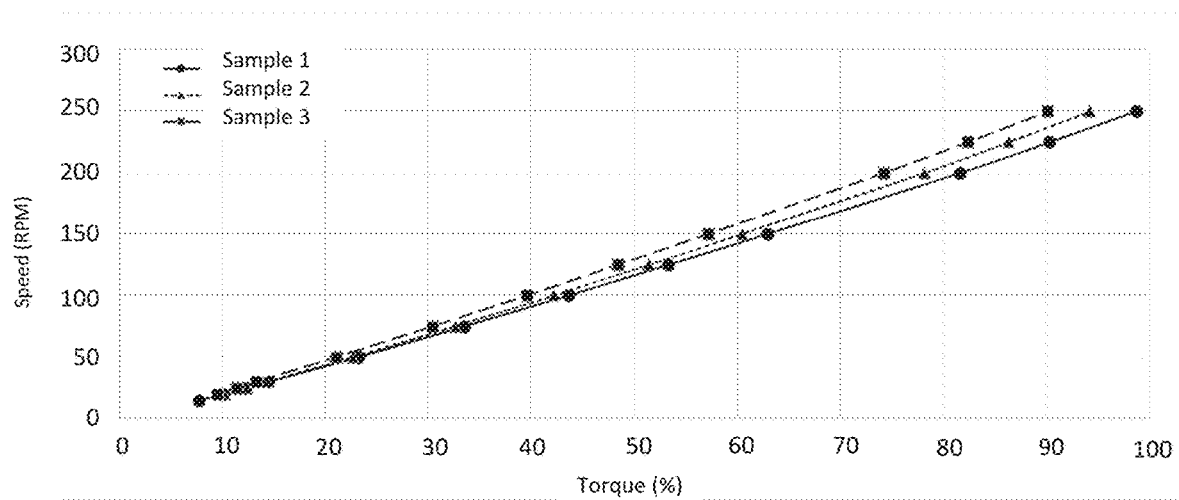
FIG. 32B is a torque vs. speed graph of the exemplary fifth conductive ink, per one or more embodiments, herein.

FIG. 32A is a shear rate vs. viscosity graph of an exemplary fifth conductive ink. FIG. 32B is a torque vs. speed graph of the exemplary fifth conductive ink. As shown, the Rheogram appears linear or Newtonian, the graphs of the exemplary fifth conductive exhibit a slight curvature in the shear thinning or pseudoplastic orientation.

Figure 33A:
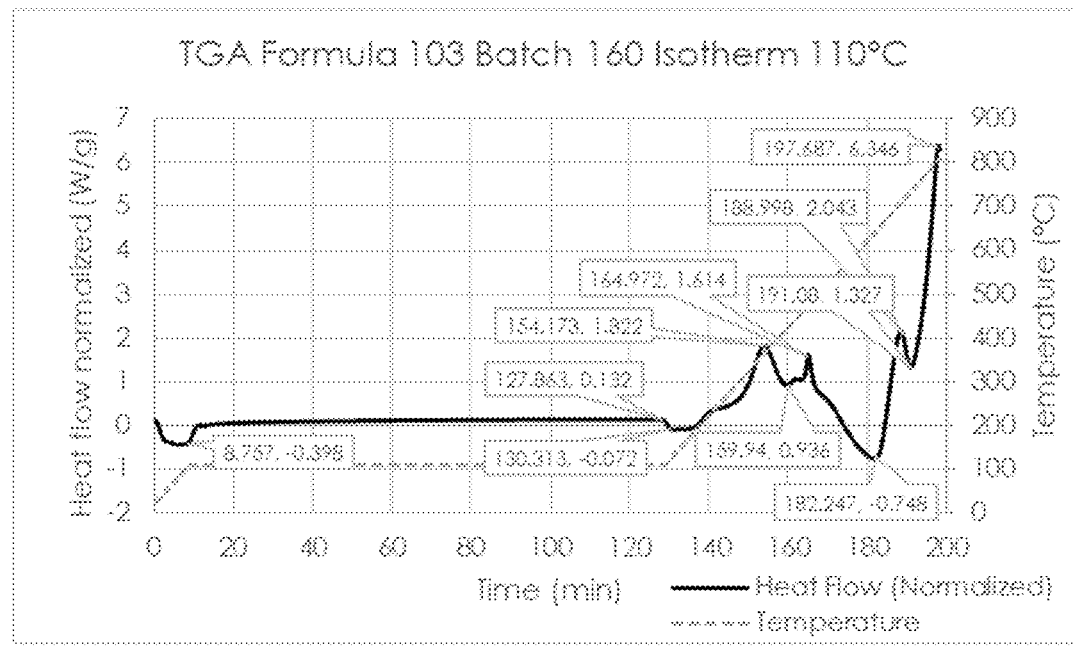
FIG. 33A is a time vs. heat flow graph of an exemplary fifth conductive ink, per one or more embodiments, herein.
Figure 33B:
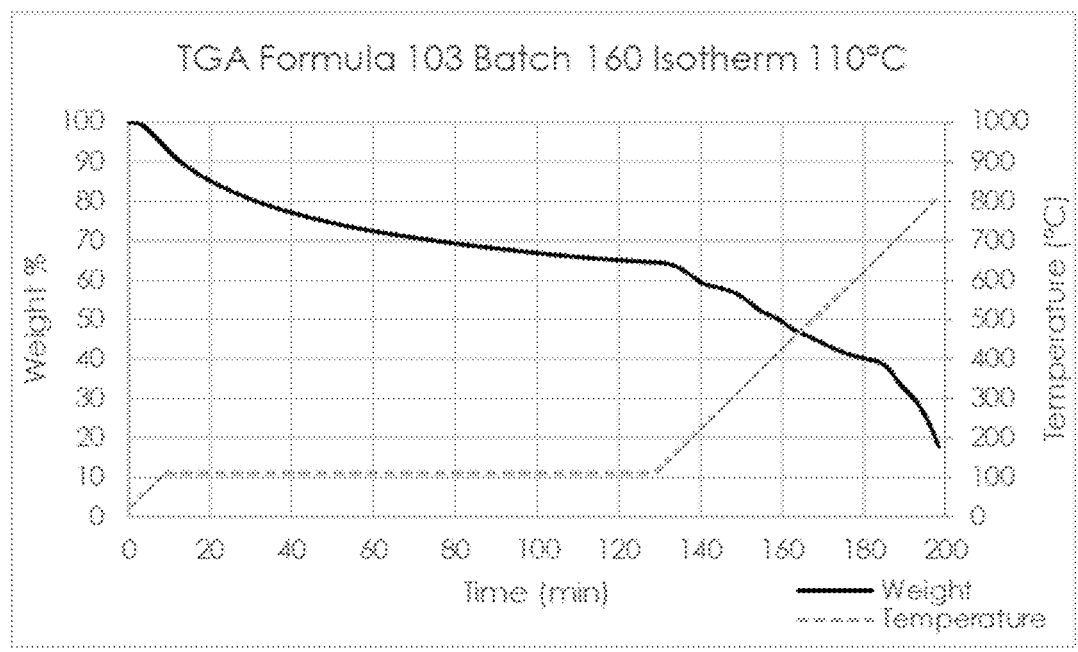
FIG. 33B is a time vs. weight graph of the exemplary fifth conductive ink, per one or more embodiments, herein.

In a thermal analysis per FIGS. 33A-33B, liquid of the exemplary fourth conductive ink was heated to 110° C. at a rate of 10° C./min, kept at 110° ° C. for 2 hours, and heated to 800° C. at a rate of 10° C./min. As shown, an endothermal peak is detected at 110° C., corresponding to a fast weight loss of the ink associated to the evaporation of the high vapor pressure solvents. Further, as shown, annealing the exemplary third conductive ink, once printed on a substrate, at a temperature of about 110° C. achieves optimal conductivity, ideal adhesion, and flexibility. Several exothermal peaks are found at 367° ° C., 474° C., 714° C., and 805° C., which correspond to the decomposition of the binder, dispersing agent, carbons, and graphene. The residue at 805° C. is close to 0, meaning that all ink components are consumed by reacting with oxygen from air flow.

Figure 34A:
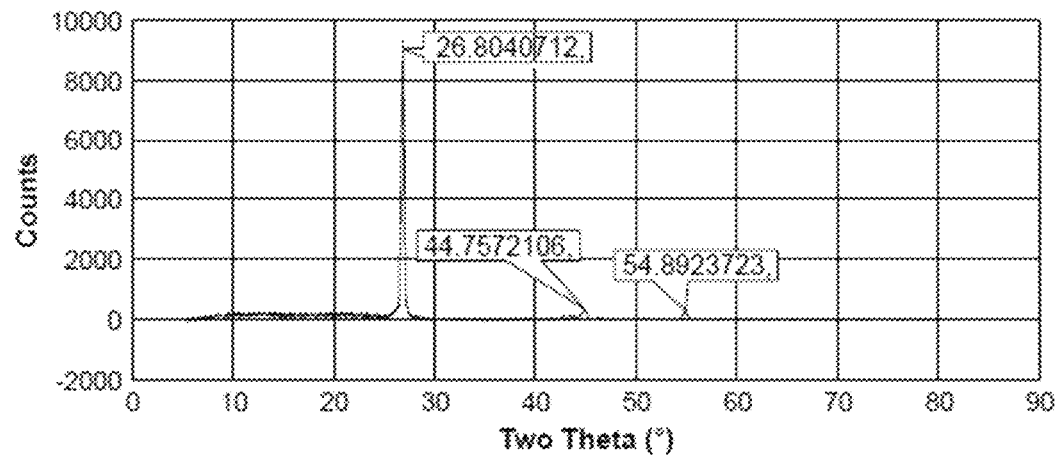
FIG. 34A is an XRD graph of an exemplary fifth conductive ink, per one or more embodiments, herein.

The XRD pattern in FIG. 34A, of a substrate coated with the exemplary fifth conductive ink shows sharp intense characteristic peak for graphite at 2θ=26° and a smaller peak at 2θ=55°. The other peak at around 2θ=45° is correlated to rGO.

Figure 34B:
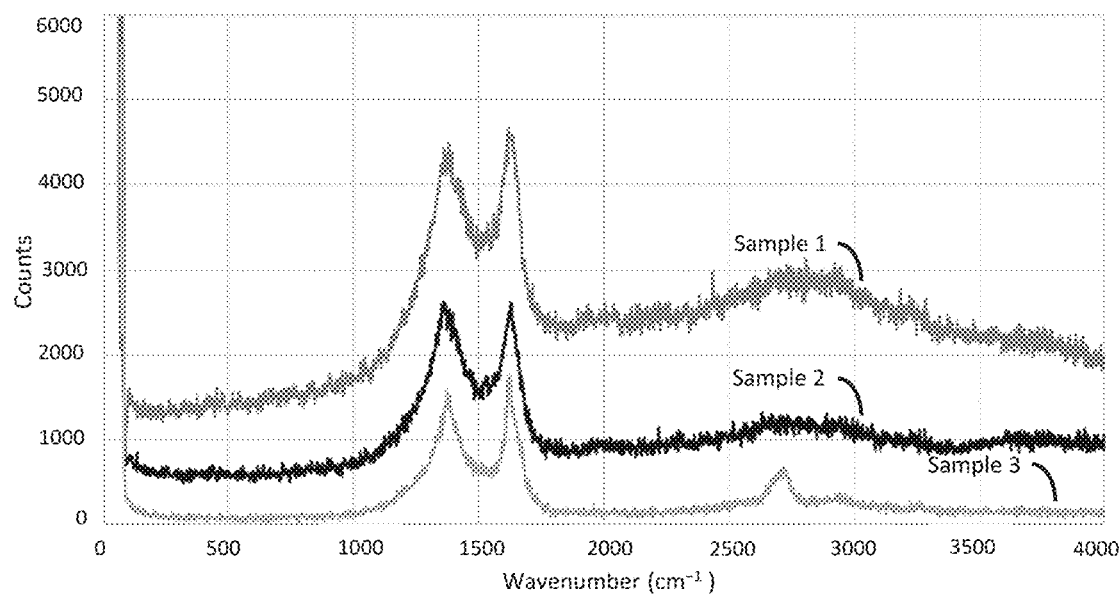
FIG. 34B is a Raman spectrum of the exemplary fifth conductive ink, per one or more embodiments, herein.

Per FIG. 34B, a Raman spectrum of a substrate coated with the exemplary fifth conductive ink displays D and G bands at approximately 1400 cm$^{-1}$ and 1600 cm$^{-1}$ that are characteristic of rGO. The peak found at approximately 2700 cm-1 is characteristic of graphite which also explains the sharpness of the peaks around 1600.

Figure 35A:
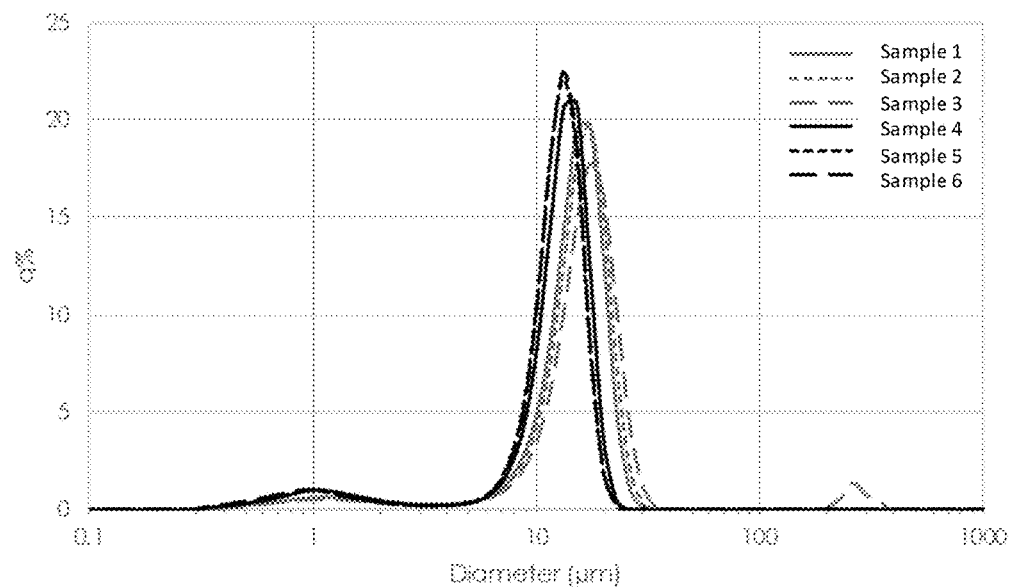
FIG. 35A is a particle distribution graph of the exemplary fifth conductive ink, per one or more embodiments, herein.

Per FIG. 35A, the exemplary fifth conductive ink had a median particle size of about 11.8 μm and a mean particle size of about 11.2 μm, wherein 90% of the particles had a size of less than about 15.7 μm.

Figure 35B:
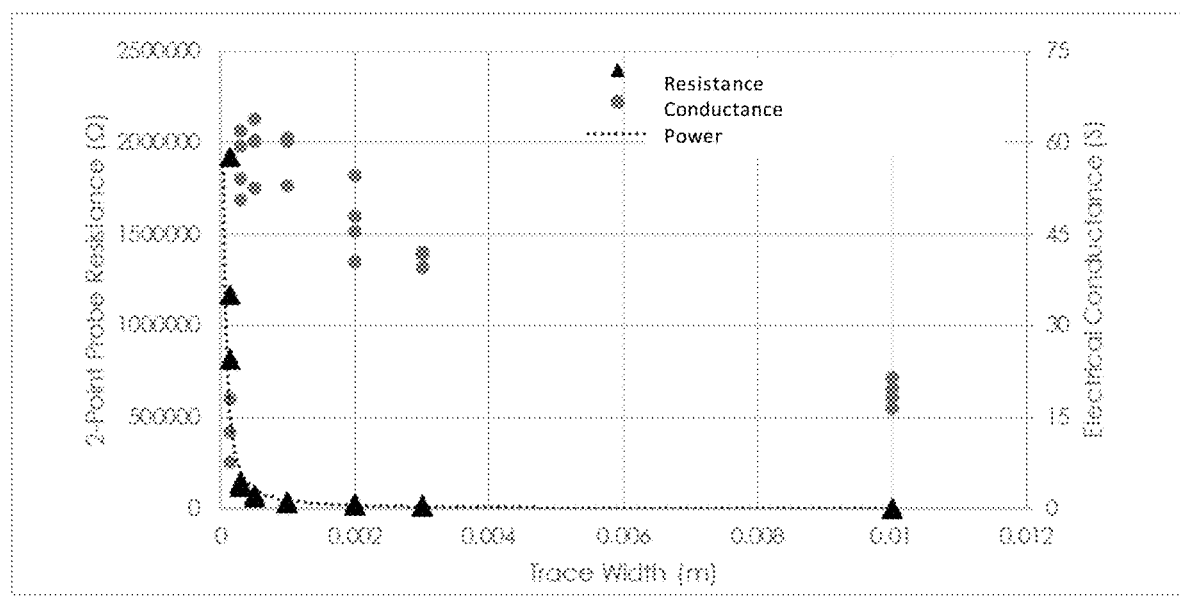
FIG. 35B, shows a trace width vs. resistance for a substrate covered with the exemplary fifth conductive ink, per one or more embodiments, herein.
Figure 36A:
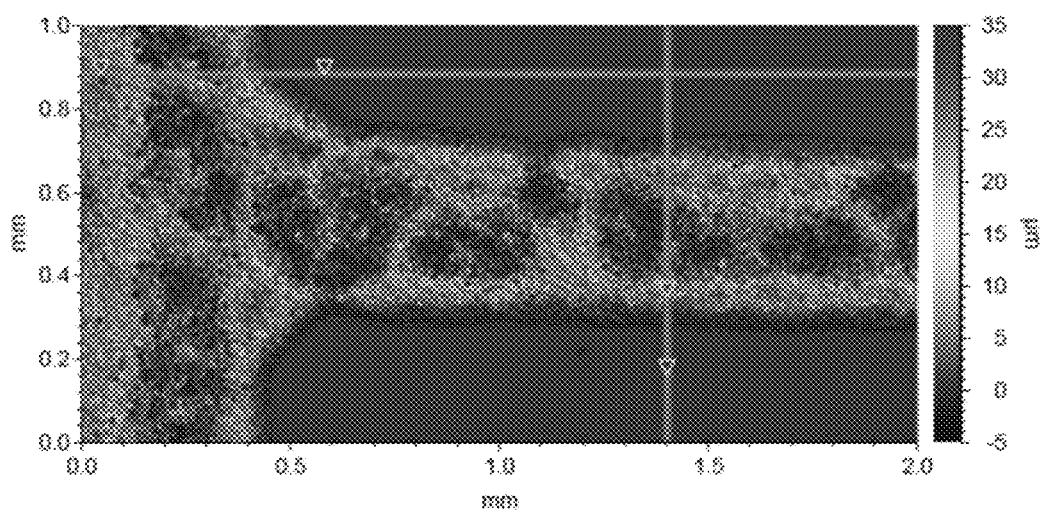
FIG. 36A shows a first optical profilometry image of a substrate covered with the exemplary fifth conductive ink, per one or more embodiments, herein.
Figure 36B:
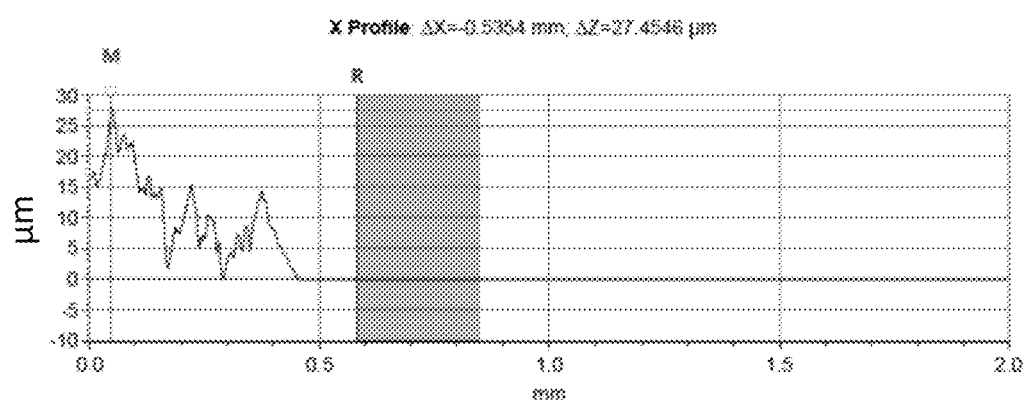
FIG. 36B shows a graph of thickness of an exemplary dried fifth conductive ink along the length of the sample in FIG. 36A, per one or more embodiments, herein.
Figure 36C:
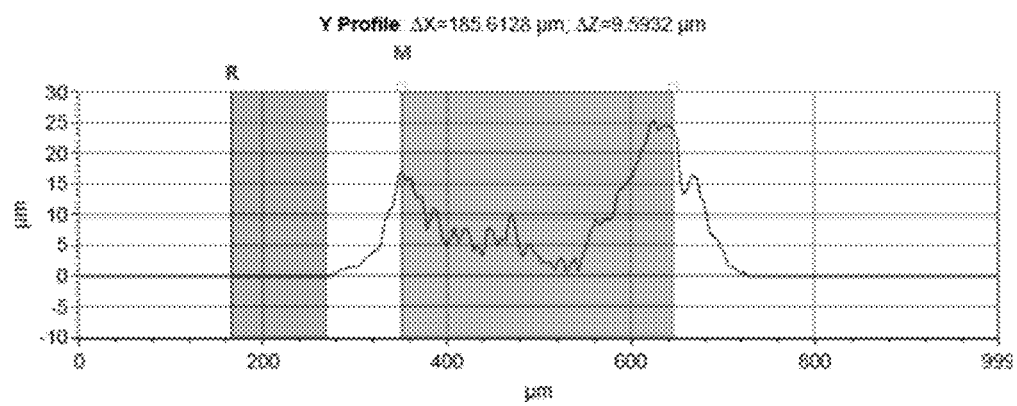
FIG. 36C shows a graph of thickness of an exemplary dried fifth conductive ink along the width of the sample in FIG. 36A, per one or more embodiments, herein.
Figure 37A:
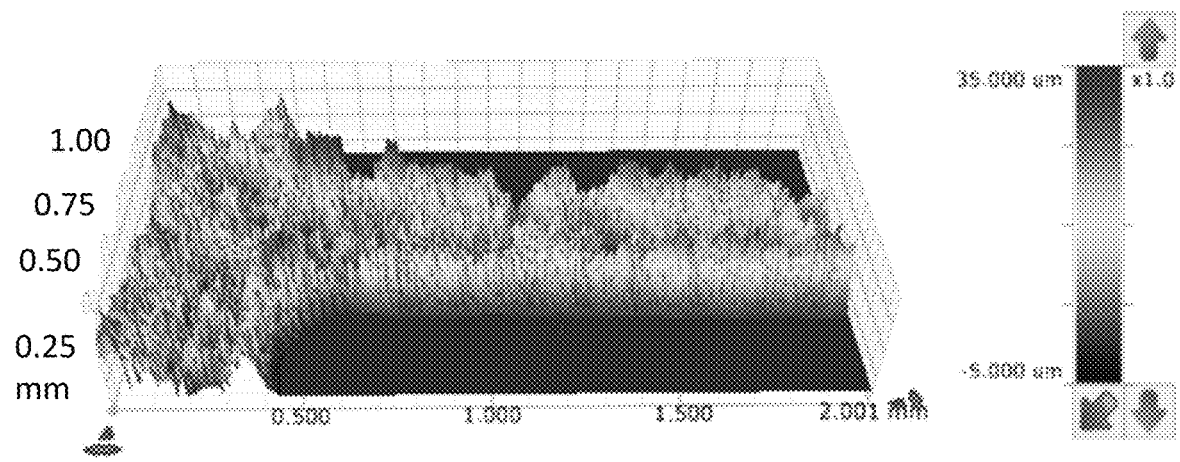
FIG. 37A shows a second optical profilometry image of a substrate covered with the exemplary fifth conductive ink, per one or more embodiments, herein.
Figure 37B:
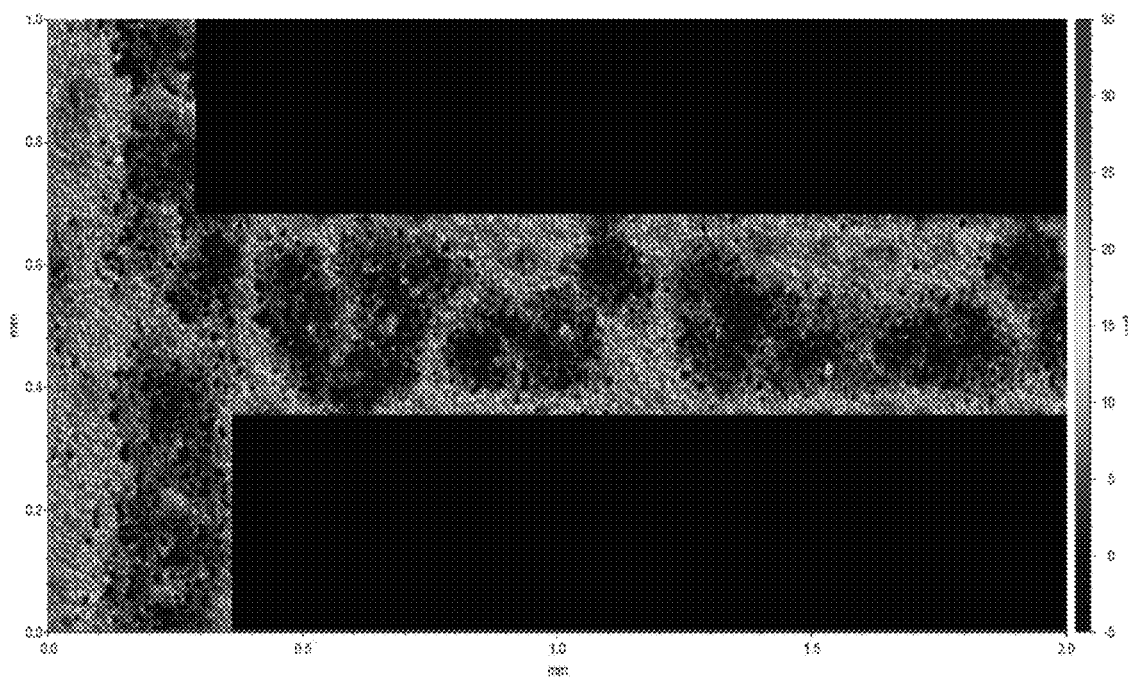
FIG. 37B shows a third optical profilometry image of a substrate covered with the exemplary fifth conductive ink, per one or more embodiments, herein.

FIG. 35B, shows a trace width vs. resistance for a substrate covered with the exemplary fifth conductive ink, wherein the exemplary fifth conductive ink can be successfully screen printed into traces with a line width from 150 to 3000 micrometers.

Per FIGS. 36A-36C and 37A-37B, optical profilometry of the printed lines show that the edges are straight and clean. The highly uniform cross-sectional profile provide evidence for the successful preparation of the ink formulation.

Figure 38A:
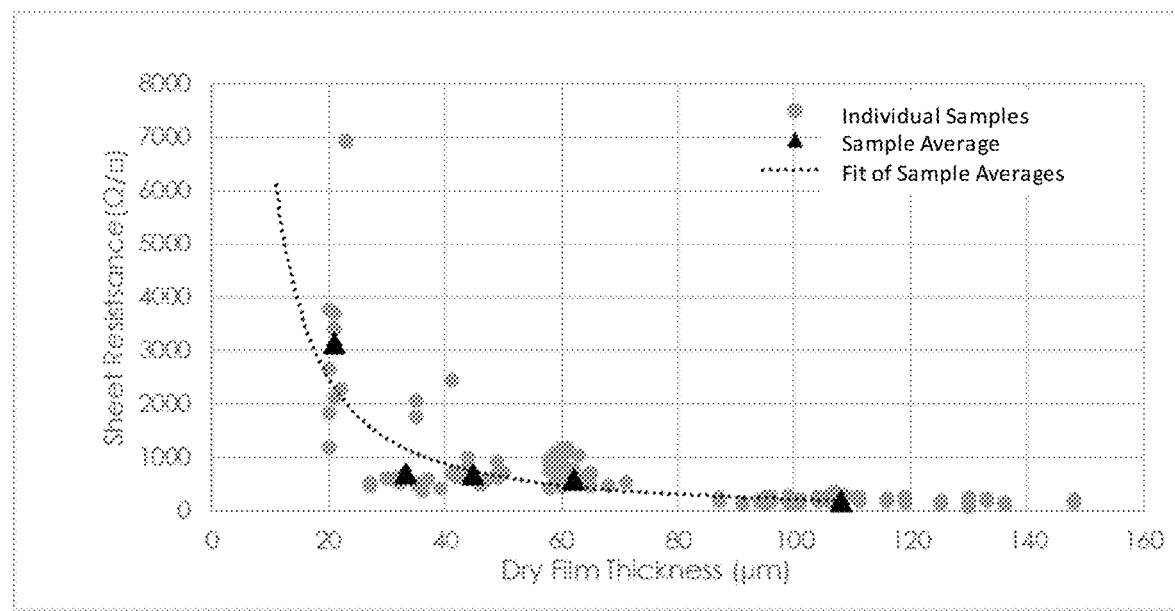
FIG. 38A is a dry film thickness vs. sheet resistance graph of a substrate coated with the exemplary fifth conductive ink, per one or more embodiments, herein.
Figure 38B:
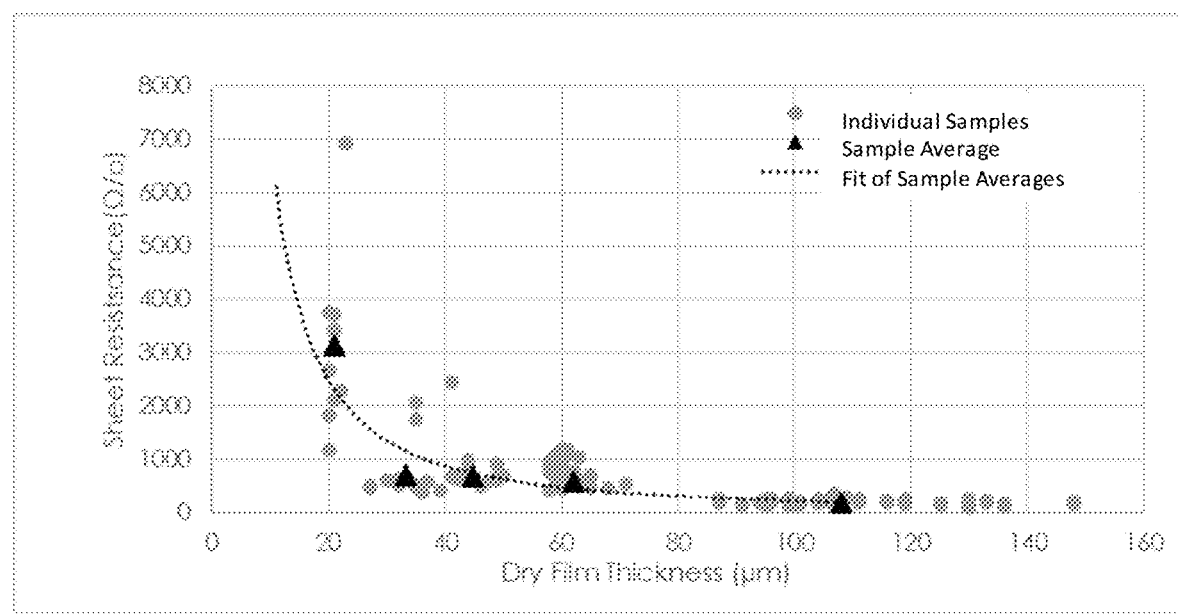
FIG. 38B is a wet film thickness vs. dry film thickness graph of a substrate coated with the exemplary fifth conductive ink, per one or more embodiments, herein.

Per FIG. 38A-38B, a 1 μm thick Polyimide substrate was coated with various thicknesses of the exemplary fifth conductive ink by a Mayer rods, wherein the coated substrates were cured at 110° C. until dry. As expected, the results show an increases in sheet resistance associated to decrease in dry thickness, wherein the average conductivity is about 41.9 S/m with a standard deviation of about 15.8 S/m.

Figure 39A:
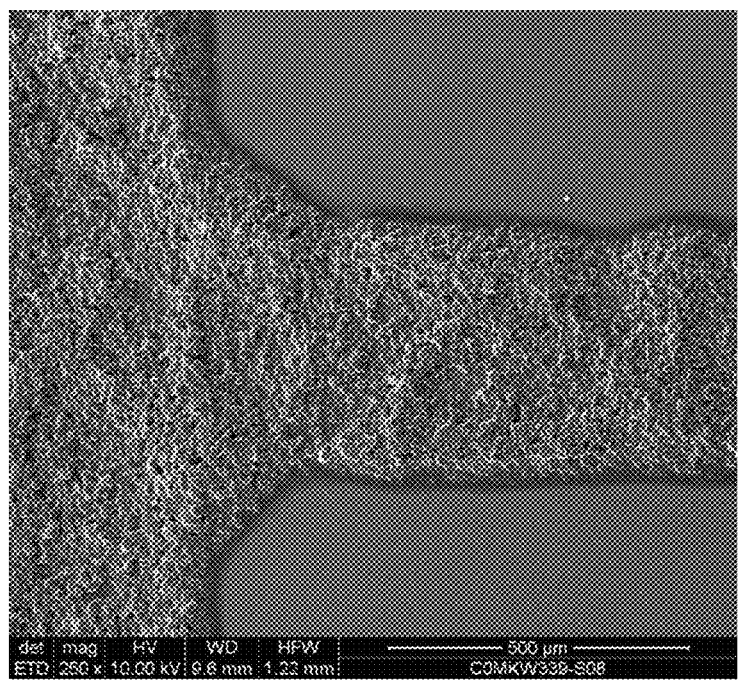
FIG. 39A is a low magnification SEM image of a substrate coated with the exemplary fifth conductive ink, per one or more embodiments, herein.
Figure 39B:
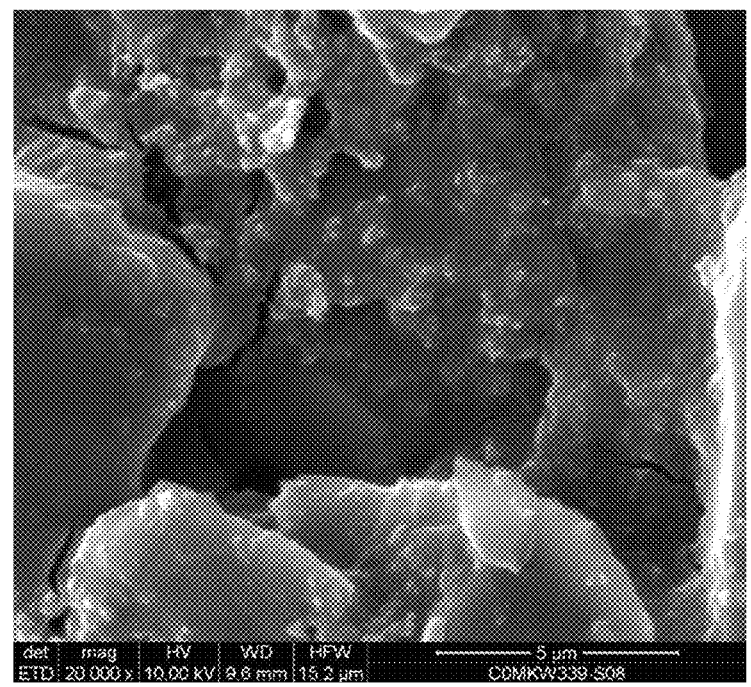
FIG. 39B is a high magnification SEM image of a substrate coated with the exemplary fifth conductive ink, per one or more embodiments, herein.

FIGS. 39A-39B show low and high magnification SEM images of a substrate coated with the exemplary fifth conductive ink.

Example 6—Sixth Conductive Inks

Figure 40A:
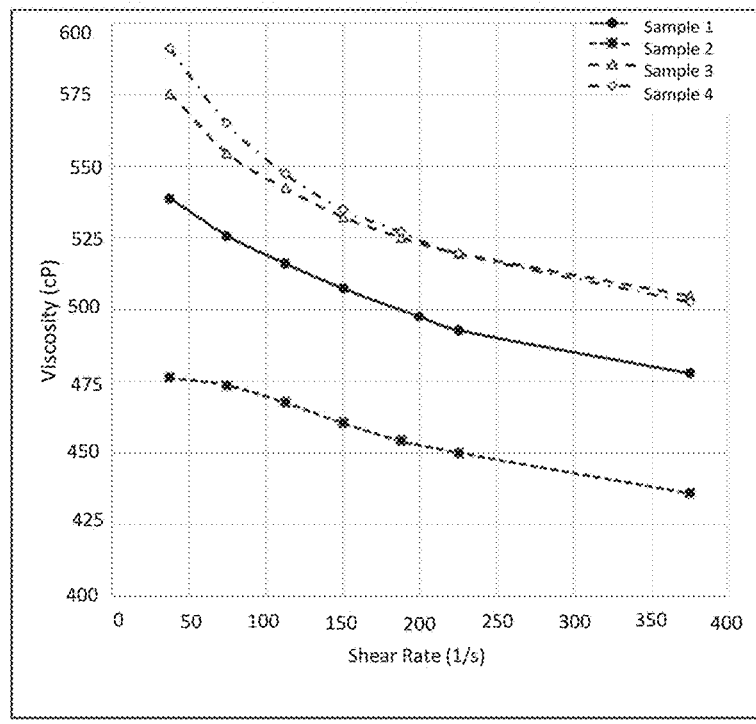
FIG. 40A is a shear rate vs. viscosity graph of an exemplary sixth conductive ink, per one or more embodiments, herein.
Figure 40B:
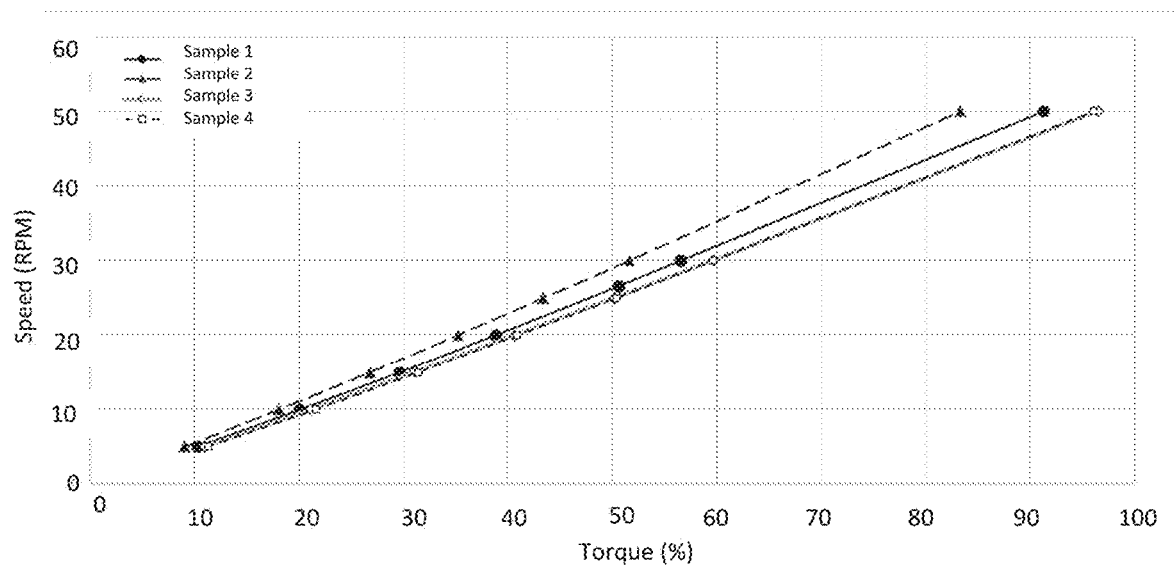
FIG. 40B is a torque vs. speed graph of the exemplary sixth conductive ink, per one or more embodiments, herein.

FIG. 40A is a shear rate vs. viscosity graph of an exemplary third conductive ink. Although the Rheogram appears linear or Newtonian, the exemplary third conductive ink exhibits slight curvature, shear thinning and/or pseudoplastic orientation. The ink is suitable for screen printing, roll-coating with slot-die or reverse comma blade, and even flexographic printing. FIG. 40B is a torque vs. speed graph of an exemplary third conductive ink.

Figure 41A:
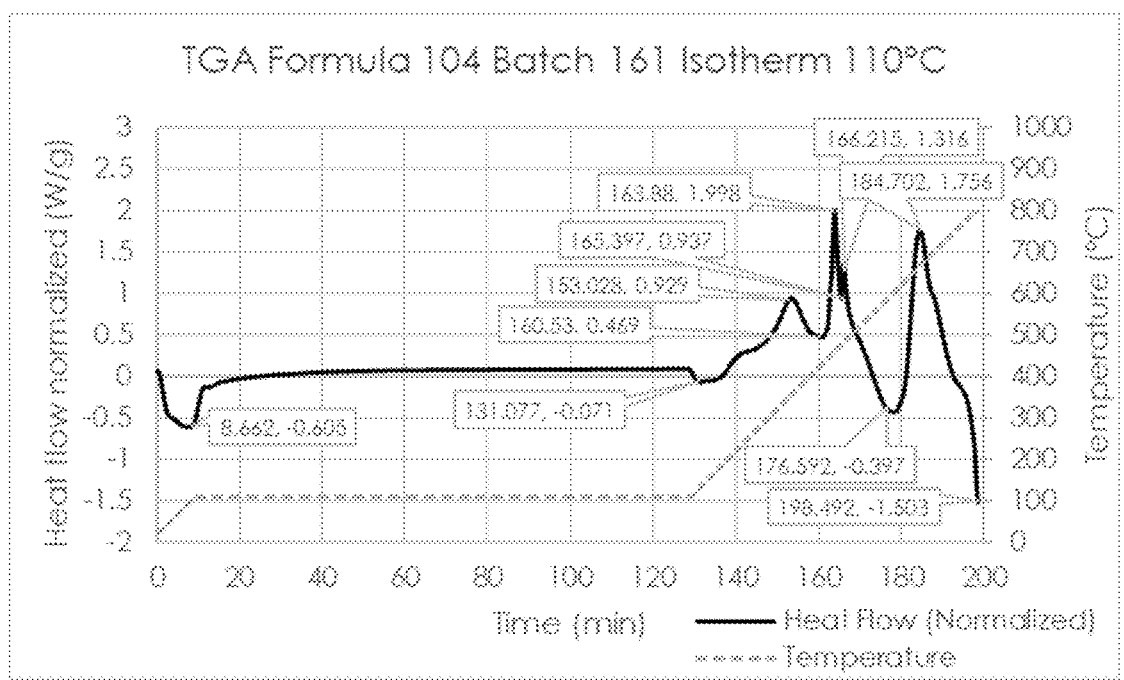
FIG. 41A is a time vs. heat flow graph of the exemplary sixth conductive ink, per one or more embodiments, herein.
Figure 41B:
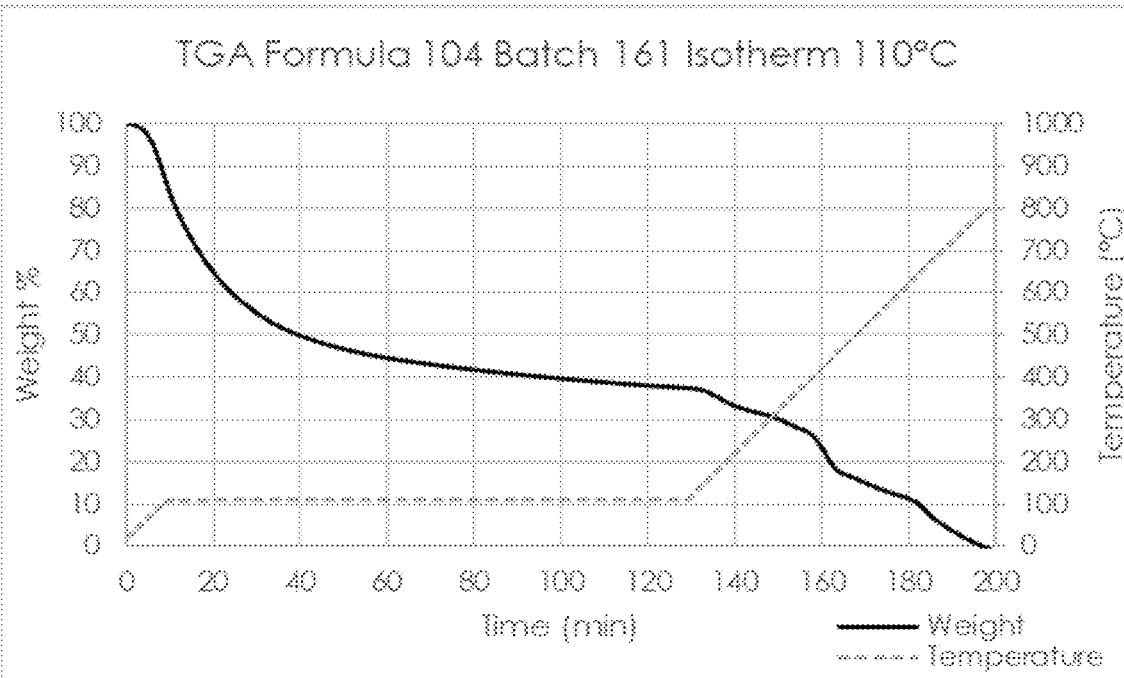
FIG. 41B is a time vs. weight graph of the exemplary sixth conductive ink, per one or more embodiments, herein.

In one experiment, per FIGS. 41A and 41B, the exemplary sixth conductive ink was heated to 110° C. at a rate of 10° C./min, held at 110° ° C. for 2 hours, and heated to 800° C. at a rate of 10° C./min. As shown, an endothermal peak is detected at 110° C., corresponding to rapid weight loss of the ink, due to the evaporation of the high vapor pressure solvent. In some embodiments, annealing the exemplary sixth conductive ink, once printed on a substrate, at a temperature of about 110° C. achieves optimal conductivity, ideal adhesion, and flexibility. Further as shown, several exothermal peaks are found at 351° C., 462° ° C., 484° C., and 669° C., which may correspond to the decomposition of the binder, dispersing agent, and/or graphene. As residue at 669° C. is close to 0, all ink components are consumed by reacting with oxygen from air flow at that temperature.

Figure 42A:
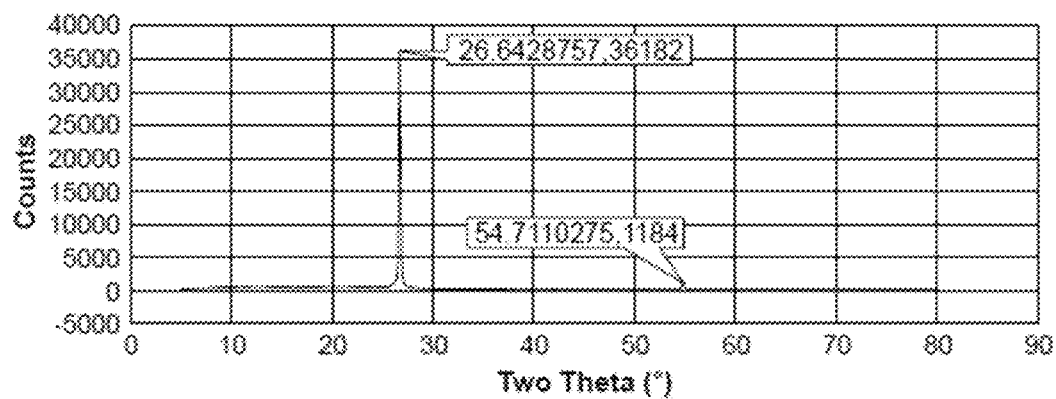
FIG. 42A is an XRD pattern of a substrate coated with the exemplary sixth conductive ink, per one or more embodiments, herein.

The XRD pattern of a substrate coated with the exemplary third conductive ink, per FIG. 42A, displays show two broad characteristic peaks at 2 theta of 12.3° and 19.4°, which are consistent with the values reported for the polymer binder.

Figure 42B:
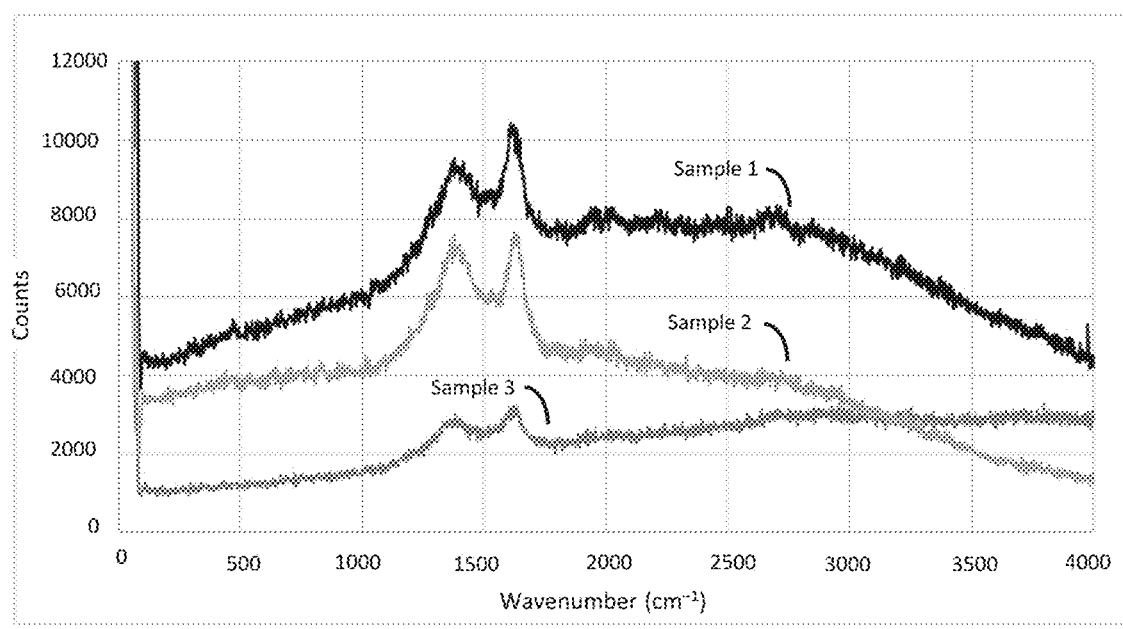
FIG. 42B is a Raman spectrum of a substrate coated with the exemplary sixth conductive ink, per one or more embodiments, herein.

Raman spectrum of the exemplary sixth conductive ink printed on a substrate, per FIG. 42B, displays D and G bands that are characteristic for rGO at approximately 1400 cm$^{-1}$ and 1600 cm$^{-1}$ respectively.

Figure 43A:
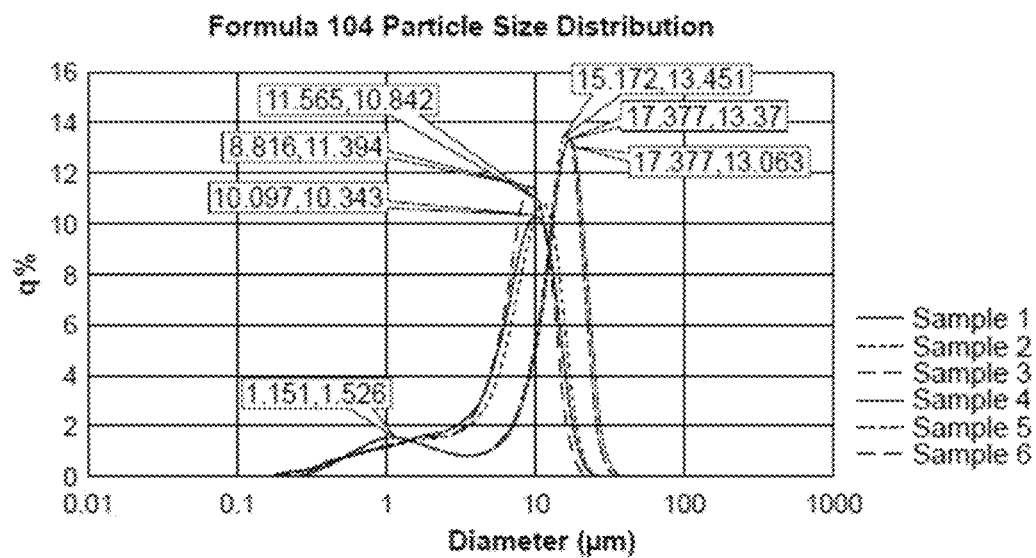
FIG. 43A is a particle distribution graph of the exemplary sixth conductive ink, per one or more embodiments, herein.

Per FIG. 43A, the exemplary sixth conductive ink had a median particle size of about 12.5 μm and a mean particle size of about 11.6 μm wherein 90% of the particles had a size of less than about 19.6 μm.

Figure 43B:
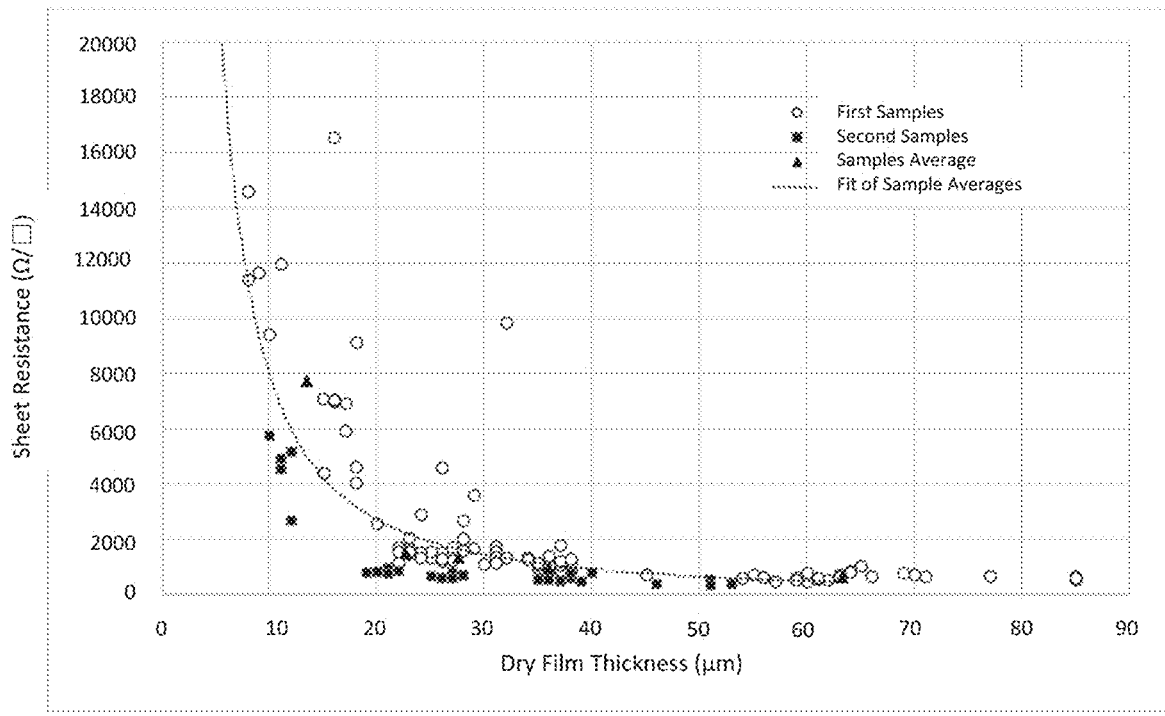
FIG. 43B is a dry film thickness vs. sheet resistance graph of a substrate coated with the exemplary sixth conductive ink, per one or more embodiments, herein.

Per FIG. 43B, a 1 μm thick Polyimide substrate was coated with various thicknesses of the exemplary sixth conductive ink by a Mayer rods, wherein the coated substrates were cured at 110° C. until dry. As expected, the results show an increases in sheet resistance associated to decrease in dry thickness, wherein the average conductivity is about 28.4 S/m with a standard deviation of about 14.3 S/m.

Figure 44A:
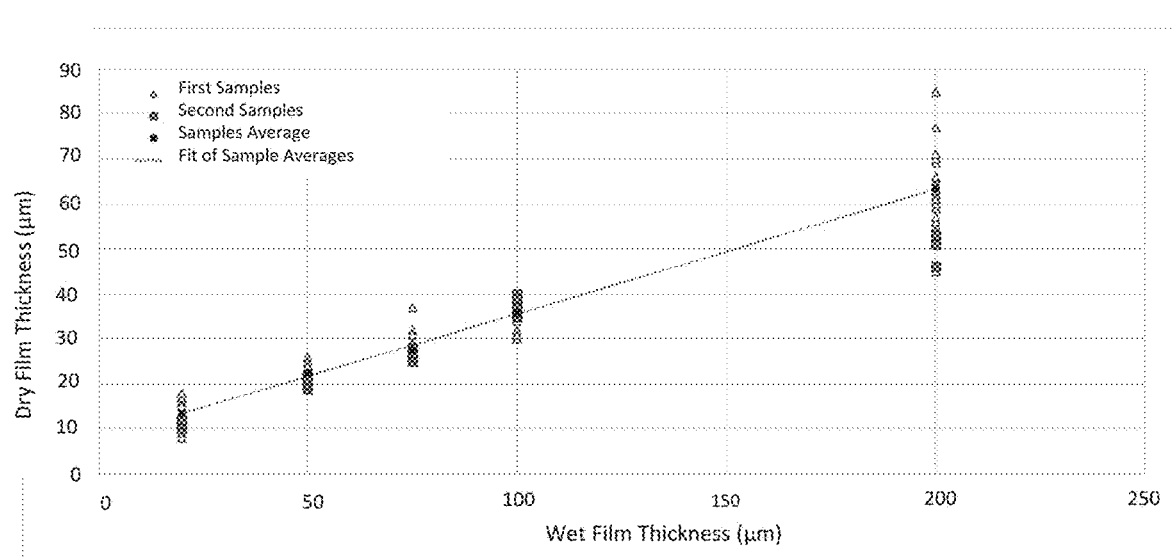
FIG. 44A is a graph of the wet thickness vs dry thickness of a trace formed with the exemplary sixth conductive ink, per one or more embodiments, herein.
Figure 44B:
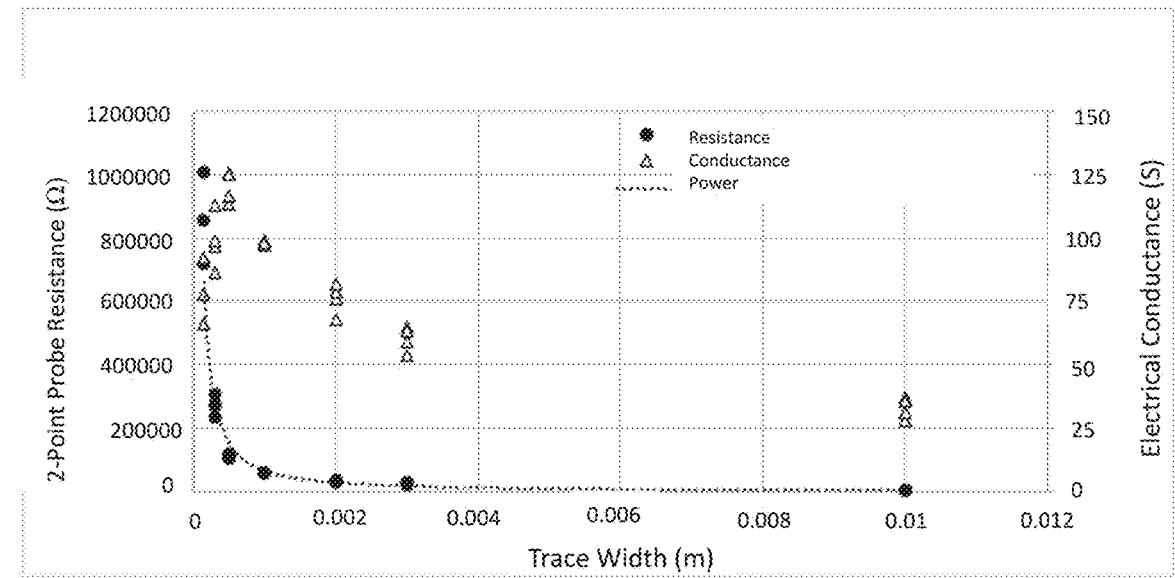
FIG. 44B, shows a trace width vs. resistance for a substrate covered with the exemplary sixth conductive ink.

FIG. 44A is a graph of the wet thickness vs dry thickness of a trace formed with the exemplary sixth conductive ink. FIG. 44B, shows a trace width vs. resistance for a substrate covered with the exemplary sixth conductive ink, wherein the exemplary sixth conductive ink can be successfully screen printed into traces with a line width from 150 to 3000 micrometers.

While preferred embodiments, of the present disclosure have been shown and described herein, it will be obvious to those skilled in the art that such embodiments, are provided by way of example only. Numerous variations, changes, and substitutions will now occur to those skilled in the art without departing from the disclosure. It should be understood that various alternatives to the embodiments, of the disclosure described herein may be employed in practicing the disclosure.

What is claimed is:

1. A method of forming a conductive ink, the method comprising mixing a solution, the solution comprising:
   (a) graphene sheets, wherein:
      (i) at least about 90% of the graphene sheets consist of a single layer;
      (ii) the graphene sheets have an oxygen content of at most about 13%; or
      (iii) both;
   (b) a binder;
   (c) a stabilizer comprising polytetrahydrofuran and diethylene glycol; and
   (d) a solvent, wherein the conductive ink is stable at temperatures of up to 400° C.

2. The method of claim 1, wherein the mixing occurs at a shear rate of at least 750 s$^{-1}$.

3. The method of claim 1, further comprising applying a film of the conductive ink on a substrate.

4. The method of claim 3, wherein the film comprises a dry thickness of up to about 160 micrometers.

5. The method of claim 3, wherein a ratio between a wet thickness of the conductive ink applied to a substrate and a dry thickness of the conductive ink dried on the substrate is about 2:1 to about 6:1.

6. The method of claim 1, further comprising annealing the conductive ink at a temperature of at least 150° C.

7. The method of claim 1, wherein the graphene sheets comprise reduced graphene oxide or activated reduced graphene oxide.

8. The method of claim 1, wherein the binder is a polymeric binder.

9. The method of claim 1, wherein the solvent comprises propylene glycol n-propyl ether, 2-ethyl-1-hexanol, diethylene glycol monobutyl ether, 2-ethyl-1-butanol, 2-methyl-1-pentanol, propylene glycol monomethyl ether acetate, hexamine, cycloheptylamine, isoamyl amine, 3-methoxypropylamine, parachlorobenzotrifluoride, ethylene glycol, isopropanol, ethyl acetate, chloroform, dimethylformamide, n-methyl-2-pyrrolidone, tetrahydrofuran, and dichlorobenzene, or any combination thereof.

10. The method of claim 1, wherein the solution has a w/w concentration of the graphene sheets of about 0.1% to about 10%.

11. The method of claim 1, wherein the solution has a w/w concentration of the binder of about 5% to about 60%.

12. The method of claim 1, wherein the solution has a w/w concentration of the stabilizer of about 1% to about 80%.

13. The method of claim 1, wherein the solution has a solid content of about 5% to about 80%.

14. The method of claim 1, wherein the conductive ink has a viscosity of about 25 cP to about 4,000 cP.

15. The method of claim 1, wherein the conductive ink has a resistance when dry of about 300 ohm/sq to about 80,000 ohm/sq.

16. The method of claim 1, wherein the graphene sheets have a particle size of about 3 micrometers to about 40 micrometers.

17. The method of claim 1, the solution further comprises a conductive additive in an amount of about 1% to about 40% wt.

18. The method of claim 17, wherein the conductive additive comprises a nanocarbon.

19. The method of claim 18, wherein the nanocarbon comprises carbon nanoparticles, carbon nanodots, carbon nanotubes, graphene nanoribbons, carbon nanofibers, nanographite, carbon anions, carbon nanocones, or any combination thereof.

20. A kit comprising:
(a) a conductive ink comprising:
 (i) graphene sheets, wherein:
  a. at least about 90% of the graphene sheets consist of a single layer,
  b. the graphene sheets have an oxygen content of at most about 13%, or
  c. both;
 (ii) a binder;
 (iii) a stabilizer comprising polytetrahydrofuran and diethylene glycol; and
 (iv) a solvent; and
(b) and instructions for applying the conductive ink to a substrate, wherein the conductive ink is stable at temperatures of up to 400° C.

* * * * *